US011551480B2

(12) United States Patent
Kasatani

(10) Patent No.: US 11,551,480 B2
(45) Date of Patent: Jan. 10, 2023

(54) HANDWRITING INPUT APPARATUS, HANDWRITING INPUT METHOD, PROGRAM, AND INPUT SYSTEM

(71) Applicant: Kiyoshi Kasatani, Kanagawa (JP)

(72) Inventor: Kiyoshi Kasatani, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 142 days.

(21) Appl. No.: 16/835,806

(22) Filed: Mar. 31, 2020

(65) Prior Publication Data

US 2020/0327307 A1 Oct. 15, 2020

(30) Foreign Application Priority Data

Apr. 11, 2019 (JP) ............................ JP2019-075826
Feb. 28, 2020 (JP) ............................ JP2020-034338

(51) Int. Cl.
*G06V 40/30* (2022.01)

(52) U.S. Cl.
CPC .......... *G06V 40/376* (2022.01); *G06V 40/394* (2022.01)

(58) Field of Classification Search
CPC ........... G06K 9/00174; G06K 9/00181; G06K 9/00409; G06K 9/00194; G06K 9/00879; G06K 9/2081; G06K 2209/01; G06F 21/83; G06F 3/03545; G06F 3/0482; G06F 21/31; G06F 3/04883
See application file for complete search history.

(56) References Cited

U.S. PATENT DOCUMENTS

| | | | | |
|---|---|---|---|---|
| 9,237,246 | B2 | 1/2016 | Kemmochi et al. | |
| 9,769,183 | B2 | 9/2017 | Kanematsu et al. | |
| 10,397,638 | B2 | 8/2019 | Kanematsu et al. | |
| 10,419,618 | B2 | 9/2019 | Kato et al. | |
| 10,572,779 | B2 | 2/2020 | Kemmochi et al. | |
| 2003/0179912 | A1* | 9/2003 | Murase | G06V 40/30 382/119 |
| 2003/0182585 | A1 | 9/2003 | Murase et al. | |
| 2005/0219226 | A1* | 10/2005 | Liu | G06F 3/0488 345/173 |
| 2007/0052685 | A1* | 3/2007 | Wakai | G06F 9/451 715/764 |

(Continued)

FOREIGN PATENT DOCUMENTS

| | | |
|---|---|---|
| EP | 1947562 | 7/2008 |
| EP | 2874099 | 5/2015 |
| JP | 2018-026185 | 2/2018 |

OTHER PUBLICATIONS

Extended European Search Report for 20167608.7 dated Aug. 25, 2020.

*Primary Examiner* — Ming Y Hon
(74) *Attorney, Agent, or Firm* — IPUSA, PLLC

(57) ABSTRACT

A handwriting input apparatus that displays stroke data handwritten based on a position of an input unit contacting a touch panel, includes circuitry configured to implement a handwriting recognition control unit for recognizing stroke data and converting the stroke data into text data, and an authentication control unit for authenticating a user based on the stroke data, and a display unit for displaying a display component for receiving a signature together with the text data when the authentication control unit determines that a user has been successfully authenticated.

18 Claims, 57 Drawing Sheets

(56) References Cited

U.S. PATENT DOCUMENTS

| | | | | | |
|---|---|---|---|---|---|
| 2012/0207393 | A1* | 8/2012 | Huteaux | G16Z 99/00 | 382/186 |
| 2012/0262488 | A1* | 10/2012 | Liu | G06F 40/166 | 345/660 |
| 2013/0050141 | A1* | 2/2013 | Park | G06F 3/046 | 345/174 |
| 2013/0201133 | A1* | 8/2013 | Oh | G06F 3/04883 | 345/173 |
| 2014/0019905 | A1 | 1/2014 | Kim et al. | | |
| 2015/0131874 | A1* | 5/2015 | Mettyear | G06V 30/2268 | 382/122 |
| 2015/0356761 | A1* | 12/2015 | Saitoh | H04N 1/00331 | 358/452 |
| 2016/0042165 | A1* | 2/2016 | Nicholson | G06V 30/1423 | 726/19 |
| 2016/0094756 | A1* | 3/2016 | Onishi | H04N 1/0097 | 358/1.14 |
| 2016/0132232 | A1* | 5/2016 | Baba | G06V 30/32 | 715/268 |
| 2016/0308979 | A1 | 10/2016 | Kemmochi et al. | | |
| 2016/0315935 | A1 | 10/2016 | Tsukuda et al. | | |
| 2016/0321238 | A1* | 11/2016 | Kurita | G06F 3/04883 | |
| 2017/0004122 | A1* | 1/2017 | Taniguchi | G06F 3/04883 | |
| 2017/0180988 | A1* | 6/2017 | Kim | A61B 5/24 | |
| 2017/0310830 | A1 | 10/2017 | Kemmochi et al. | | |
| 2018/0082663 | A1 | 3/2018 | Kemmochi et al. | | |
| 2018/0232138 | A1 | 8/2018 | Kanematsu et al. | | |
| 2018/0234295 | A1 | 8/2018 | Koyama et al. | | |
| 2018/0292951 | A1 | 10/2018 | Kato et al. | | |
| 2018/0300543 | A1 | 10/2018 | Kawasaki et al. | | |
| 2019/0026011 | A1* | 1/2019 | Wang | G06F 3/0482 | |
| 2020/0045176 | A1 | 2/2020 | Fujii et al. | | |

* cited by examiner

FIG.7

| | | EXAMPLE OF DEFINED CONTROL ITEM | EXAMPLE OF DEFINED CONTROL DATA |
|---|---|---|---|
| | 401 | SELECTABLE CANDIDATE DISPLAY TIMER | TimerValue="500ms" |
| | 402 | SELECTABLE CANDIDATE DELETION TIMER | TimerValue="5000ms" |
| | 403 | RECTANGULAR AREA 403 NEAR THE HANDWRITING OBJECT | Horizontal="50%" Vertical="80%" |
| | 404 | ESTIMATED WRITING DIRECTION / CHARACTER SIZE DETERMINATION CONDITION | MinDiff="10mm" MinTime="1000ms" DefDir="Horizontal" |
| 405 | 405a | SMALLER CHARACTER | FontStyle="Mincho type" FontSize="25mm" (JAPANESE CHARACTERS "明朝体" CORRESPONDS TO ENGLISH CHARACTERS "Mincho type") |
| 405 | 405b | MEDIUM CHARACTER | FontStyle="Mincho type" FontSize="50mm" |
| 405 | 405c | LARGER CHARACTER | FontStyle="Gothic type" FontSize="100mm" (JAPANESE CHARACTERS "ｺﾞｼｯｸ体" CORRESPONDS TO ENGLISH CHARACTERS "Gothic type") |
| | 406 | STRADDLE LINE DETERMINATION CONDITION | MinLenLongSide="100mm" MaxLenShortSide="50mm" MinOverlapRate="80%" |
| | 407 | SURROUNDIG LINE DETERMINATION CONDITION | MinOverLapRate="100%" |

FIG.8

EXAMPLE OF HANDWRITING RECOGNITION DICTIONARY DATA

| | BEFORE CONVERSION | AFTER CONVERSION | PROBABILITY |
|---|---|---|---|
| 654 | ぎ | 議 | 0.55 |
| | ぎ | 技 | 0.45 |
| 655 | ぎし | 技士 | 0.55 |
| | ぎし | 技師 | 0.45 |
| 656 | ぎじ | 疑似 | 0.30 |
| | ぎじ | 議事 | 0.25 |
| | ぎじ | 擬似 | 0.20 |
| | ぎじ | ギジ | 0.15 |

FIG.9

EXAMPLE OF CHARACTER STRING CONVERSION DICTIONARY DATA

| | BEFORE CONVERSION | AFTER CONVERSION | PROBABILITY |
|---|---|---|---|
| 657 | 議 | 議事録 | 0.95 |
| | 技 | 技量試 | 0.85 |
| 658 | 技士 | 技士会 | 0.65 |
| | 技師 | 技師長 | 0.75 |
| 659 | ぎじ | 議事録 | 0.95 |
| | ぎじ | 技術士 | 0.85 |
| | ぎじ | 技術 | 0.75 |
| 660 | 擬似 | 擬似相関 | 0.55 |
| | 擬似 | 擬似的 | 0.50 |
| | 擬似 | 擬似乱数 | 0.40 |

FIG.10

EXAMPLE OF PREDICTION CONVERSION DICTIONARY DATA

| | BEFORE CONVERSION | AFTER CONVERSION | PROBABILITY |
|---|---|---|---|
| 661 | 議事録 | 議事録の送付先 | 0.65 |
| | 技量試 | 技量試を決裁 | 0.75 |
| 662 | 技士 | 技士会連合会 | 0.95 |
| | 技術 | 技師エンジニア | 0.85 |
| 663 | 技術 | 技術雑誌社 | 0.65 |
| 664 | 擬似 | 擬似体験 | 0.45 |
| | 擬似 | 擬似逆行列 | 0.35 |

FIG.11A

| | |
|---|---|
| | EXAMPLE OF OPERATION COMMAND DEFINITION DATA AND SYSTEM DEFINITION DATA<br>(CASE WITHOUT SELECTABLE OBJECT) |
| 701 | Name="Read meeting minute template" String="Meeting minute" String="Template"<br>Command="ReadFile https://%username%:%password%@server.com/template/minutes.pdf" |
| 702 | Name="Store in meeting minute folder" String="Meeting minute" String="Store"<br>Command="WriteFile https://%username%:%password%@server.com/minutes/%machinename%_%yyyy-mm-dd%.pdf" |
| 703 | Name="To be printed" String="Print" String="Printed"<br>Command="PrintFile https://%username%:%password%@server.com/print/%machinename%-"%yyyy-mm-dd%.pdf" |
| 709 | Name="Fine pen" String="Fine" String="Pen" Command="ChangePen fine" |
| 710 | Name="Thick pen" String="Thick" String="Pen" Command="ChangePen bold" |
| 711 | Name="Marker" String="Marker" String="Pen" Command="ChangePen marking" |
| 712 | Name="Align text direction" String="Text" String="Orientation" String="Direction"<br>Command="AlignTextDirection" |
| 713 | Name="Handwriting signature registration" String="Signature" String="Registration" Command="RegistSignature" |
| 714 | Name="Handwriting sign in" String=%signature% Command="Signin" |
| 715 | Name="Handwriting sign out" String="Sign" String="Out" Command="Signout" |
| 716 | Name="Change setting" String="Setting" String="Change" Command="ConfigSettings" |

FIG.11B

| EXAMPLE OF SYSTEM DEFINITION DATA |
|---|
| 704 username="taro.tokkyo" |
| 705 password="x2PDHTyS" |
| 706 machinename="My-Machine" |

FIG.12

| EXAMPLE OF OPERATION COMMAND DEFINITION DATA (CASE WITH SELECTABLE OBJECT) | |
|---|---|
| Name="DELETE" Group="Edit" Command="Delete" | 707 |
| Name="MOVE" Group="Edit" Command="Move" | 707 |
| Name="ROTATE" Group="Edit" Command="Rotate" | 707 |
| Name="SELECT" Group="Edit" Command="Select" | 707 |
| Name="THICK" Group="Decorate" Command="Thick" | 708 |
| Name="THIN" Group="Decorate" Command="Thin" | 708 |
| Name="LARGE" Group="Decorate" Command="Large" | 708 |
| Name="SMALL" Group="Decorate" Command="Small" | 708 |
| Name="UNDERLINE" Group="Decorate" Command="Underline" | 708 |

FIG.13

| | |
|---|---|
| | EXAMPLE OF USER DEFINITION DATA |
| 717 | AccountId="1" AccountUsername="鈴木" AccountPassword="" SignatureId="1" username="ichiro.suzuki" password="DG9wEvda" machinename="whiteboard" |
| 718 | Name="NAME" Data=%AccountName% |
| | Name="PASSWORD" Data=%AccountPassword% |
| | Name="PASSWORD" Data=%AccountPassword% |
| | Name="FOLDER USER NAME" Data=%username% |
| | Name="FOLDER PASSWORD" Data=%password% |
| | Name="FOLDER FILE NAME" Data=%machinename% |

FIG.14

| EXAMPLE OF HANDWRITING SIGNATURE DATA |
|---|
| SignatureId="1" Data="xx,xx,xx,xx,...,xx" |
| SignatureId="2" Data="xx,xx,xx,xx,...,xx" |

FIG.15

| | EXAMPLE OF HANDWRITING INPUT STORAGE |
|---|---|
| 801 | DataId="1" Type="Stroke" PenId="1" Color="Black" Width="1 px" Pattern="Solid" Angle="0 dig" StartPoint="x1,y1" StartTime="yyyy-mm-ddThh:mm:ss.sss+09:00" EndPoint="xn,yn" EndTime="yyyy-mm-ddThh:mm:ss.sss+09:00" Point="x1,y1,x2,y2,x3,y3,...,yn,yn" Pressure="p1,p2,p3,...pn" |
| 802 | DataId="2" Type="Stroke" PenId="1" Color="Black" Width="1 px" Pattern="Solid" Angle="0 dig" AccountID="1" StartPoint="x1,y1" StartTime="yyyy-mm-ddThh:mm:ss.sss+09:00" EndPoint="xn,yn" EndTime="yyyy-mm-ddThh:mm:ss.sss+09:00" Point="x1,y1,x2,y2,x3,y3,...,yn,yn" Pressure="p1,p2,p3,...pn" |
| 803 | DataId="3" Type="Group" PenId="2" Color="Black" Width="1 px" Pattern="Solid" Angle="90 dig" StartPoint="x1,y1" StartTime="yyyy-mm-ddThh:mm:ss.sss+09:00" EndPoint="xn,yn" EndTime="yyyy-mm-ddThh:mm:ss.sss+09:00" DataId="1" DataId="2" |
| 804 | DataId="4" Type="Text" PenId="3" Color="Black" Width="10 px" Pattern="Solid" Angle="180 dig" StartPoint="x1,y1" StartTime="yyyy-mm-ddThh:mm:ss.sss+09:00" EndPoint="xn,yn" EndTime="yyyy-mm-ddThh:mm:ss.sss+09:00" FontName="IPA Gothic" FontSize="50.0 pt" Text="What you dream" |
| 805 | DataId="5" Type="Text" PenId="4" Color="Black" Width="1 px" Pattern="Solid" Angle="270 dig" AccountID="1" StartPoint="x1,y1" StartTime="yyyy-mm-ddThh:mm:ss.sss+09:00" EndPoint="xn,yn" EndTime="yyyy-mm-ddThh:mm:ss.sss+09:00" FontName="IPA Gothic" FontSize="10.0 pt" Text="I want to be an innovator" |

FIG.16A

| | EXAMPLE OF CONTROL DATA |
|---|---|
| 901 | PenId=“1” Color=“Black” Width=“1 px” Pattern=“Solid”” Angle=“0 dig” AccountID=“1” |
| 902 | PenId=“2” Color=“Black” Width=“1 px” Pattern=“Solid” Angle=“90 dig” |
| 903 | PenId=“3” Color=“Black” Width=“10 px” Pattern=“Solid” Angle=“180 dig” |
| 904 | PenId=“4” Color=“Black” Width=“10 px” Pattern=“Dot” Angle=“270 dig” |

562

| | | |
|---|---|---|
| NAME | 鈴木 | 562a |
| PASSWORD | | 562b |
| FOLDER USER NAME | ichiro.suzuki | 562c |
| FOLDER PASSWORD | ******** | 562d |
| FOLDER FILE NAME | whiteboard | 562e |
| REGISTRATION OR CANCELLATION | ここに✓または×を書いてください | 562f |

100

HANDWRITING INPUT APPARATUS, HANDWRITING INPUT METHOD, PROGRAM, AND INPUT SYSTEM

CROSS-REFERENCE TO RELATED APPLICATIONS

The present application claims priority under 35 U.S.C. § 119 to Japanese Patent Application No. 2019-075826, filed on Apr. 11, 2019 and Japanese Patent Application No. 2020-034338, filed on Feb. 28, 2020. The contents of which are incorporated herein by reference in their entirety.

BACKGROUND OF THE INVENTION

Field of the Invention

The present invention relates to a handwriting input apparatus, handwriting input method, program, and input system.

Description of the Related Art

In common computer-controlled whiteboard devices or applications capable of inputting by handwriting (hereinafter, referred to as handwriting input apparatus), input means are limited to pens or fingers. For this reason, an operation menu is prepared so that a user can switch an edit function such as a pen function of changing the color of characters and an edit function of deleting characters are available to the user. Normally, color, thickness, etc. can be selected in the pen function menu, and delete, move, change, rotate, cut, copy, paste, etc. can be selected in an edit function menu (see, for example, Japanese Unexamined Patent Application No. 2018-026185).

Japanese Unexamined Patent Application No. 2018-026185 discloses a handwriting input apparatus in which menus of color setting, transparency setting, thickness setting, line type setting, stamp setting, and operation setting are displayed by pressing the pen button.

SUMMARY OF THE INVENTION

According to a first aspect of the invention, there is provided a handwriting input apparatus that displays stroke data handwritten based on a position of an input unit contacting a touch panel, including circuitry configured to implement a handwriting recognition control unit for recognizing stroke data and converting the stroke data into text data, and an authentication control unit for authenticating a user based on the stroke data; and a display unit for displaying a display component for receiving a signature together with the text data when the authentication control unit determines that a user has been successfully authenticated.

BRIEF DESCRIPTION OF THE DRAWINGS

FIG. 7 illustrates an example of defined control data.

FIG. 8 illustrates an example of dictionary data of a handwriting recognition dictionary unit.

FIG. 9 illustrates an example of dictionary data of a character string conversion dictionary unit.

FIG. 10 illustrates an example of dictionary data of a prediction conversion dictionary unit.

FIGS. 11A and 11B illustrate an example of operation command definition data and system definition data held by an operation command definition block.

FIG. 12 illustrates an example of operation command definition data when there is a selection object selected by a handwriting object.

FIG. 13 illustrates an example of user-defined data held by an operation command definition unit.

FIG. 14 illustrates an example of handwriting signature data held by a handwriting signature data storage unit.

FIG. 15 illustrates an example of handwriting input storage data saved in a handwriting input storage unit.

FIGS. 16A and 16B illustrate pen ID control data saved in a pen ID control data storage unit.

DESCRIPTION OF THE EMBODIMENTS

There has been a problem with a conventional handwriting input apparatus in which signing in is not easy. Said differently, in order for a user to sign in to a handwriting input apparatus, for example, many operations have to be performed, a user name and password are not easily entered, and special hardware such as an IC card reader is required.

Hereinafter, as an example of an embodiment of the present invention, a handwriting input device and a handwriting input method performed by the handwriting input device will be described with reference to the drawings.

First Embodiment

<Comparative Example of Handwriting Input Apparatus>

For the sake of convenience of the description of the handwriting input apparatus according to this embodiment, a comparative example of signing in the handwriting input apparatus will be briefly described.

Figure 1A:
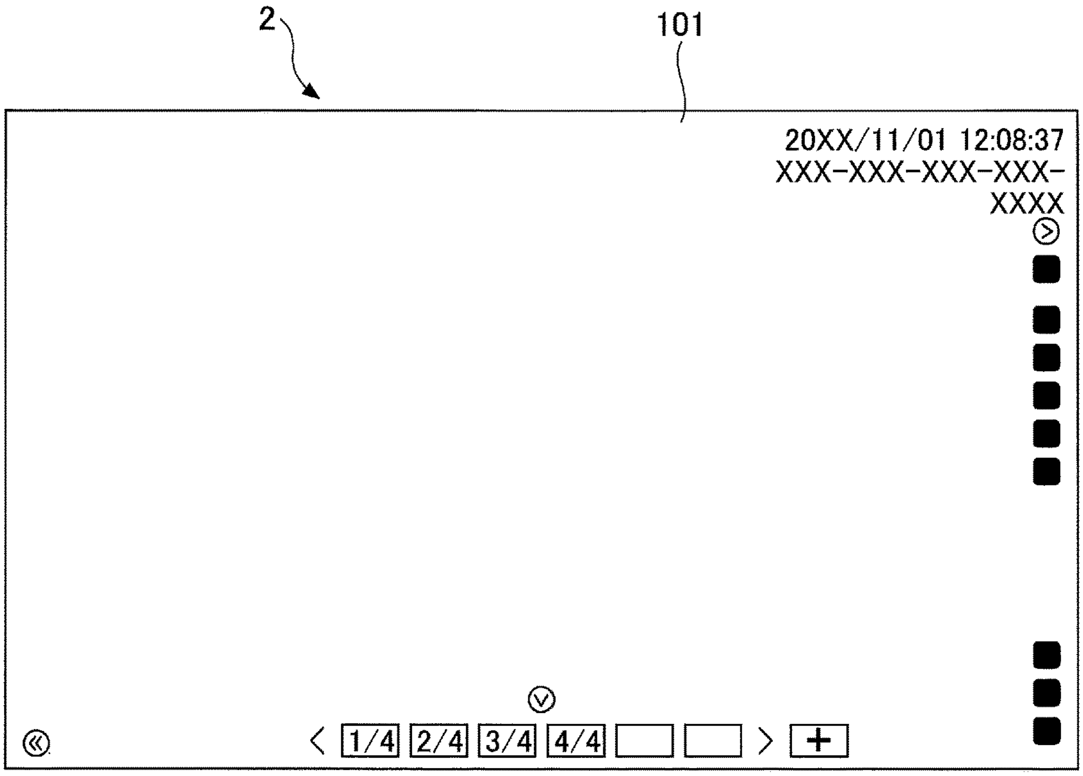
FIGS. 1A, 1B, and 1C are diagrams illustrating a comparative example of a sign-in operation method when a user signs in a handwriting input apparatus.
Figure 1B:
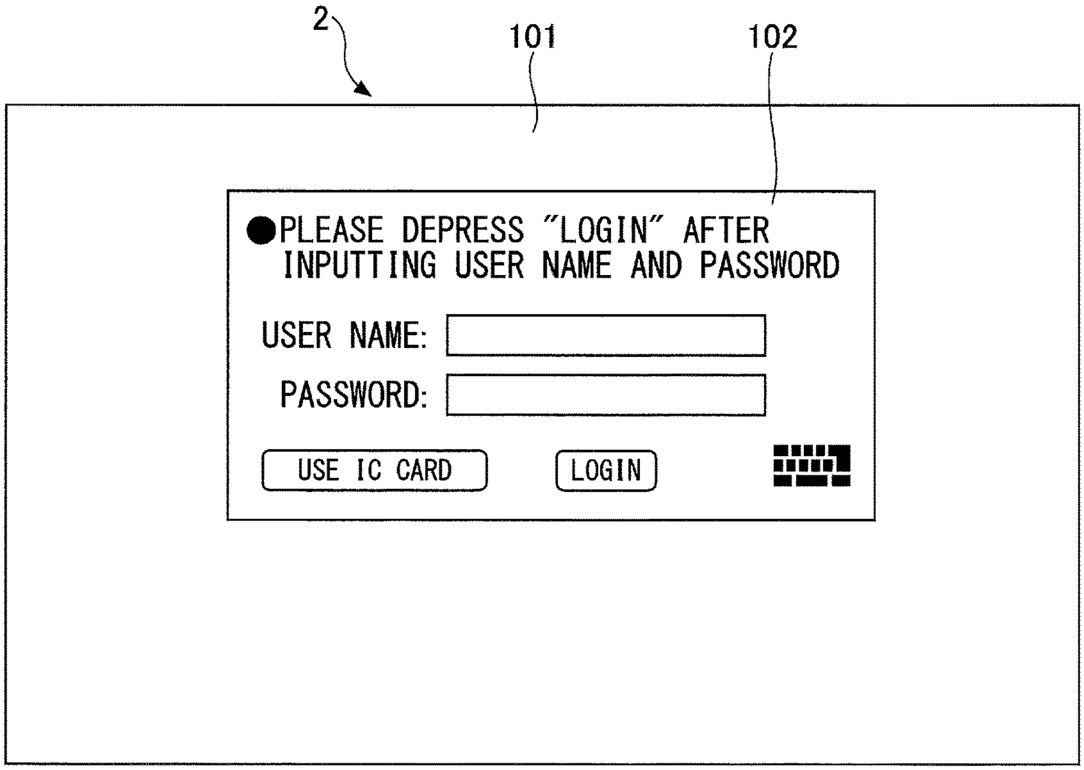
Figure 1C:
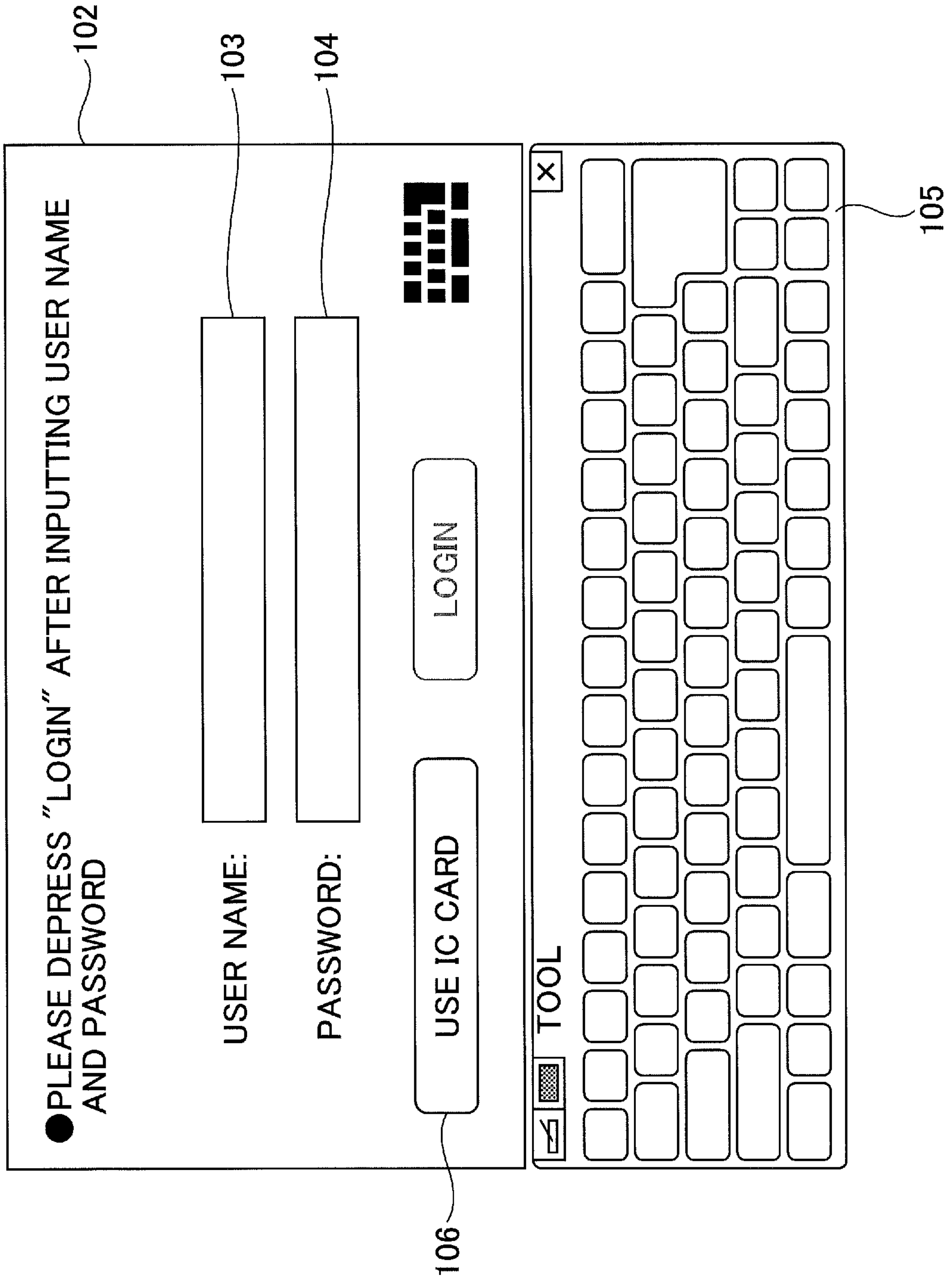

FIGS. 1A, 1B, and 1C illustrate a comparative example of a sign-in operation method when a user signs in a handwriting input apparatus 2. FIG. 1A illustrates the operation screen 101 of the display. FIG. 1B illustrates a sign-in screen 102. FIG. 1C illustrates an enlarged view of a sign-in screen 102 and a soft keyboard 105. The sign-in screen 102 includes a user name entry field 103 and a password entry field 104. If the user name and password combination entered by a user are registered in the handwriting input apparatus 2, the handwriting input apparatus 2 can be used in a state where the authentication is successful and the user identified.

A pen is an accessory of the handwriting input apparatus 2. Characters, numbers, symbols, alphabets (hereinafter, simply referred to as "characters, etc.") and the like can be handwritten using the pen. However, at a time of signing in, the user needs to depress the user name entry field 103 and the password entry field 104 by operating the soft keyboard 105 displayed on the operation screen 101. The soft keyboard 105 is an input device that can easily hit the keys with both hands facing downward, and is not designed to make it easier to depress each key of the soft keyboard 105 displayed on the operation screen 101 with the pen. That is, the soft keyboard 105 is merely an imitation of the actual keyboard so as to enable the user to conduct a key input even in a device without a keyboard.

Because the soft keyboard 105 displayed on the operation screen 101 is difficult to use, the user can sign in using the IC card as illustrated in FIG. 1C. The user can only sign in by depressing a "Use IC Card" button 106 and holding the IC card down to the IC card reader. If a company has already introduced an IC card, it will be possible to sign in using the IC card simply by installing an IC card reader. However, because the IC card holds data that differ from company to company, introducing a new IC card at a company that has introduced a telework system will cost a great amount of money.

In the handwriting input apparatus 2, it is only necessary to use the fact that the characters or the like can be handwritten and sign in by handwriting with the pen, but it is necessary to perform extra operations such as having the user display a special frame for handwriting to sign in. In other words, the user could not handwrite without distinguishing between inputting characters etc. and inputting handwriting signatures.

<Outline of Signing in to the Handwriting Input Apparatus According to this Embodiment>

Therefore, the handwriting input apparatus 2 according to this embodiment authenticates the user using the user name or the like written indifferently from the input of a character or the like. Stroke data for users to sign in, such as user names, are called handwriting signature data. The user can sign in by handwriting the user name, without needing any operation to sign in, as in the case of handwriting.

Figure 2A:
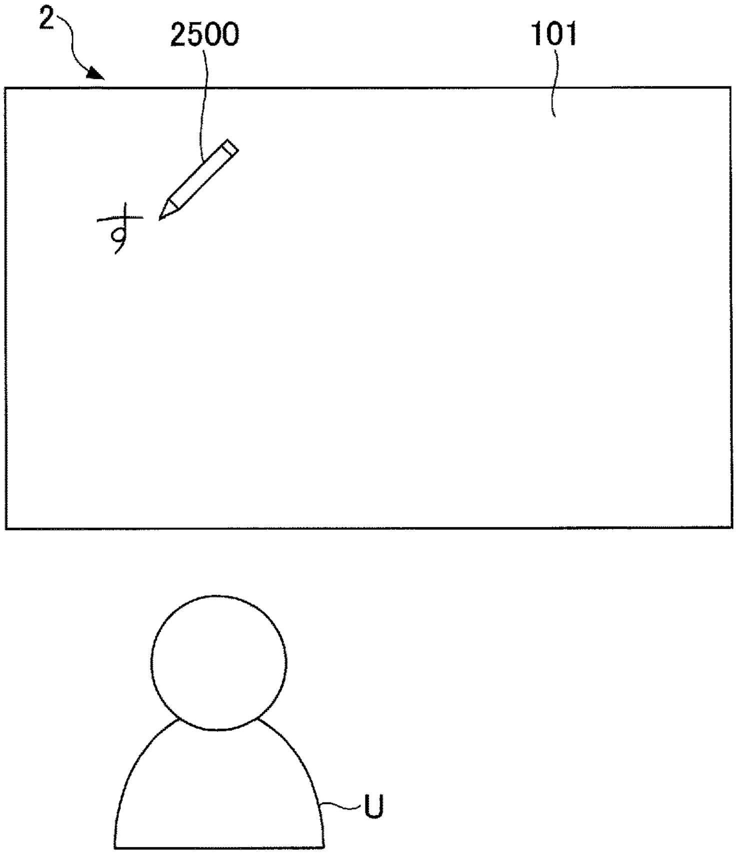
FIGS. 2A and 2B are diagrams illustrating a schematic view of a sign-in to a handwriting input apparatus.
Figure 2B:

FIGS. 2A and 2B are a diagram illustrating a schematic diagram of a signing in to the handwriting input apparatus 2 according to this embodiment. FIG. 2A illustrates the operation screen 101. First, when the user signs in, the user name is handwritten on the operation screen 101. Similar to a case where the handwriting of an arbitrary character, the user name is handwritten, and there is no need to enter an issue indicating a sign-in operation is to be done or display a sign-in screen. Handwriting signature data are previously registered in the handwriting input apparatus 2.

FIG. 2B illustrates an example of an operation guide 500. When the user starts handwriting, the handwriting input apparatus 2 displays an operation guide 500 below a handwriting object 504. In FIG. 2B, the user name being the Japanese character corresponding to "Suzuki" is the handwriting object 504.

Further, one or more of the selectable candidates 530 are displayed in the operation guide 500. In FIG. 2B, an operation command 512 (an example of a display component) and a character string candidate 539 (handwriting recognition character string/language character string candidate, conversion string candidate, and character string/prediction conversion candidate, described later) are displayed in the selectable candidate 530. In the character string candidate 539, four candidates are listed from up to down. The first one is Japanese Hiragana character string pronounced "suzuki" indicating the surname. The second one is Japanese Katakana character string pronounced "suzuki" indicating the surname. The third one is Japanese Kanji character string pronounced "suzuki" indicating the surname. The fourth one is Japanese Kanji character string pronounced "suzuki tarou" indicating the full name". The operation command 512 is an operation command for "signing in by handwriting" and is displayed upon successful authentication of the user's handwriting stroke data of the Japanese character corresponding to "Suzuki (translated from Japanese into English)" in the handwriting object 504 conforming to previously registered handwriting signature data. Said differently, it is displayed when the user authentication is successful. When the user depresses the operation command 512 with a pen 2500 or the like, the user can sign in to the handwriting input apparatus 2. If user authentication is unsuccessful, the result of the recognition of the handwriting object 504 is displayed.

In the handwriting input apparatus 2, various other operation commands are provided in the operation command 512. The corresponding operation commands are displayed when the converted text data from the handwriting stroke data partly coincide (coincide in part or in whole) with the character string for calling the previously registered operation command. That is, the user may invoke an operation command 512 for signing in by handwriting in the same manner as when calling other operation commands.

As described above, the handwriting input apparatus 2 according to this embodiment can be handwritten by the user without distinguishing between an input of characters or the like and an input of a handwriting sign, and can be handwritten by the user without distinguishing between various operation commands and the operation command 512 for signing in.

In addition, the handwriting input apparatus 2 according to this embodiment does not use a soft keyboard on the screen, does not add special hardware such as an IC card, and is capable of user authentication by only handwriting intuitively by a user.

<Terminology>

The input unit may be a unit that can be handwritten on a touch panel. An example includes a pen, a human finger, and hand, and rod-like member. In addition, eye-gaze tracking may be possible.

Stroke data are freely handwritten lines. The stroke data have a set of successive points and may be interpolated as appropriate.

An operation command is a command that instructs the execution of a specific process prepared to operate the handwriting input apparatus 2. In this embodiment, for example, an editing system, the modification system, the input/output system, and the operation commands in the pen state are exemplified. However, all commands that operate the handwriting input apparatus 2, such as reversed screen, page switching, and setting of the operation mode, are targeted.

Handwriting signature data are stroke data for signing in by handwriting. As long as the stroke data are registered in the handwriting signature data storage unit, the stroke data are not limited to the user name.

The terminology of sign-in means an input of information indicating an identity of a person into a computer to request for a connection or start of use.

If the input information coincides with the identity saved on the computer, the computer is enabled to be used based on predetermined authorization. The sign-in is also called login or logon.

The display component for accepting the sign-in may be a soft key displayed for accepting the sign-in, and may be not limited to an operation command, but may be an icon, a button, or the like.

<Example of Appearance of Pen>

Figure 3:
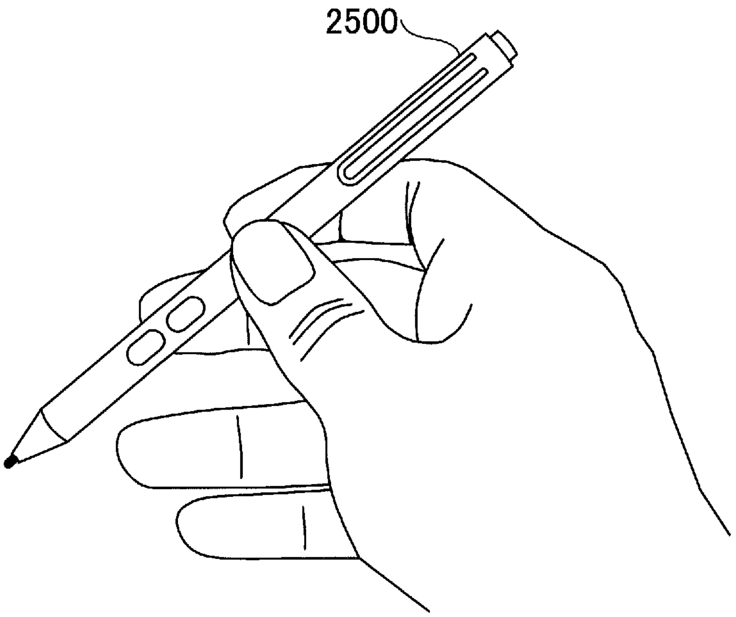
FIG. 3 illustrates an example of a perspective view of a pen.

FIG. 3 illustrates an example of a perspective view of a pen 2500. The pen 2500 illustrated in FIG. 3 is multifunctional, for example. The pen 2500, which has a built-in power supply and can send instructions to the handwriting input apparatus 2, is called an active pen (a pen without a power supply is called a passive pen). The pen 2500 of FIG. 3 has one physical switch on the tip of the pen, one on the butt of the pen, and two on the side of the pen. The tip of the pen is for writing, the butt of the pen is for deleting, and the side of the pen is for assigning user functions. In this embodiment, the pen has a non-volatile memory and saves a pen ID that does not duplicate that of another pen.

Further, the operation procedure of the handwriting input apparatus 2 for the user can be reduced by using the pen with the switch. The pen with the switch mainly refers to an active pen. However, a passive pen without a built-in power supply using an electromagnetic induction mode can generate power only with a LC circuit. Therefore, not only the active pen but also the passive pen with the electromagnetic induction mode are applicable. A pen with an optical, infrared, or capacitance mode switch other than an electromagnetic induction mode switch is the active pen.

The hardware configuration of the pen 2500 is the same as that in an ordinary control method including a communication function and a microcomputer. The pen 2500 may be an electromagnetic induction type, an active electrostatic coupling type, or the like. It may also have functions such as a pencil pressure detection, tilt detection, and hover function (displaying a cursor before the pen touches).

<Overall Configuration of Handwriting Input Apparatus>

Figure 4A:
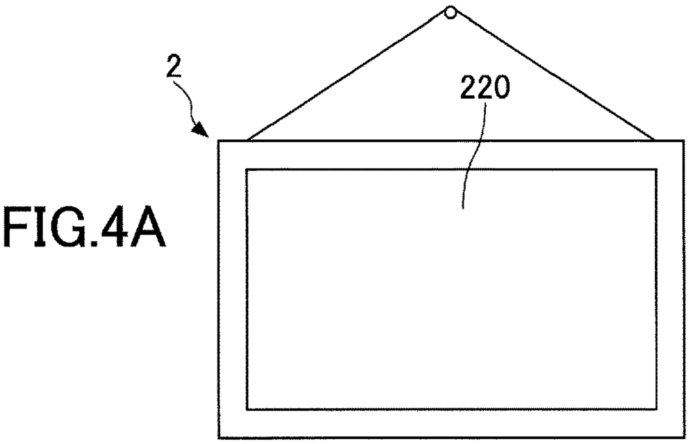
FIGS. 4A, 4B, 4C, and 4D illustrate an example of an overall configuration of a handwriting input apparatus.
Figure 4D:
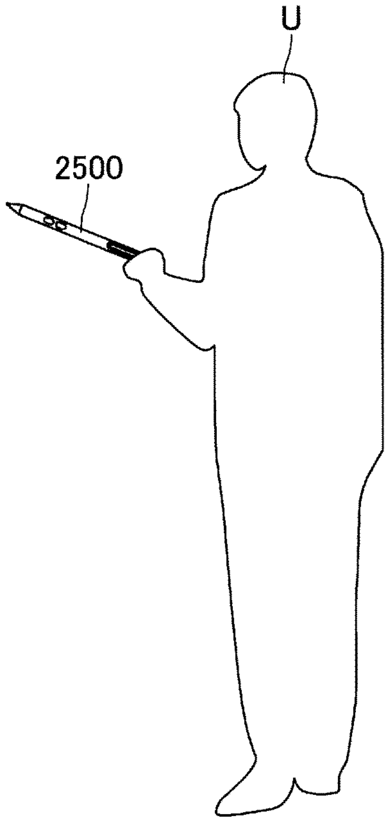
Figure 4B:
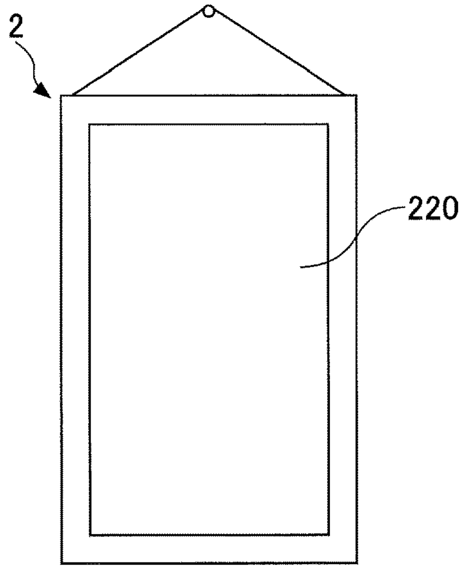
Figure 4C:
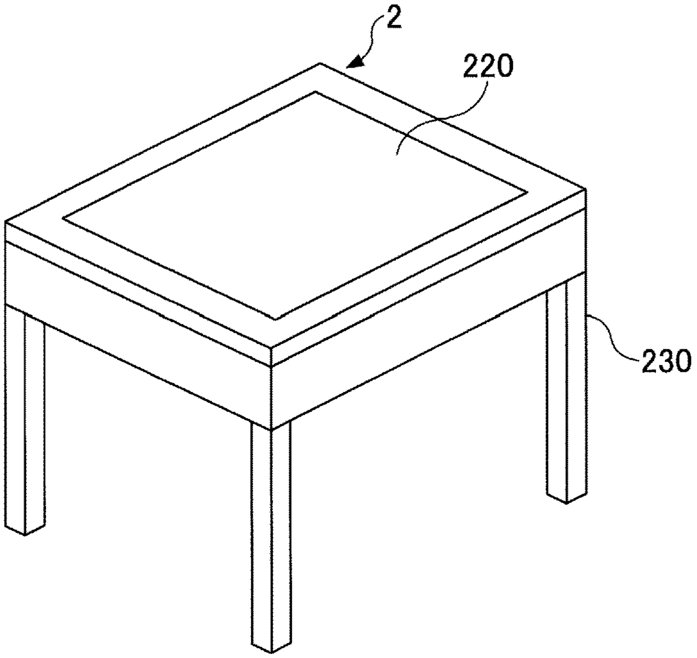

An overall configuration of the handwriting input apparatus 2 according to this embodiment will be described with reference to FIGS. 4A, 4B, 4C, and 4D. FIG. 4A to 4C are diagrams illustrating an overall configuration of the handwriting input apparatus 2. For example, FIG. 4A illustrates the handwriting input apparatus 2 used as an electronic blackboard having a horizontal length suspended on a wall.

As illustrated in FIG. 4A, a display 220 as an example of a display device is installed on the handwriting input apparatus 2. As illustrated in FIG. 4D, the user U may manually write characters or the like on the display 220 (also referred to as input or drawing) using the pen 2500.

FIG. 4B illustrates a handwriting input apparatus 2 used as a vertically-lengthwise electronic blackboard suspended in a wall.

FIG. 4C illustrates a handwriting input apparatus 2 positioned flat on a desk 230. Because the handwriting input apparatus 2 is about 1 cm thick, it is not necessary to adjust the height of the desk even if it is placed flat on an ordinary desk. It can also be easily moved.

<Hardware configuration of handwriting input apparatus>

Figure 5:
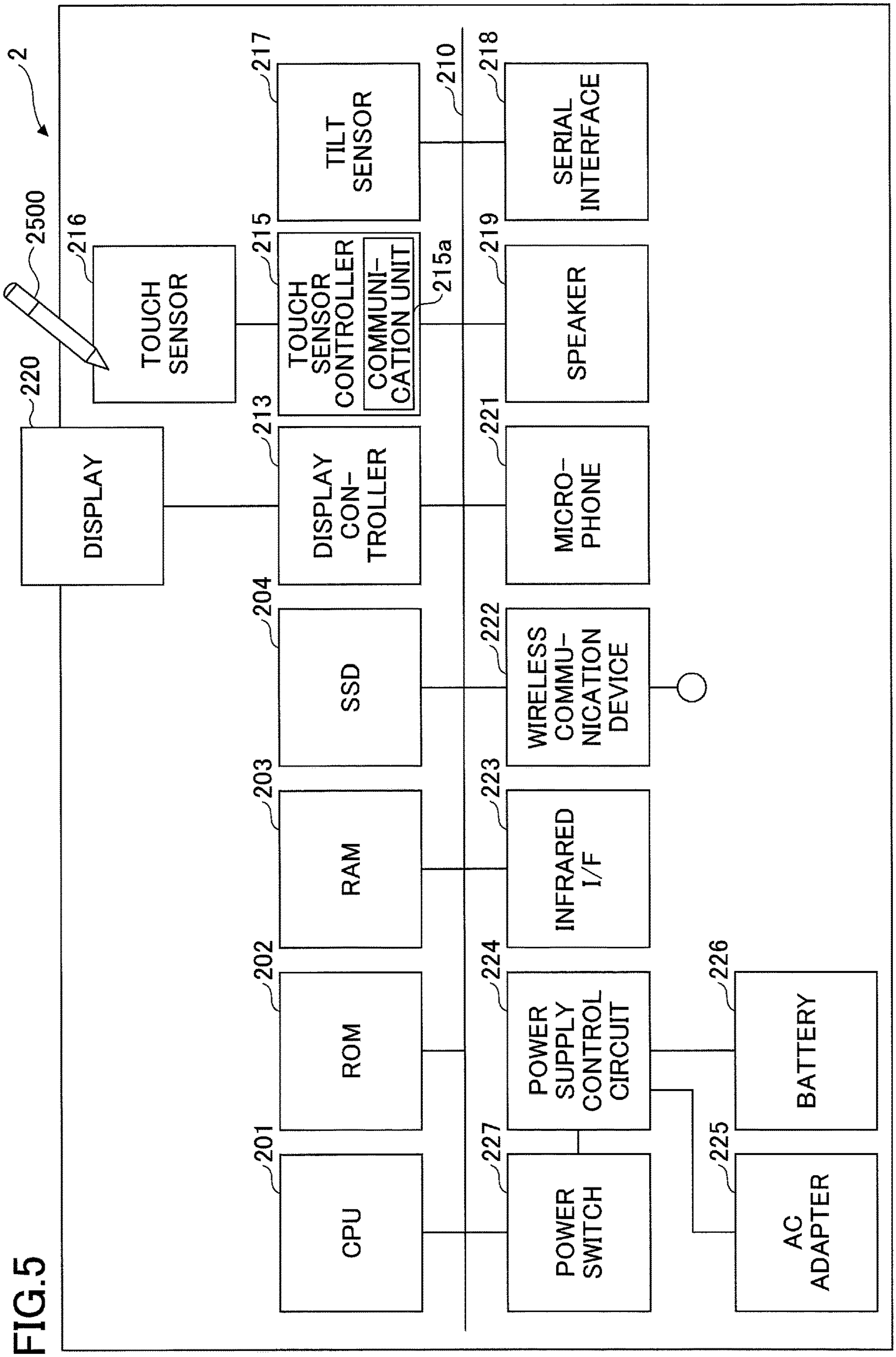
FIG. 5 is an example of a hardware configuration diagram of a handwriting input apparatus.

Subsequently, the hardware configuration of the handwriting input apparatus 2 will be described with reference to FIG. 5. The handwriting input apparatus 2 has an information processing device or computer configuration as illustrated. FIG. 5 is an example of a hardware configuration diagram of the handwriting input apparatus 2. As illustrated in FIG. 5, the handwriting input apparatus 2 includes a CPU (Central Processing Unit) 201, ROM (Read Only Memory) 202, RAM (Random Access Memory) 203, and SSD (Solid State Drive) 204.

From among these, the CPU 201 controls the operation of the entire handwriting input apparatus 2. The ROM 202 saves programs used to drive the CPU 201 and an IPL (Initial Program Loader). The RAM 203 is used as a work area of the CPU 201. The SSD 204 saves various data such as a program for the handwriting input apparatus 2.

The handwriting input apparatus 2 includes a display controller 213, a touch sensor controller 215, a touch sensor 216, a display 220, a power switch 227, a tilt sensor 217, a serial interface 218, a speaker 219, a microphone 221, a wireless communication device 222, an infrared I/F 223, a power supply control circuit 224, an AC adapter 225, and a battery 226.

The display controller 213 controls and manages the screen display to output an output image to the display 220 or the like. The touch sensor 216 detects that the pen 2500 or user's hand or the like (the pen or user's hand works as an input unit) is in contact with the display 220. The touch sensor 216 also receives a pen ID.

The touch sensor controller 215 controls processing of the touch sensor 216. The touch sensor 216 provides an input and detection of coordinates. A method for detecting the input and coordinates of this coordinate is, for example, a method in which two light emitting and receiving devices located at the upper and lower ends of the display 220 emit a plurality of infrared rays parallel to the display 220 and are reflected by a reflecting member provided around the display 220 to receive light returning on the same optical path as the light emitted by the light receiving element. The touch sensor 216 outputs the position information of infrared rays emitted by the two light emitting and receiving devices blocked by an object to the touch sensor controller 215, and the touch sensor controller 215 specifies the coordinate position that is the contact position of the object. The touch sensor controller 215 also includes a communication unit **215*a* that can communicate wirelessly with the pen 2500. For example, a commercially available pen may be used when communicating in a standard such as Bluetooth ("Bluetooth" is a registered trademark). When one or more pens 2500 are registered in the communication unit 215*a* in advance, the user can communicate with the handwriting input apparatus 2 without performing connection setting that causes the pen 2500 to communicate with the handwriting input apparatus 2**.

The power switch 227 is a switch for switching the power of the handwriting input apparatus 2 ON/OFF. The tilt sensor 217 is a sensor that detects the tilt angle of the handwriting input apparatus 2. Mainly, the handwriting input apparatus 2 is used to detect whether the handwriting input apparatus 2 is used in the installation state of FIG. 4A, FIG. 4B, or FIG. 4C, and the thickness of the letters or the like can be automatically changed depending on the installation state.

The serial interface 218 is a communication interface with an external device such as a USB. The serial interface 218 is used for input of information from external sources. The speaker 219 is used for audio output and the microphone 221 is used for audio input. The wireless communication device 222 communicates with a terminal carried by the user and relays, for example, a connection to the Internet. The wireless communication device 222 communicates via Wi-Fi, Bluetooth ("Bluetooth" is a registered trademark), or the like, but a communication standard is not specifically required. The wireless communication device 222 forms an access point and can be connected to the access point when the user sets the SSID (Service Set Identifier) and the password to the terminal that the user carries.

The wireless communication device 222 is preferably provided with two access points as follows.

a. Access point the Internet b. Access point Internal network the Internet

The access point a is for external users, and these users cannot access the internal network, but can use the Internet. The access point b is for internal users, and these users can use the internal network and the Internet.

The infrared I/F 223 detects the adjacent handwriting input apparatus 2. The adjacent handwriting input apparatus 2 can be detected using the rectilinear propagation of the infrared ray. Preferably, the infrared I/F 223 is preferably provided one by one on each side, and it is possible to detect which direction of another handwriting input apparatus 2 is disposed with respect to the handwriting input apparatus 2. The neighboring handwriting input apparatus 2 can display handwriting information (handwriting information on another page with the size of one display 220 being one page) that has been handwritten in the past.

The power supply control circuit 224 controls the AC adapter 225 and the battery 226 that is a power source for the handwriting input apparatus 2. The AC adapter 225 converts the alternating current shared by the commercial power supply to DC.

In the case of so-called electronic paper, the display 220 consumes little or no power to maintain the image after it has been rendered, so that it can also be driven by the battery 226. As a result, it is possible to use the handwriting input apparatus 2 for an application such as digital signature even in a place where it is difficult to connect a power source, such as an outdoor place.

Further, the handwriting input apparatus 2 includes a bus line 210. The bus line 210 is an address bus, a data bus, or the like for electrically connecting components such as the CPU 201 illustrated in FIG. 5.

The touch sensor 216 is not limited to an optical type. Various detection units may be used, such as a touch panel of an electrostatic capacitance type in which a contact position is specified by sensing a change in capacitance, a touch panel of a resistive film type in which a contact position is specified by a voltage change of two opposing resistive films, and an electromagnetic induction type in which an electromagnetic induction generated when a contact object contacts a display unit is detected and the contact position is specified. The touch sensor 216 may be of a method that does not require an electronic pen to detect the presence or absence of a touch at the tip end. In this case, a fingertip and pen-shaped bar can be used for a touch operation. The pen 2500 needs not be of an elongated pen type.

<Function of Handwriting Input Apparatus>

Figure 6A:
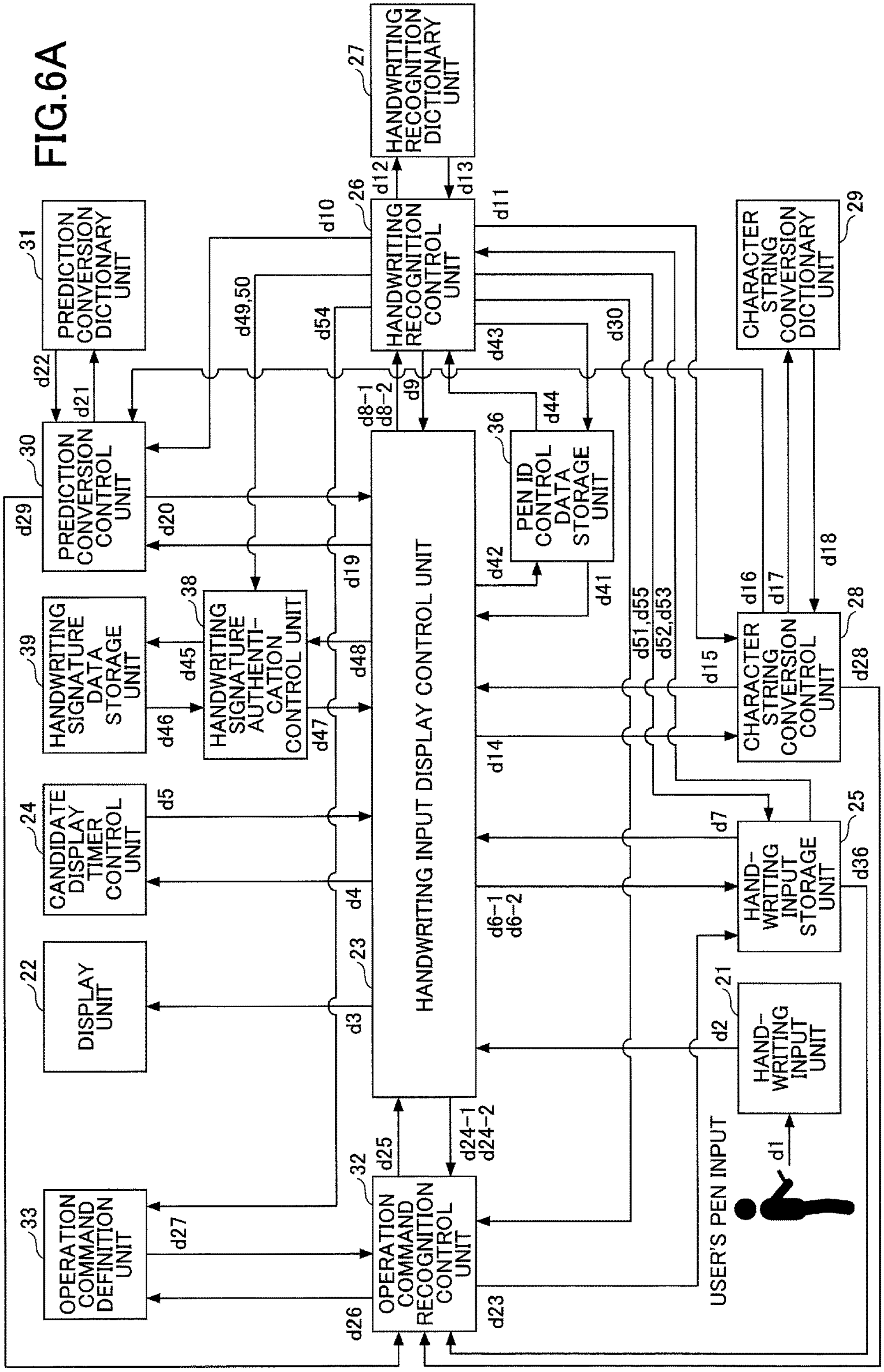
FIGS. 6A and 6B illustrate a function of a handwriting input apparatus and a pen.

Next, a function of the handwriting input apparatus 2 and the pen 2500 will be described with reference to FIGS. 6A and 6B. FIG. 6A is an example of a functional block diagram illustrating functions of the handwriting input apparatus 2 in a block shape. The handwriting input apparatus 2 includes a handwriting input unit 21, a display unit 22, a handwriting input display control unit 23, a candidate display timer control unit 24, a handwriting input storage unit 25, a handwriting recognition control unit 26, a handwriting recognition dictionary unit 27, a character string conversion control unit 28, a character string conversion dictionary unit 29, a prediction conversion control unit 30, a prediction conversion dictionary unit 31, an operation command recognition control unit 32, an operation command definition unit 33, a pen ID control data storage unit 36, a handwriting signature authentication control unit 38, and a handwriting signature data storage unit 39. Each function of the handwriting input apparatus 2 is a function or unit implemented in which one of the components illustrated in FIG. 5 is operated by instructions from the CPU 201 according to a program deployed from the SSD 204 to the RAM 203.

The handwriting input unit 21 is implemented by a touch sensor 216 or the like and receives handwriting input from a user and receives a pen ID. The handwriting input unit 21 converts the user's pen input d1 into pen operation data d2 (pen-up, pen-down, or pen-coordinate data) with the pen ID and transmits the converted data to the handwriting input display control unit 23. The pen coordinate data are transmitted periodically as discrete values, and the coordinates between discrete values are computed so as to be interpolated.

The display unit 22 is implemented by the display 220 or the like to display a handwriting object or an operation menu. The display unit 22 converts the drawing data d3 written in the video memory by the handwriting input display control unit 23 into data corresponding to the characteristics of the display 220 and transmits the converted data to the display 220.

The handwriting input display control unit 23 performs an overall control of handwriting input and display. The handwriting input display control unit 23 processes the pen operation data d2 from the handwriting input unit 21 and displays it by transmitting it to the display unit 22. The processing of the pen operation data d2 and the display of strokes will be described in detail with respect to FIGS. 28 to 34, which will be described later.

The candidate display timer control unit 24 is a display control timer of a selectable candidate. A timing for starting the display of the selectable candidate and a timing for deleting the display of the selectable candidate are generated timing by starting or stopping the timer. The selectable candidate is handwriting recognition character string/language character string candidates, conversion string candidates, character string/prediction conversion candidates, and operation command candidates selectably displayed in the operation guide described later. The candidate display timer control unit 24 receives the timer start request d4 (or the timer stop request may be) from the handwriting input display control unit 23 and transmits the timeout event d5 to the handwriting input display control unit 23.

The handwriting input storage unit 25 has a storage function for storing user data (handwriting object/character string object). The handwriting input storage unit 25 receives the user data d6-1 from the handwriting input display control unit 23 and saves the data in the handwriting input storage unit 25. The handwriting input storage unit 25 receives the acquisition request d6-2 from the handwriting input display control unit 23 and transmits the user data d7 saved in the handwriting input storage unit 25. The handwriting input storage unit 25 transmits the position information d36 of the definitive object to the operation command recognition control unit 32.

The handwriting recognition control unit 26 is an identification engine for performing online handwriting recognition. Unlike the ordinary OCR (Optical Character Reader), in parallel with the user's pen operation, characters (not only in Japanese but also in English and other multilingual languages), numbers, symbols (%, $, &, etc.), and graphics (lines, circles, triangles, etc.) are recognized. Various algorithms have been devised for recognizing methods, but in this embodiment details are omitted as well known techniques are available.

The handwriting recognition control unit 26 receives the pen operation data d8-1 from the handwriting input display control unit 23 and performs handwriting recognition to hold the candidate handwriting recognition character string. The handwriting recognition control unit 26 holds the language character string candidate converted from the handwriting recognition character string candidate d12 using the handwriting recognition dictionary unit 27. Meanwhile, when the acquisition request d8-2 is received from the handwriting input display control unit 23, the handwriting recognition control unit 26 transmits the held handwriting recognition character string candidate and the language character string candidate d9 to the handwriting input display control unit 23.

The handwriting recognition dictionary unit 27 is the dictionary data for the language conversion of the handwriting recognition. The handwriting recognition dictionary unit 27 receives the handwriting recognition character string candidate d12 from the handwriting recognition control unit 26, converts the handwriting recognition character string candidate into a language character string candidate d13 that is linguistically fixed, and transmits the conversion to the handwriting recognition control unit 26. For example, in the case of Japanese, Hiragana is converted into Kanji or katakana.

The character string conversion control unit 28 controls the conversion of the conversion character string candidate into a character string. A conversion string is a character string that is likely to be generated including a handwriting recognition string or a language string. The character string conversion control unit 28 receives the handwriting recognition character string and the language character string candidate d11 from the handwriting recognition control unit 26, converts them into conversion character string candidates using the character string conversion dictionary unit 29, and holds them. When the acquisition request d14 is received from the handwriting input display control unit 23, the holding conversion character string candidate d15 is transmitted to the handwriting input display control unit 23.

The character string conversion dictionary unit 29 is dictionary data for character string conversion. The character string conversion dictionary unit 29 receives the handwriting recognition character string and the language character string candidate d17 from the character string conversion control unit 28 and transmits the conversion character string candidate d18 to the character string conversion control unit 28.

The prediction conversion control unit 30 receives the handwriting recognition character string and the language character string candidate d10 from the handwriting recognition control unit 26, and receives the conversion character string candidate d16 from the character string conversion control unit 28. The prediction conversion control unit 30 converts the handwriting recognition character string, the language character string candidate, and the conversion character string candidate to a prediction character string candidate using the prediction conversion dictionary unit 31. The prediction character string candidate is a character string that is likely to be generated including a handwriting recognition string, a language string or a conversion string. When the acquisition request d19 is received from the handwriting input display control unit 23, the prediction character string candidate d20 is transmitted to the handwriting input display control unit 23.

The prediction conversion dictionary unit 31 is the dictionary data for the prediction conversion. The prediction conversion dictionary unit 31 receives the handwriting recognition character string, the language character string candidate, and the conversion character string candidate d21 from the prediction conversion control unit 30, and transmits the prediction character string candidate d22 to the prediction conversion control unit 30.

The operation command recognition control unit 32 receives the handwriting recognition character string and the language character string candidate d30 from the handwriting recognition control unit 26 and receives the conversion character string candidate d28 from the character string conversion control unit 28. The operation command recognition control unit 32 receives the prediction string candidate d29 from the prediction conversion control unit 30. The operation command recognition control unit 32 transmits the operation command conversion request d26 to the operation command definition unit 33 for the handwriting recognition character string, the language character string candidate, the conversion character string candidate, and the prediction character string candidate, respectively, and receives the operation command candidate d27 from the operation command definition unit 33. The operation command recognition and control unit 32 holds the candidate d27 of the operation command.

When the operation command conversion request d26 partly coinciding with the operation command definition, the operation command definition unit 33 transmits the candidate d27 of the operation command to the operation command recognition control unit 32.

The operation command recognition control unit 32 receives the pen operation data d24-1 from the handwriting input display control unit 23. The operation command recognition control unit 32 transmits the position information acquisition request d23 of the definitive object input in the past to the handwriting input storage unit 25. The operation command recognition control unit 32 holds the definitive object designated by the pen operation data as a selection object (including position information). The operation command recognition control unit 32 specifies the selection object that satisfies the position and predetermined criteria of the pen operation data d24-1. Separately, when the acquisition request d24-2 is received from the handwriting input display control unit 23, the selection object d25 specified as a candidate of the held operation command is transmitted to the handwriting input display control unit 23.

The pen ID control data storage unit 36 holds the pen ID control data (may be referred to as a storage unit). Before the handwriting input display control unit 23 transmits the display data to the display unit 22, the pen ID control data storage unit 36 transmits the pen ID control data d41 to the handwriting input display control unit 23. The handwriting input display control unit 23 draws display data under operation conditions saved in association with the pen ID. Further, before the handwriting recognition control unit 26 executes the handwriting recognition, the pen ID control data storage unit 36 transmits the angle information d44 of the pen ID control data to the handwriting recognition control unit 26, and the handwriting recognition control unit 26 rotates the stroke with the angle information saved in association with the pen ID to execute the handwriting recognition.

After the handwriting recognition control unit 26 recognizes a straight line for setting the angle information when the user manually writes characters or the like, the handwriting recognition control unit 26 transmits the angle information d43 of the pen ID control data to the pen ID control data storage unit 36 to save the angle information d43 corresponding to the pen ID. After the operation command for setting the angle information is executed by the handwriting input display control unit 23, the handwriting input display control unit 23 transmits the pen ID control data d42 to the pen ID control data storage unit 36 and saves the execution result of the operation command (the angle information set by the user) corresponding to the pen ID. Thereafter, the stroke of the pen ID is rotated with the set angle information, and handwriting recognition is performed.

The handwriting recognition control unit 26 transmits the stroke data d49 rotated clockwise by the angle information of the pen ID control data to the handwriting signature authentication control unit 38. This allows authentication of the handwriting signature regardless of the user's position (in which direction it is handwritten to the handwriting input apparatus 2).

The handwriting signature data storage unit 39 holds the handwriting signature data. When the handwriting signature data storage unit 39 receives the handwriting signature data acquisition request d45 from the handwriting signature authentication control unit 38, the handwriting signature data storage unit 39 transmits the handwriting signature data d46 to the handwriting signature authentication control unit 38. The format of the handwriting signature data depends on the algorithm for handwriting signature authentication in the handwriting signature authentication control unit 38. The data of the handwriting signature data storage unit 39 will be described with reference to FIG. 14.

When receiving the stroke data d49 rotating clockwise from the handwriting recognition control unit 26, the handwriting signature authentication control unit 38 transmits the handwriting signature data acquisition request d45 to the handwriting signature data storage unit 39 and the handwriting signature data storage unit 39 transmits the handwriting signature data d46 to the handwriting signature authentication control unit 38.

The handwriting signature authentication control unit 38 authenticates the user based on the handwriting signature data. The various algorithms have been devised for the user authentication based on the handwriting signature data, but in this embodiment, techniques that can be recognized at a recognition rate that does not hinder practical use are used. For example, a feature vector including elements such as a coordinate, brushing pressure, a time for writing a stroke and so on constituting the handwriting signature data are created, and the elements are weighted, and then the feature vector including the registered signature data are compared with the feature vector of the user's handwriting name or the like at the time of signing in are compared. When a coincidence degree is greater than or equal to the threshold value, it is determined as successful authentication. When it is lower than the threshold value, it is determined as unsuccessful authentication.

The handwriting signature authentication control unit 38 holds the authentication result of the handwriting signature that is the result of the comparison between the stroke data d49 and the handwriting signature data d46, and transmits the authentication result d47 of the held handwriting signature to the handwriting input display control unit 23 when the acquisition request d48 is received from the handwriting input display control unit 23. The authentication result of the handwriting signature includes whether the stroke data d49 and the handwriting signature data d46 are considered to coincide with and the Signature Id described later, which is associated with the coinciding handwriting signature data d46, if the stroke data d49 and the handwriting signature data d46 are considered to coincident.

When the handwriting recognition result of the handwriting recognition control unit 26 conforms to the operation command indicating the execution of the handwriting signature registration, the handwriting recognition control unit 26 acquires the data d52 input to the handwriting signature registration form (a frame in which the handwriting signature data are input as described below) from the handwriting input storage unit 25 and transmits the handwriting signature data d50 of the data d52 to the handwriting signature authentication control unit 38. The handwriting signature authentication control unit 38 transmits the received handwriting signature data d50 to the handwriting signature data storage unit 39 to register.

When the handwriting recognition result of the handwriting recognition control unit 26 is executed with the instruction to cancel the handwriting signature or the registration, the handwriting recognition control unit 26 transmits the deletion request d51 of the handwriting signature registration form to the handwriting input storage unit 25 and deletes the handwriting signature registration from the handwriting input storage unit 25.

When the handwriting recognition result, of the handwriting recognition control unit 26 is instructed to execute the user-defined data change, the handwriting recognition control unit 26 acquires the data d53 input to the user-defined data change form from the handwriting input storage unit 25. The handwriting recognition control unit 26 transmits a change value d54 of the data d53 to the operation command definition unit 33 to change the user-defined data. The user-defined data will be described in FIG. 13.

When the handwriting recognition result of the handwriting recognition control unit 26 executes the instruction to cancel or the registration of the user-defined data change form, the handwriting recognition control unit 26 transmits the deletion request d55 of the user-defined data change form to the handwriting input storage unit 25 and deletes the user-defined data change form from the handwriting input storage unit 25.

Figure 6B:
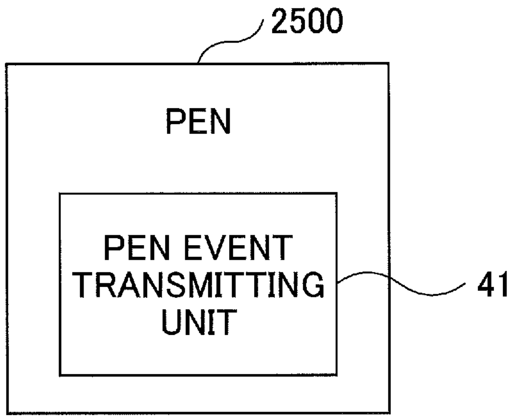

FIG. 6B is a functional block diagram illustrating the function of the pen 2500 in a block shape. The pen 2500 includes a pen event transmitting unit 41. The pen event transmitting unit 41 transmits the pen-up, pen-down, and pen-coordinate event data, to which a pen-ID is attached, to the handwriting input apparatus 2.

<Defined Control Data>

Next, the defined control data used for various processes by the handwriting input apparatus 2 will be described with reference to FIG. 7. FIG. 7 illustrates an example of defined control data. The example of FIG. 7 illustrates the control data for each control item.

A selectable candidate display timer 401 defines the time until the selectable candidate is displayed (one example of the first time). This is because selectable candidates are not displayed during handwriting. In FIG. 7, it is meant that the selectable candidate is displayed unless a pen-down occurs within a TimerValue of 500 ms from the pen-up. The selectable candidate display timer 401 is held by the candidate display timer control unit 24. The selectable candidate display timer 401 is used at the start of the selectable candidate display timer in step S18-2 of FIG. 30, which will be described below.

A selectable candidate deletion timer 402 defines the time until the displayed selectable candidate is deleted (one example of a second time). This is to delete the selectable candidate when the user does not select the selectable candidate. In FIG. 7, the selectable candidate display data are deleted unless the selectable candidate is selected within TimerValue=5000 [ms] from the display of the selectable candidate. The selectable candidate deletion timer 402 is held by the candidate display timer control unit 24. The selectable candidate deletion timer 402 is used at the start of the selectable candidate display deletion timer in step S64 of FIG. 32.

The rectangular area 403 near the handwriting object defines a rectangular area considered to be near the handwriting object. In the example of FIG. 7, the rectangular area 403 near the handwriting object expands the rectangular area of the handwriting object horizontally by 50% of the estimated character size, and vertically expands the vertical rectangular area by 80% of the estimated character size. In the example illustrated in FIG. 7, the estimated character size is specified usiung a percentage (%). However, if the unit is "mm" or the like, the length can be fixed. The rectangular area 403 near the handwriting object is held by the handwriting input storage unit 25. The estimated character size 405 is used in step S10 of FIG. 29 to determine the overlap status of the rectangular area near the handwriting object and the stroke rectangular area.

An estimated writing direction/character size determination condition 404 defines a constant for determining the writing direction and character size measurement direction. In the example of FIG. 7, when the difference between the time when the stroke was added at the beginning of the handwriting object rectangular area and the time when the last stroke was added is MinTime=1000 [ms] or more, and the difference between the horizontal distance (width) and the vertical distance (height) of the handwriting object rectangular area is MinDiff=10 [mm] or more, and the horizontal distance is longer than the vertical distance, the estimated writing direction is "horizontal" and the estimated character size is a vertical distance. If the horizontal distance is shorter than the vertical distance, it means that the estimated writing direction is "vertical" and the estimated character size is the horizontal distance. If the above conditions are not met, the estimated character direction is "horizontal" (DefaultDir="Horizontal") and the estimated character size is a longer distance between the horizontal and vertical distances. The estimation writing direction/character size determination condition 404 is held by the handwriting input storage unit 25. The estimation writing direction/character size determination condition 404 is used in the estimation writing direction acquisition in step S59 of FIG. 32 and in the character string object font acquisition in step S81 of FIG. 34.

Estimated character size 405 defines data for estimating the size of a character or the like. In the example of FIG. 7, it is meant that the estimated character size determined by the estimation writing direction/character size determination condition 404 is compared to the smaller character 405*a* (hereinafter referred to as the minimum font size) of the estimated character size 405 and the larger character 405*c* (hereinafter referred to as the maximum font size). If the estimated character size is smaller than the minimum font size, the estimated character size is determined to be the minimum font size. If the estimated character size is larger than the maximum font size, the estimated character size is determined to be the maximum font size. Otherwise, the character size is determined to be medium character 405*b*. The estimated character size 405 is held by the handwriting input storage unit 25. The estimated character size 405 is used in the string object font acquisition in step S81 of FIG. 34.

Specifically, the handwriting input storage unit 25 uses the font of the closest size when comparing the estimated character size determined by the estimation writing direction/character size determination condition 404 with the FontSize of the estimated character size 405. For example, when the estimated character size is 25 [mm] (FontSize of smaller characters) or less, "smaller character" is used. When the estimated character size is 25 mm or more but 50 mm (FontSize of middle character) or less, "medium character" is used. When the estimated character size is greater than 100 mm (FontSize of larger characters), the "larger character" is used. "Smaller character" 405*a* uses the Mincho type 25 mm font (FontStyle="Mincho type" Font Size="25 mm"), "Medium character" 405*b* uses the Mincho type 50 mm font (FontStyle="Mincho type" Font="50 mm"), and "Larger character" 405*c* uses the Gothic type 100 mm font (FontStyle="Gothic type" Font="100 mm"). If the font size or style type is to be increased, the type of the estimated character size 405 is increased.

A straddle line determination condition 406 defines data used to determine whether multiple objects have been selected. The handwriting object is depicted by a single stroke, and, in the example illustrated in FIG. 7, if the length of the long side of the handwriting object is 100 [mm] or more (MinLenLongSide="100 mm"), the length of the short side is 50 [mm] or less (MaxLenShortSide="50 mm"), and an overlap rate of the longer side and the shorter side with the handwriting object is 80[%] or more (MinOverLapRate="80%"), a plurality of objects are determined to be selected as a selection object. The operation command recognition control unit 32 holds the straddle line determination condition 406. The straddle line determination condition 406 is used in determiinig the selection object in step S50 of FIG. 31.

A surrounding line determination condition 407 defines the data used to determine whether an object is an enclosing line (a surrounding line). In the example of FIG. 7, the operation command recognition control unit 32 determines a definitive object, in which the overlap rate of the long side direction and the short side direction of the handwriting object is 100% or more (MinOverLapRate="100%") as the selection object. The surrounding line determination condition 407 is held by the operation command recognition control unit 32. The surrounding line determination condition 407 is used in a surrounding line determination of determining the selection object in step S50 of FIG. 31.

Both the straddle line determination condition 406 and the surrounding line determination condition 407 may be determined with priority. For example, when the straddle line determination condition 406 is relaxed (when it is made easier to select the straddle line) and the surrounding line determination condition 407 is strictly made (when it is set as a value for which only the surrounding line can be selected), the operation command recognition control unit 32 may give priority to the surrounding line determination condition 407.

<Example of Dictionary Data>

The dictionary data will be described with reference to FIGS. 8 to 10. FIG. 8 is an example of the dictionary data of the handwriting recognition dictionary unit 27. FIG. 9 is an example of the dictionary data of the character string conversion dictionary unit 29. FIG. 10 is an example of the dictionary data of the prediction conversion dictionary unit 31. Incidentally, each of these dictionary data are used in steps S33 to S42 of FIG. 31.

In this embodiment, the conversion result of the dictionary data of the handwriting recognition dictionary unit 27 of FIG. 8 is called a language character string candidate, the conversion result of the dictionary data of the character string conversion dictionary unit 29 of FIG. 9 is called a conversion character string candidate, and the conversion result of the dictionary data of the prediction conversion dictionary unit 31 of FIG. 10 is called a prediction character string candidate. "Before conversion" for each dictionary data indicates the character string to search for the dictionary data, "after conversion" indicates the character string after conversion corresponding to the character string to be searched, and "probability" indicates the probability selected by the user. The probability is calculated from the result of the user selecting each string in the past. Therefore, probability may be calculated for each user. Various algorithms have been devised to calculate the probability, but they may be calculated in an appropriate way, and the details will be omitted. According to this embodiment, a character string candidate from the estimated writing direction is displayed in a selected probability descending order.

In the dictionary data illustrated in FIG. 8 of the handwriting recognition dictionary unit 27, the handwritten Japanese Hiragana characters "gi (as translated from Japanese in "before conversion" of rows 654 to English)" indicate the Japanese Kanji character "gi (as translated from Japanese in "after conversion" in the upper one of the rows 654 to English "meeting")" with a probability of 0.55 and the Japanese Kanji character "gi (as translated from Japanese in "after conversion" in the lower one of the rows 654 to English "tech")" with a probability of 0.45. Further, the handwritten Japanese Hiragana character strings "gishi (as translated from Japanese in "before conversion" of the rows 655 to English)" indicate the Japanese Kanji character string "gishi (as translated from Japanese in "after conversion" in the upper one of the rows 655 to English "tech-nical qualification")" with a probability of 0.55 and the Japanese Kanji character string "gishi (as translated from Japanese in "after conversion" in the lower one of the rows 655 to English "tech-nical engineer")" with a probability of 0.45. The same applies to other character strings in "before conversion". In the column of "before conversion" of FIG. 8, the Japanese character strings are in Japanese Hiragana. However, these character strings may be other than Japanese and Japanese Hiragana. In the column of "after conversion" of FIG. 8, the Japanese character strings are in Japanese Kanji or Katakana. However, these character strings may be other than Japanese, Japanese Kanji, and Japanese Katakana. Similarly, the rows 655 and 656 indicate conversions from the Japanese Hiragana character strings to Japanese Kanji or Katakana character strings with the listed probabilities, as examples.

In dictionary data of the character string conversion dictionary unit 29 illustrated in FIG. 9, the Japanese Kanji character string "gi (as translated from Japanese in "before conversion" in the upper one of rows 657 to English "meeting")" is converted to Japanese Kanji character string "gi-jiroku" corresponding to "meeting minute" with a probability of 0.95. Further, the Japanese Kanji character string "gi (as translated from Japanese in "before conversion" in the lower one of the rows 657 to English "tech")" is converted to Japanese character string "gi-ryoushi" corresponding to "technical skill test" with a probability of 0.85. The same applies to other character strings before conversion. Similarly, the rows 658, 659, and 660 indicate conversions from the Japanese Kanji or Hiragana character strings to Japanese Kanji character strings with the listed probabilities, as examples.

In the dictionary data of the prediction conversion dictionary unit 31 illustrated in FIG. 10, the Japanese Kanji character string "gi-jiroku (as translated from Japanese in "before conversion" in the upper one of rows 661 to English "meeting minute")" is converted to Japanese character string "gi-jirokunosoufusaki" corresponding to English "transmission destination of meeting minute" with a probability of 0.65. Further, the Japanese Kanji character string "gi-ryoushi (as translated from Japanese in "before conversion" in the lower one of the rows 661 to English "technical skill test")" is converted to Japanese character string "gi-ryoushiwokessai" corresponding to "technical skill test is approved" with a probability of 0.85. In the example of FIG. 10, in a manner similar to FIGS. 8 and 9, the rows 661, 662, 663, and 664 indicate conversions from the Japanese Kanji character strings to Japanese Kanji, Hiragana, and/or Katakana character strings with the listed probabilities. All of the character strings before conversion are Japanese Kanji character strings, but a character string other than Kanji character string may be registered. All of the character strings after conversion are Japanese Kanji, Hiragana, and/or Katakana character strings, but a character string other than Japanese such as other languages like Chinese, German, Portuguese, and so on and Japanese Kanji, Hiragana, and/or Katakana character string may be registered.

The dictionary data are language independent, and any character string may be registered before and after conversion.

<Operation Command Definition Data Held by Operation Command Definition Unit>

Next, the operation command definition data used by the operation command recognition control unit 32 will be described with reference to FIGS. 11A, 11B, and 12. FIGS. 11A and 11B illustrate an example of the operation command definition data and the system definition data held by the operation command definition unit 33.

FIG. 11A illustrates an example of operation command definition data. The operation command definition data illustrated in FIG. 11A is an example of the operation command definition data when there is no selection object selected by a handwriting object, and all the operation commands that operate the handwriting input apparatus 2 are targeted. Each of the operation command definition data 701 to 716 illustrated in FIG. 11A have an operation command name (Name), a character string that partly coincides with the character string candidate (String), and an operation command string (Command) to be executed. Referring to FIG. 11A, in the operation command definition data 701, Name=Japanese character strings pronounced in Japanese "gi-jiroku tenpuretowo yomikomu" translated in English as "read meeting minute template"; String=Japanese character strings pronounced in Japanese "gi-jiroku" translated in English as "meeting minute"; and String=Japanese character strings pronounced in Japanese "tenpureito" translated in English as "template". Similarly, in the operation command definition data 702, Name=Japanese character strings pronounced in Japanese "Gi-jikoku forudani hozonnsuru" translated in English as "save in meeting minute folder"; String=Japanese character strings pronounced in Japanese "gi-jiroku" translated in English as "meeting minute"; and String=Japanese character strings pronounced in Japanese "hozon" translated in English as "save". Further, in the operation command definition data 703, Name=Japanese character strings pronounced in Japanese "insatsu suru" translated in English as "print"; String=Japanese character strings pronounced in Japanese "insatsu" translated in English as "printing"; and String=Japanese character strings pronounced in Japanese "purinto" translated in English as "printing". Furthermore, in the operation command definition data 709, Name=Japanese character strings pronounced in Japanese "hosopen" translated in English as "fine pen"; String=Japanese character strings pronounced in Japanese "hoso" translated in English as "fine"; and String=Japanese character strings pronounced in Japanese "pen" translated in English as "pen". Furthermore, in the operation command definition data 710, Name=Japanese character strings pronounced in Japanese "futopen" translated in English as "bold pen"; String=Japanese character strings pronounced in Japanese "futo" translated in English as "bold"; and String=Japanese character strings pronounced in Japanese "pen" translated in English as "pen". Furthermore, in the operation command definition data 711, Name=Japanese character strings pronounced in Japanese "maaka" translated in English as "marker"; String=Japanese character strings pronounced in Japanese "maaka" translated in English as "marker"; and String=Japanese character strings pronounced in Japanese "pen" translated in English as "pen". Furthermore, in the operation command definition data 712, Name=Japanese character strings pronounced in Japanese "tekisutohoukouwo soroeru" translated in English as "align text direction"; String=Japanese character strings pronounced in Japanese "tekisuto" translated in English as "text"; String=Japanese character strings pronounced in Japanese "muki" translated in English as "orientation"; and String=Japanese character strings pronounced in Japanese "houkou" translated in English as "direction". Furthermore, in the operation command definition data 713, Name=Japanese character strings pronounced in Japanese "tegaki sain touroku suru" translated in English as "handwriting signature registration"; String=Japanese character strings pronounced in Japanese "sain" translated in English as "signature"; and String=Japanese character strings pronounced in Japanese "touroku" translated in English as "registration". Furthermore, in the operation command definition data 714, Name=Japanese character strings pronounced in Japanese "tegaki sain suru" translated in English as "handwriting sign in". Furthermore, in the operation command definition data 715, Name=Japanese character strings pronounced in Japanese "tegaki sain auto suru" translated in English as "handwriting sign out"; String=Japanese character strings pronounced in Japanese "sain" translated in English as "signature"; and String=Japanese character strings pronounced in Japanese "auto" translated in English as "out". Furthermore, in the operation command definition data 716, Name=Japanese character strings pronounced in Japanese "settei henkou suru" translated in English as "change setting"; String=Japanese character strings pronounced in Japanese "settei" translated in English as "setting"; and String=Japanese character strings pronounced in Japanese "henkou" translated in English as "change"". "% . . . %" in the operation command string is a variable and is associated with the system definition data as illustrated in FIG. 11B. In other words, "%-%" is replaced by the system definition data illustrated in FIG. 11B.

First, the operation command definition data 701 indicates that the name (Name) of the operation command is "Gi-jiroku tenpuretowo yomikomu" translated in English as "Read meeting minute template", the character string that partly coincides with the character string candidate is "meeting minute" or "template", and the operation command string to be executed is "ReadFile https://%username%:%password%@server.com/templates/minute.pdf". In this example, "% . . . %" system definition data are included in the operation command string to be executed, and "% username%" and "% password %" may be replaced by system definition data 704 and 705, respectively. Therefore, the final operation-command string is "ReadFile https://taro.tokkyo:x2PDHTyS@server.com/template/minute.pdf", indicating that the file "https://taro.tokkyo:x2PDHTyS@server.com/minute.pdf" is read (ReadFile).

The operation command definition data 702 indicates that the name (Name) of the operation command is "Gi-jikoku forudani hozonnsuru" translated in English as "save in meeting minute folder" that the character string that partly coincides with the character string candidate is "minute" or "save", and that the operation command string to be executed is "Write File https:/%username%:%password%@server.com/minute/%machinename%_%yyyyy-mm-dd.pdf". Similar to the operation command definition data 701, "% username %", % password %", and "% machinename %" in the operation command string are replaced by system definition data 704 to 706, respectively. "% yyyy-mm-dd %" is to be replaced by the current date. For example, if the current date is Sep. 26, 2018, it will be replaced by "2018-09-26". The final operation command is "WriteFile https://taro.tokkyo:x2PDHTyS@server.com/mintes/%My-Machine2018-09-26.pdf" and indicate that the minute are to be saved in the file "https://taro.tokkyo:x2PDHTyS@server.com/%minute/%My-Machine2018-09-26.pdf" (WriteFile).

The operation command definition data 703 indicates that the name of the operation command is "to be printed", the character string that partly coincides with the character string candidates is "print" or "printed", and the operation command string to be executed is "PrintFile https:/%username%:%password%@server.com/print/%machiname%-%yyyy-mm-dd%.pdf". If the operation command strings are replaced as in operation command definition data 702, the final operation command to be executed is "PrintFile https://taro.tokkyo:x2PDHTyS@server.com/print/%My-Machine2018-09-26.pdf", indicating that the file "https://taro.tokkyo:x2PDHTyS@server.com/print/%My-Machine2018-09-26.pdf" is printed (PrintFile). That is, the file is sent to the server. The user allows the printer to communicate with the server, and the printer prints the contents of the file on the paper when the file is specified.

As described above, because the operation command definition data 701 to 703 can be identified from the character string candidate, the operation command can be displayed by a user by handwriting. If user authentication is successful, "% username %", % password %" or the like of the operation command definition data will be replaced in the user information, and thus the input and output of the file can be performed in association with the user.

If user authentication is not performed (including the case where authentication fails but the user can use the handwriting input apparatus 2, authentication fails), the handwriting input apparatus 2 replaces the predetermined "% username %", % password %" of the handwriting input apparatus 2. Accordingly, even without user authentication, the input and output of the file corresponding to the handwriting input apparatus 2 is enabled.

The operation command definition data 709, 710, and 711 are operation commands that change the pen state. The pen state can also be referred to as a pen kind. The names ("Name") of the operation command definition data 709, 710, and 711 are "fine pen", "thick pen", and "marker", respectively. The character string ("String") that coincides with the character string candidate is "fine", "pen", "thick", "pen", "marker", or "pen", respectively. The operation command string ("Command") is "ChangePen fine", "ChangePen bold", or "ChangePen marking". When this operation command is executed, the pen state is saved in the pen ID control data storage unit 6, so that the user can handwrite the strokes in the set pen state.

The operation command definition data 712 is an operation command for aligning the orientation of the text data in a constant direction. The operation command name of the operation command definition data 712 is "align the text direction", "orientation" or "direction", and the operation command character string is "AlignTextDirection". Text data written by the user in a direction other than the vertical directions is so sparse in directions that it is difficult to read everything from one direction. When the user executes the operation command definition data 712, the handwriting input apparatus 2 aligns character strings recognized to be handwritten in the same direction (for example, in the vertical directions). In this, the aligning means rotating the text data by angular information.

The operation command definition data 713 indicates that the name of the operation command is "to register with a handwriting signature", the character string that partly coincides with the character string candidate is "signature" and "registration", and the operation command string is "RegisterSignature". When the RegisterSignature command is executed, a handwriting signature registration form is added to the handwriting input storage unit 25 and the handwriting signature registration form is displayed on the operation screen 101. An example of a handwriting signature registration form will be described later (see FIGS. 25A, 25B, and 25C).

The operation command definition data 714 indicate that the operation command name is "%signature %" and the operation command is "Signin" for a character string candidate and a character string at a partial position. Here, "% signature %" is a reserved word for system definition data and represents the fact that the registered handwriting signature data and stroke data such as user name fit. That is, when fitted, an operation command 512 based on the operation command definition data 714 is displayed in the operation guide 500 (see FIGS. 2 and 26).

When the Singin command is executed, saved in the pen ID control data of the pen 2500 that handwrites the stroke data such as the user name is AccountId of the user having the SignatureId of adapting handwriting signature data. This causes the pen ID to associate with the pen ID. Then, the handwriting input apparatus 2 can use the user-defined data specified by this AccountId to be used by the handwriting input apparatus 2 (see FIG. 16A).

The operation command definition data 715 indicate that the operation command name is "handwriting sign out", a character string that partly coincides with the character string candidate is "sign" or "out", and the operation command is "Signout". When the Signout command is executed, AccountId is deleted from the pen ID control data of the pen 2500 that manipulates the handwriting signout. This eliminates the association between the pen ID and AccountId to enable any user to use the pen 2500.

The operation command definition data 716 indicate that the name of the operation command "change setting", the character string that partly coincides with the character string candidate is "set" or "changed", and the operation command is "ConfigSettings". When the ConfigSettings command is executed, the user-defined data change form is added to the handwriting input storage unit 25 and the user-defined data change form is displayed on the operation screen 101. The user-defined data change form is described later (see FIGS. 27A and 27B).

Next, the operation command definition data when a handwriting object is present, namely, the operation command definition data for the editing system and the modification system will be described. FIG. 12 illustrates an example of the operation command definition data when there is a selection object selected by a handwriting object. The operation command definition data of FIG. 12 have an operation command name (Name), a group name (Group) as the operation command candidate, and an operation command string (Command) to be executed.

The operation command definition data 707 defines the operation command of an editing system (Group="Edit"), and is an example of the definition data of the operation commands "Erase", "Move", "Rotate", and "Select" in the editing system. That is, these operation commands are displayed for the selection object and allow the user to select the desired operation command.

The operation command definition data 708 define the operation command of a modification system (Group="Decorate"), and the operation command of the modification system is defined as an example of the operation commands "thick", "thin", "large", "small", and "underline". These operation commands are displayed for the selection object, allowing the user to select the desired operation commands. In addition, a color action command may be displayed.

Accordingly, by the user selecting the selection object with the handwriting object, the operation command definition data 707 and 708 are identified so that the user can manually write to display the operation command.

<User-Defined Data>

Next, user-defined data will be described with reference to FIG. 13. FIG. 13 illustrates an example of user-defined data held by the operation command definition unit 33. The user-defined data in FIG. 13 is an example of the defined data for a single user. "AccountId" in user-defined data 717 is user identification information automatically assigned to each user; "AccountUsername" and "AccountPassword" are user names and passwords; "SignatureId" is identifying information of handwriting signature data automatically assigned at the time of handwriting signature data registration; and "username", "password" and "machinename" are character strings set in operation command definition data 701 to 703 instead of the system definition data 704 to 706, respectively. This allows execution of the operation command using the user-defined data.

In a case where the user handwrites a username and signs in, what is used at a time of executing the operation command is the character string of the user-defined data having AccountId associated with the pen ID of the pen 2500 based on an association among the pen ID, AccountId, and the pen ID control data (see FIG. 16A). After the user has signed out, the character string of the system definition data is used when executing the operation command, even if the pen 2500 that the user has used for signing in is used.

User-defined data 718 are the data used in a user-defined data change form. Name is the item name of AccountUsername, AccountPassword, username, password, or machinename of the user-defined data 717, and data are the change value of AccountUsername, AccountPassword, username, password, or machinename. In this example, the data of "Name" are "% AccountName %", "Password" is "% AccountPassword %", "Folder User Name" is "% username %", "Folder Password" is "% password", and the data for "Folder File Name" is "% machinename", which respectively correspond to items of the user-defined data 717. These items entered in the user-defined data change form are reflected in the user-defined data 717.

<Handwriting Signature Data>

Next, the handwriting signature data will be described with reference to FIG. 14. FIG. 14 illustrates an example of handwriting signature data held by the handwriting signature data storage unit 39. The handwriting signature data include data representing the handwriting signature associated with SignatureId. SignatureId is identification information automatically assigned at the time of registering the handwriting signature data, and Data are calculated by the handwriting signature authentication algorithm of the handwriting signature authentication control unit 38 from the stroke data received from the handwriting signature authentication control unit 38.

<Handwriting Input Storage Data Saved by Handwriting Input Storage Unit>

Next, handwriting input storage data will be described with reference to FIG. 15. FIG. 15 illustrates an example of the handwriting input storage data saved in the handwriting input storage unit 25. One raw in FIG. 15 represents a stroke. One handwriting input storage data have the following items: DataId, Type, PenId, Color, Width, Pattern, Angle, AccountId, StartPoint, StartTime, EndPoint, EndTime, Point, and Pressure.

DataId is identification information of the stroke. Type is a type of the stroke. The type includes Stroke, Group, and Text. The type of the handwriting input storage data 801 and 802 is Stroke, and the type of the handwriting input storage data 803 is Group. Group means making a group of other strokes, and the handwriting input storage data whose type is Group designate the strokes to be the group. PenId, Color, Width, Pattern, Angle, and AccountId are pen ID control data described below. StartPoint is the start point coordinate of the stroke and StartTime is the start time of the stroke. EndPoint is the end point coordinate of the stroke and EndTime is the end time of the stroke. Point is the coordinate column from the start point to the end point, and Pressure is the brush pressure from the start point to the end point. As illustrated in Angle, the handwriting input storage data 804 and 805 are illustrated to be rotated clockwise by 180 degrees and 270 degrees, respectively, before handwriting recognition. The input storage data 802 and 805 indicate that the data are input by the user of AccountId=1 of the user-defined data.

<Pen ID Control Data Saved in Pen ID Control Data Storage Unit>

Figure 16B:
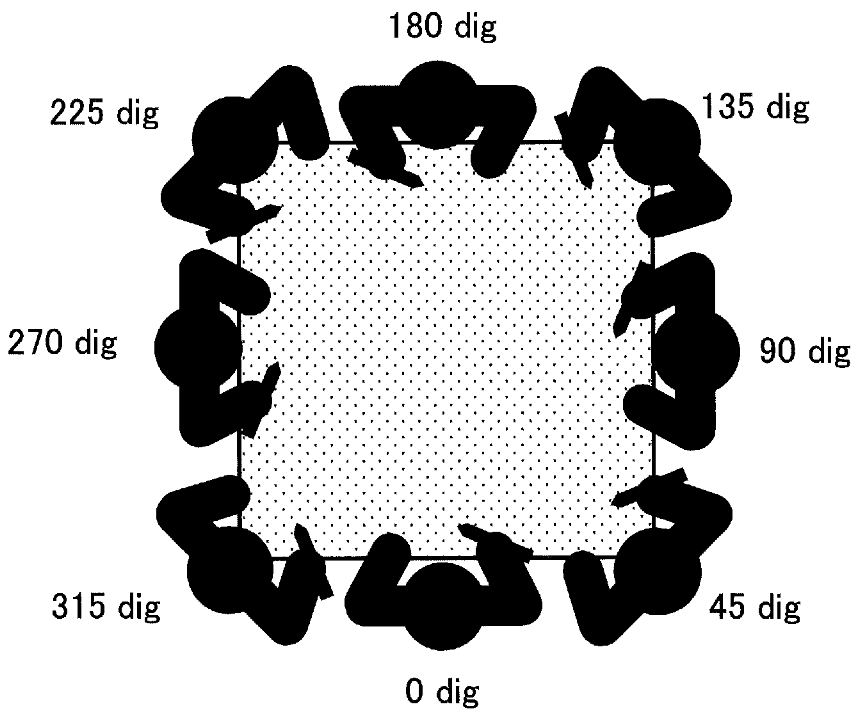

Next, the pen ID control data will be described with reference to FIGS. 16A and 16B. FIGS. 16A and 16B are a diagram for explaining the pen ID control data saved in the pen ID control data storage unit 36. Each row of FIG. 16A indicates one of the pen ID control data of one pen. FIG. 16B is a diagram illustrating angle information when a user handwrites with to the handwriting input apparatus 2. The angle information can be the angle in the direction in which the user is present, the angle in the direction in which the pen is used, or the angle related to the rotation of the character handwritten by the user. With the predetermined direction of the handwriting input apparatus 2 (e.g., the vertical directions) as 0 degrees (the standard), the angular information of each user is 45 degrees, 90 degrees, 135 degrees, 180 degrees, 225 degrees, 270 degrees, and 315 degrees counterclockwise.

The user's angle information is the location of the user relative to the handwriting input apparatus 2 when the handwriting input apparatus 2 is positioned flat. That is, the information about the user's angle is the information about the location. Viewed from the handwriting input apparatus 2, it is possible to identify which direction the user is in. In addition to the angle information, the direction viewed from the handwriting input apparatus 2 may be simulated to be a clock, and may be expressed as follows: 0 degrees: 6 o'clock direction; 45 degrees: 4 o'clock direction and 5 o'clock direction; 90 degrees: 3 o'clock direction; 135 degrees: 1 o'clock direction and 2 o'clock direction; 180 degrees: 12 o'clock direction; 225 degrees: 10 o'clock and 11 o'clock direction; 270 degrees: 9 o'clock direction; and 315 degrees: 7 o'clock direction and 8 o'clock direction.

The angle information is not automatically determined by the user's position, and each user enters (specifies) the angle information. The resolution of the angular information that can be specified (45 degrees in FIG. 16B) is only one example and may be smaller, such as 5 degrees to 30 degrees. However, if the character is rotated by about 45 degrees, the user may read them.

The pen ID control data include PenId, Color, Width, Pattern, Angle, and AccountId. PenId is identification information saved inside the pen. Color is the stroke color set for this pen (the user can arbitrarily change it). Width is the width of the stroke set to this pen (the user can arbitrarily change it). Pattern is the line type of the stroke set to this pen (the user can arbitrarily change it). Angle is the angle information of the stroke set in this pen (the user can arbitrarily change it). In the example of FIG. 16A, the angle information for each pen is 0 degrees, 90 degrees, 180 degrees, and 270 degrees counterclockwise. AccountId is the identification information of the user. By associating the pen ID with AccountId, AccountId associated with the pen ID of the pen 2500 used by the user can be specified and the operation command can be executed using the user-defined data.

Pen ID control data 901 are control data having a pen ID of 1. The color is black (Black), the thickness is 1 pixel (1 px), the pattern is solid (Solid), the angle information is 0 degrees, and AccountId=1. The user of AccountId=1 is the user of the user-defined data 717 of FIG. 13. It is indicated that this user signed in by handwriting the user name and so on with a pen having a pen ID=1. The pen ID control data without AccountId indicate a signed out state (not associated with the user).

Similarly, pen ID control data 902 are a pen ID of 2. The color is black. The thickness is 1 pixel. The pattern is solidly painted. The angle information is 90 degrees. AccountId is not present.

The pen ID control data 903 have a pen ID of 3. The color is black. It is 10 pixels thick. The pattern is solid. Angle information is 180 degrees. AccountId is not present.

The pen ID control data 904 are black in color. It is 10 pixels thick. The pattern is halftone dots. The angle information is 270 degrees. AccountId is not present.

Figure 28:
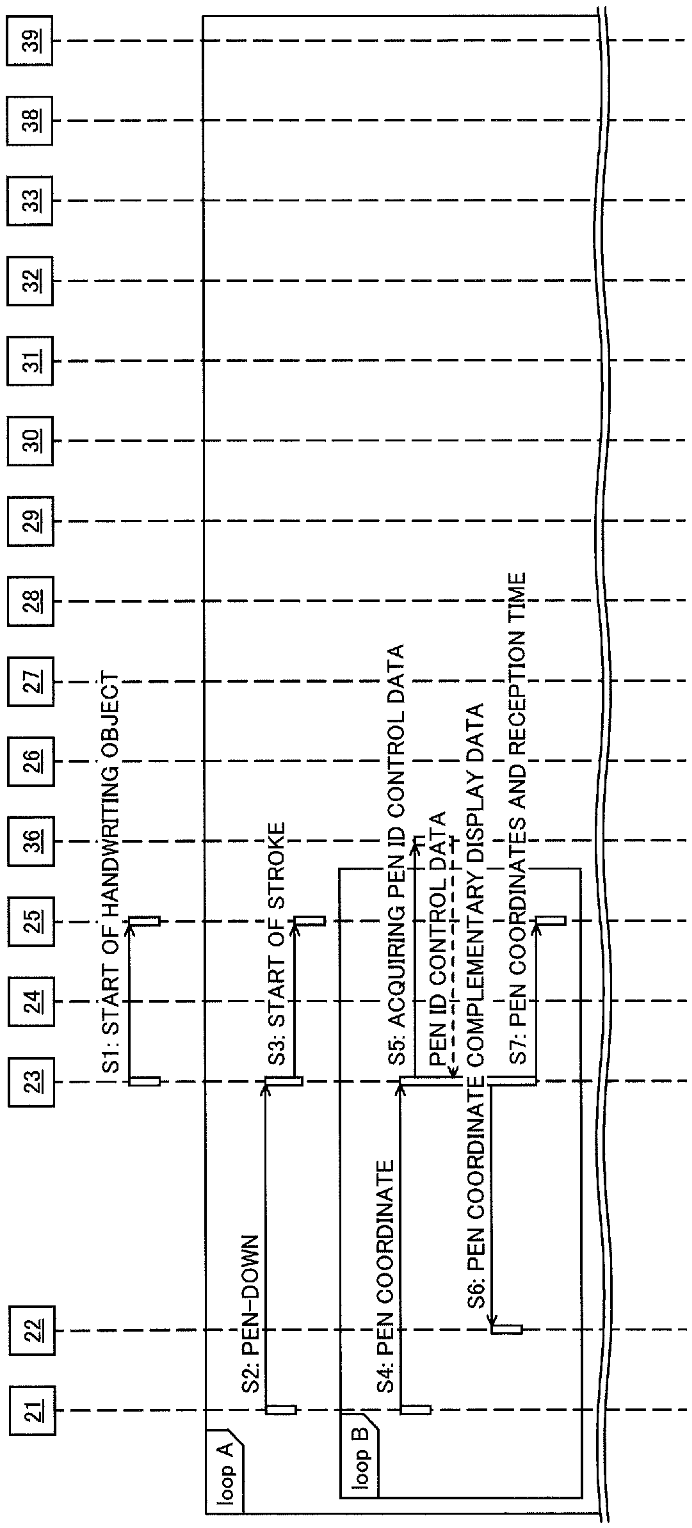
FIG. 28 is a sequence diagram illustrating a process in which a handwriting input apparatus displays a character string candidate and an operation command candidate.
Figure 29:
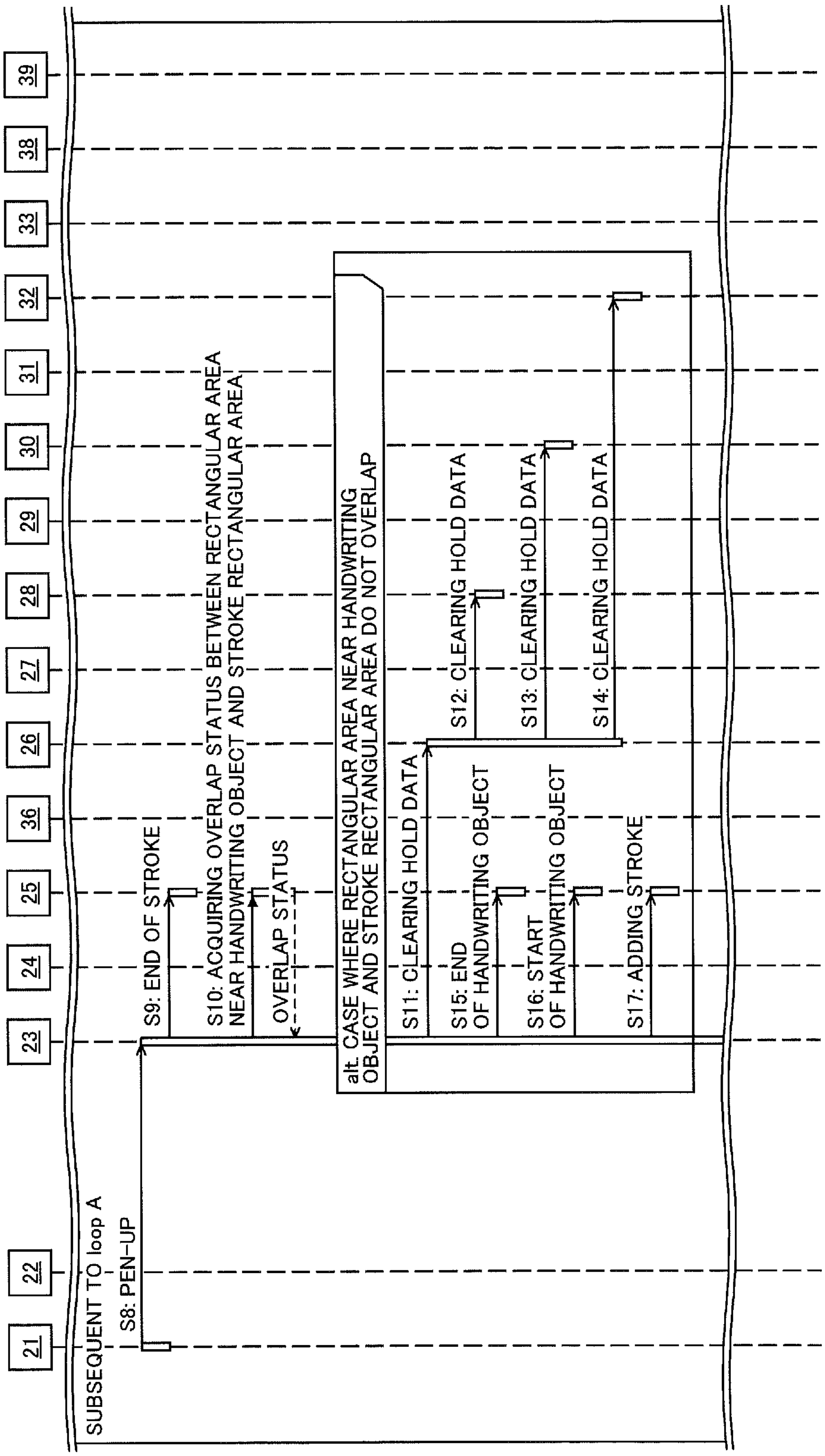
FIG. 29 is a sequence diagram illustrating a process in which a handwriting input apparatus displays a character string candidate and an operation command candidate.
Figure 30:
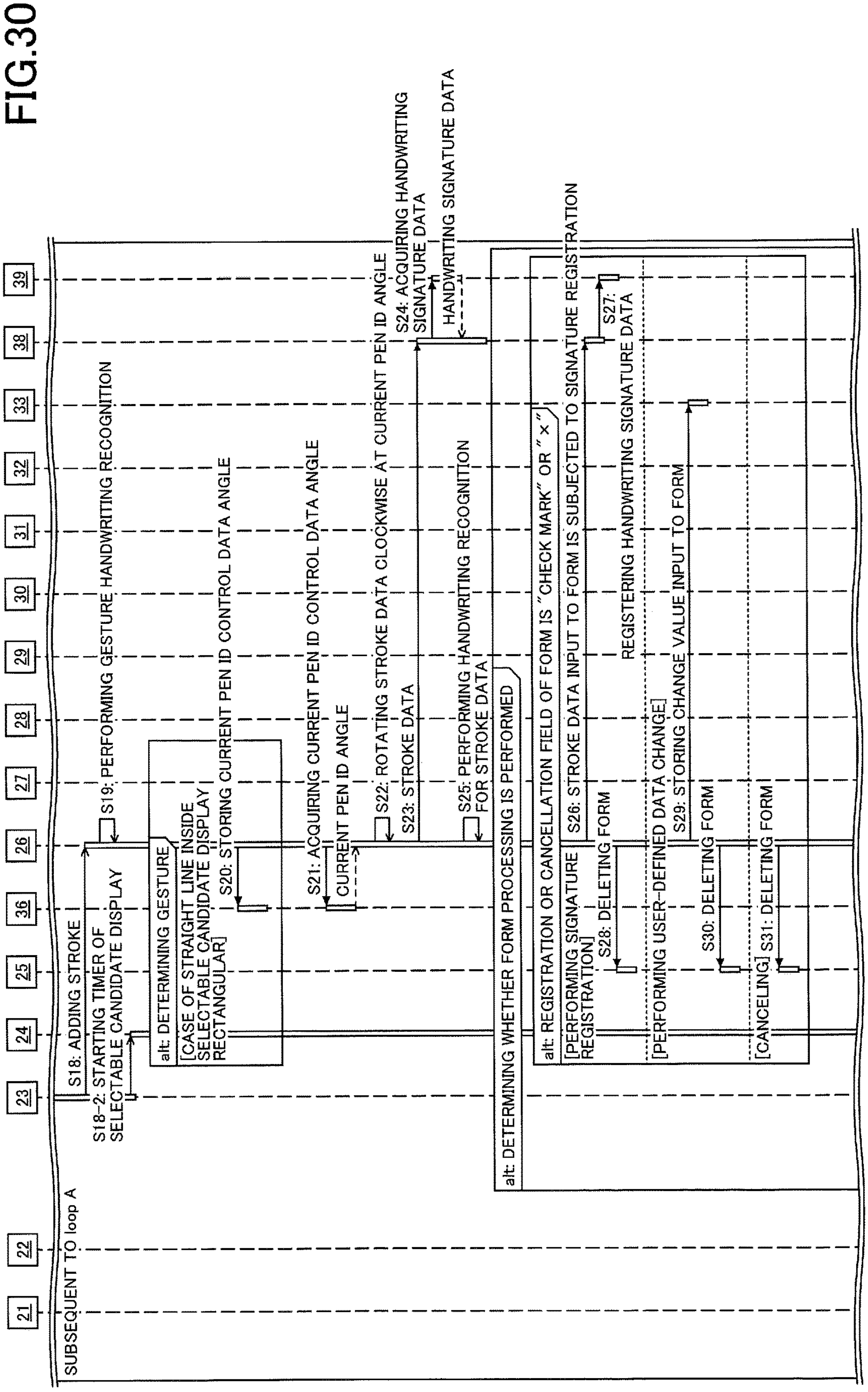
FIG. 30 is a sequence diagram illustrating a process in which a handwriting input apparatus displays a character string candidate and an operation command candidate.
Figure 31:
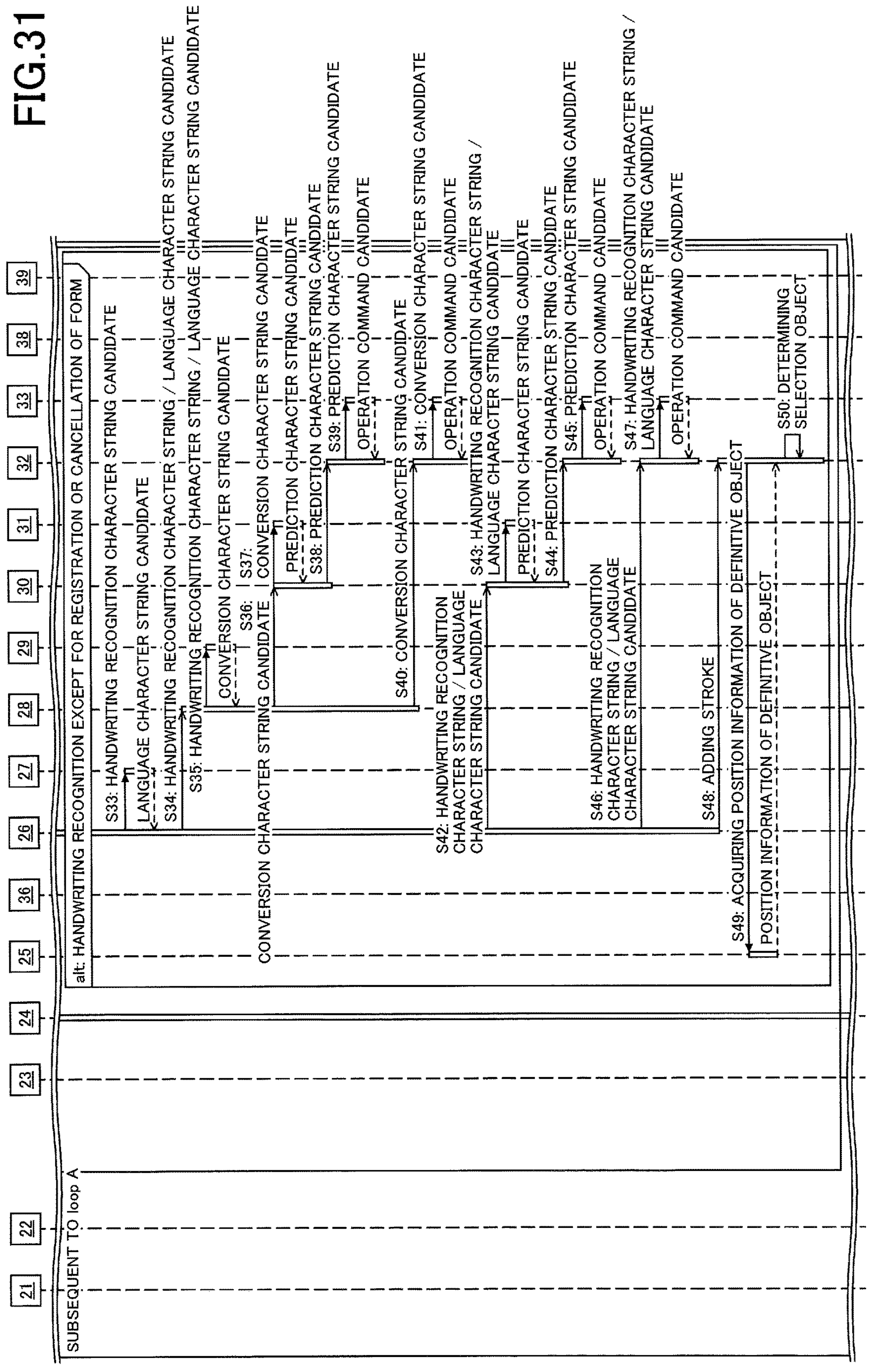
FIG. 31 is a sequence diagram illustrating a process in which a handwriting input apparatus displays a character string candidate and an operation command candidate.
Figure 32:
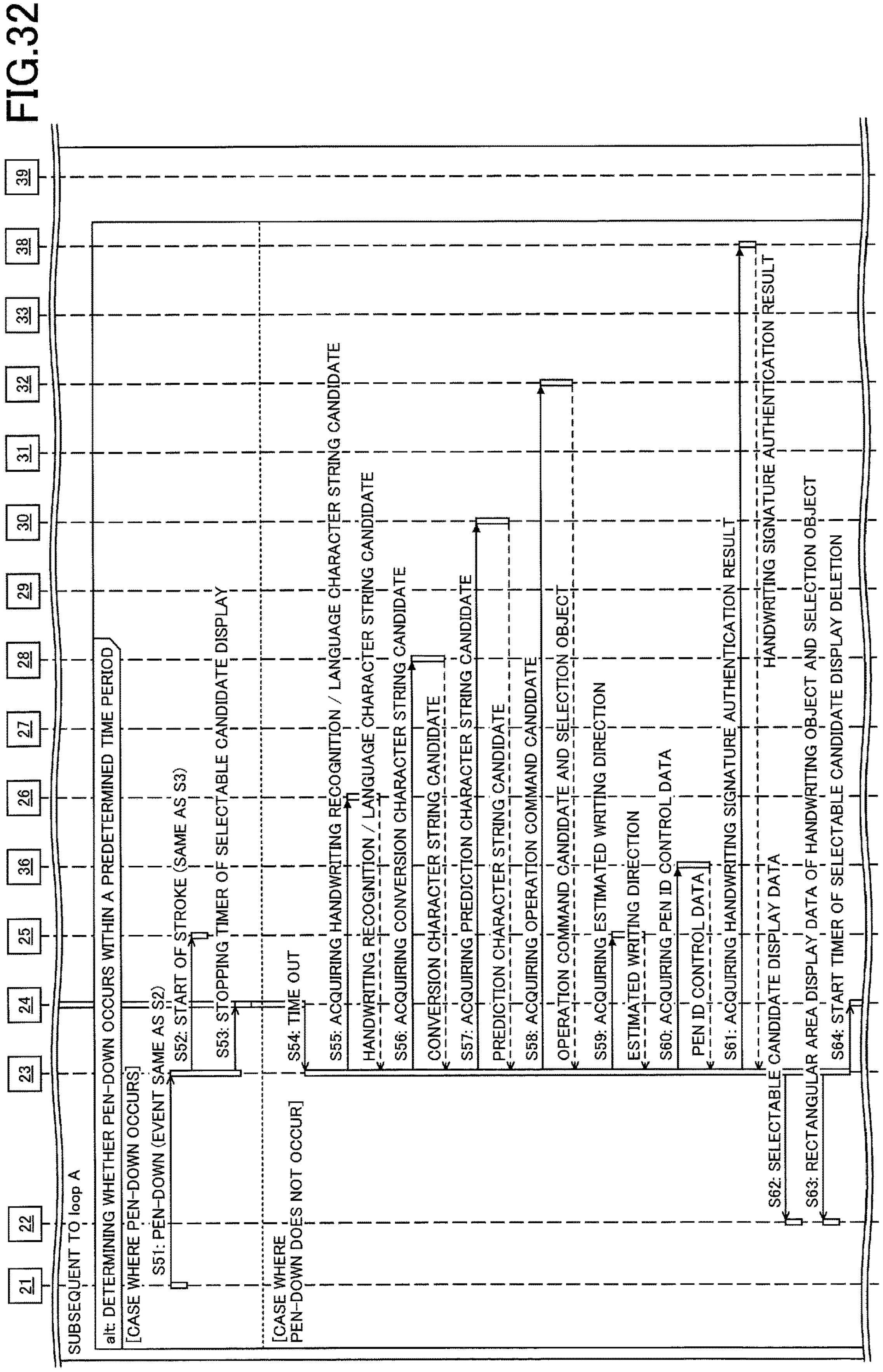
FIG. 32 is a sequence diagram illustrating a process in which a handwriting input apparatus displays a character string candidate and an operation command candidate.
Figure 33:
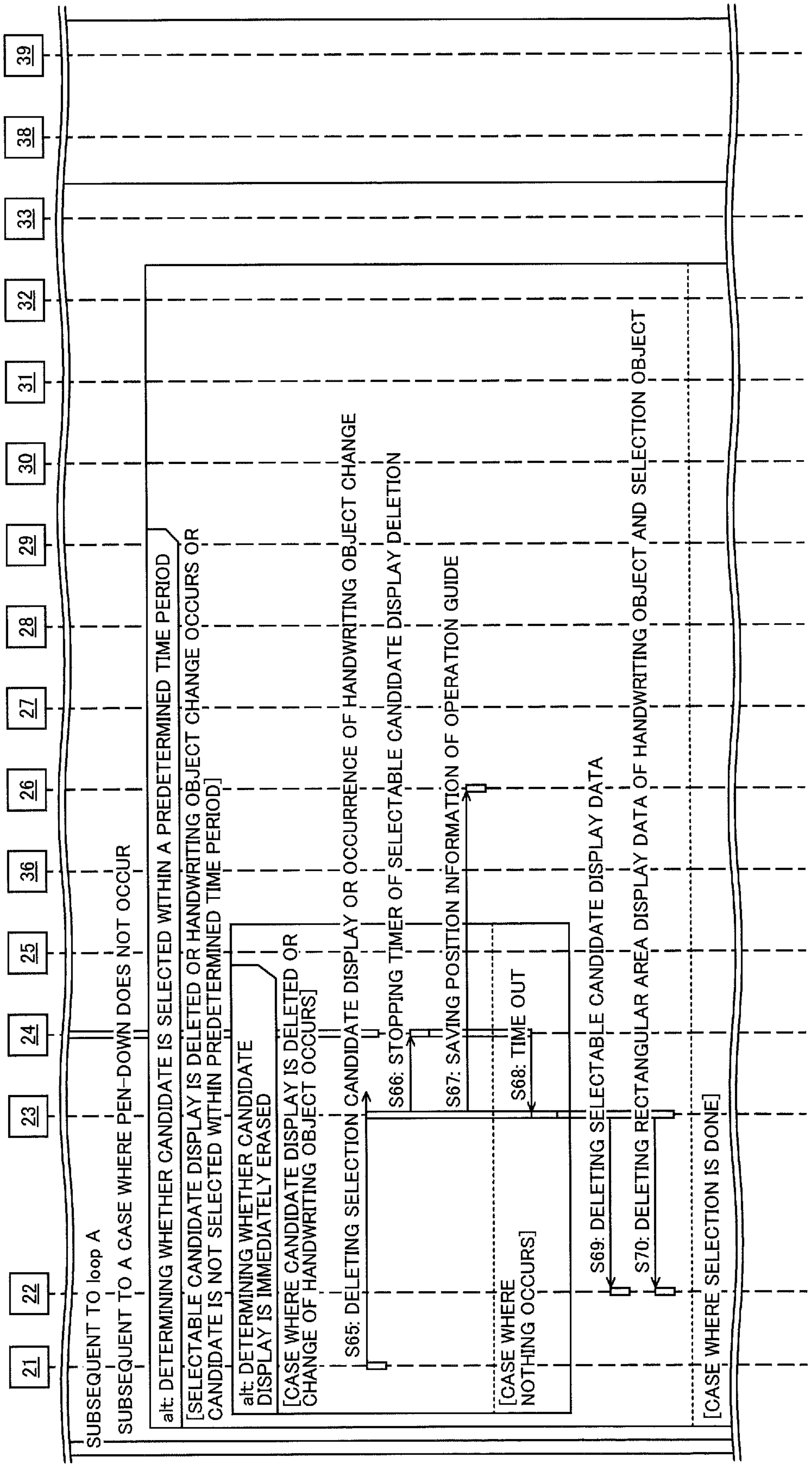
FIG. 33 is a sequence diagram illustrating a process in which a handwriting input apparatus displays a character string candidate and an operation command candidate.
Figure 34:
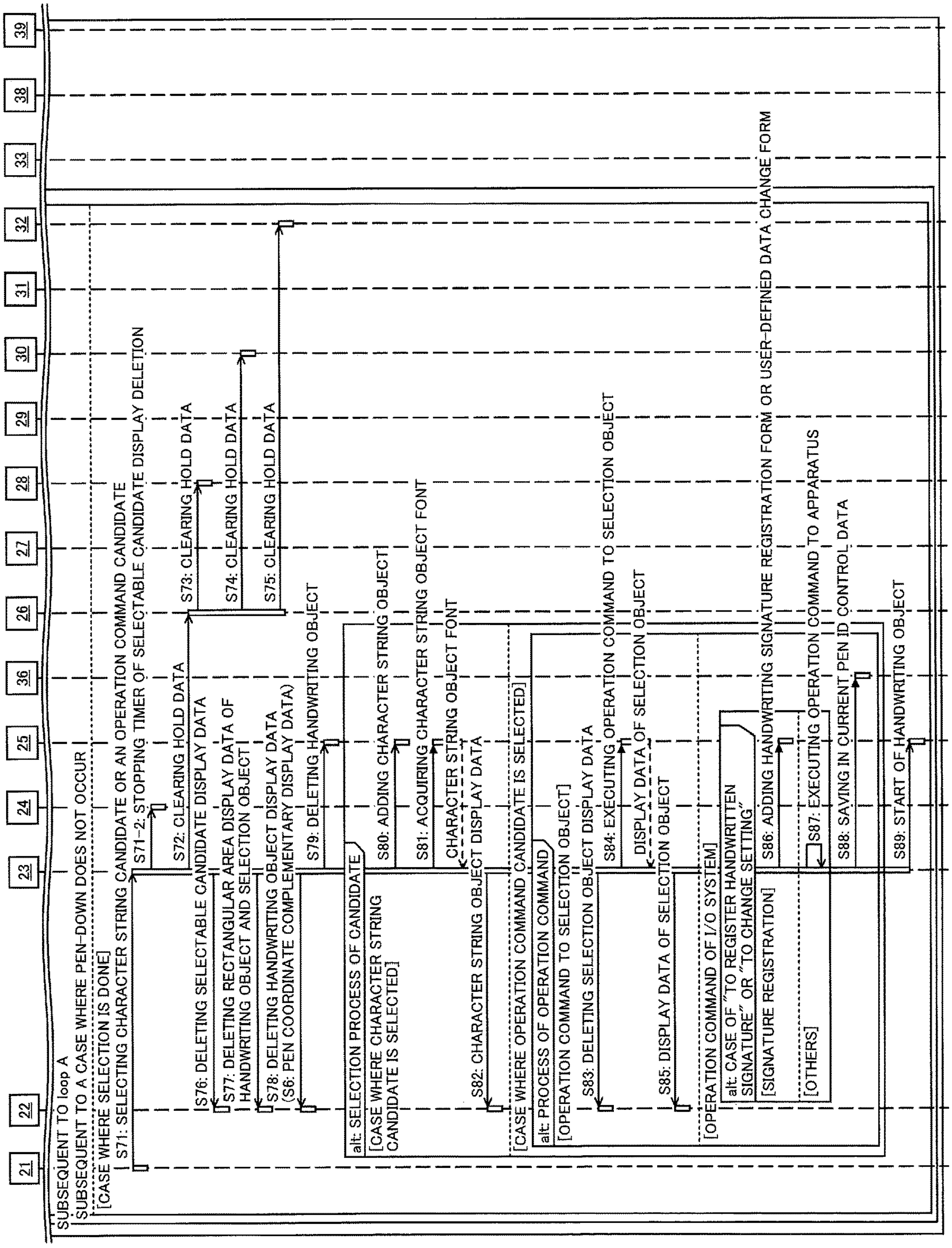
FIG. 34 is a sequence diagram illustrating a process in which a handwriting input apparatus displays a character string candidate and an operation command candidate.

These data are used in Step S5 (acquisition of pen ID control data) of FIG. 28, Step S20 (storage of angle information of pen ID control data) of FIG. 30, Step S21 (acquisition of angle information of pen ID control data) of FIG. 30, Step S60 (acquisition of pen ID control data) of FIG. 32, and Step S88 (storage of angle information of pen ID control data) of FIG. 34.

<Example of Selectable Candidates>

Figure 17:
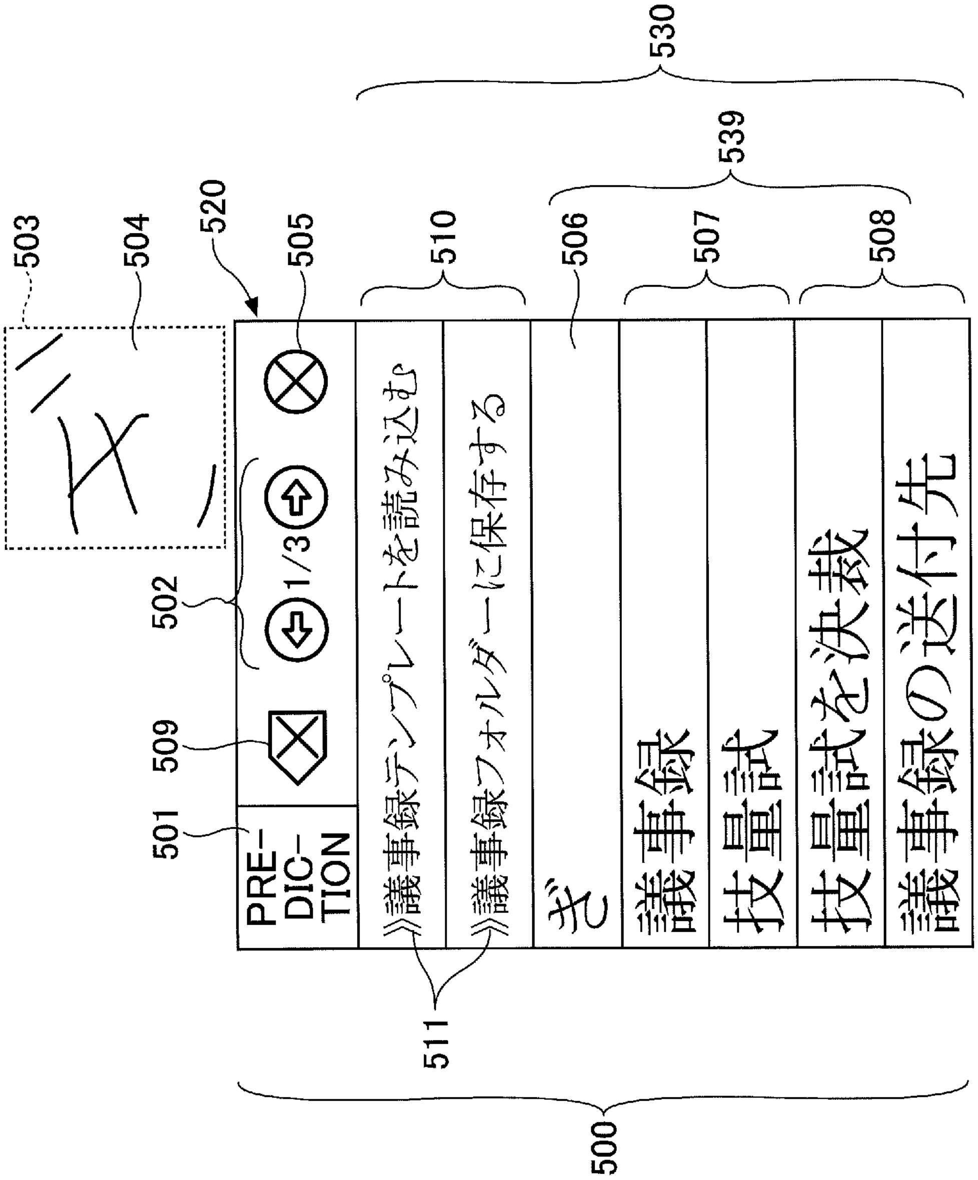
FIG. 17 illustrates an example of a selectable candidate displayed by the operation guide and the operation guide.

FIG. 17 is an example of an operation guide 500 and a selectable candidate 530 displayed by the operation guide. The user handwrites the handwriting object 504 (due to the timeout of the selectable candidate display timer) so that the operation guide 500 is displayed. The operation guide 500 includes an operation header 520, an operation command candidate 510, a handwriting recognition character string candidate 506, a conversion character string candidate 507, a character string/prediction conversion candidate 508, and a handwriting object rectangular area display 503. The selectable candidate 530 includes the operation command candidate 510, the handwriting recognition character string candidate 506, the conversion character string candidate 507, and the character string/prediction conversion candidate 508. This example includes a case where a language conversion character string may be displayed even though there is no language conversion character string. The selectable candidate 530, excluding the operation command candidate 510, is called the character string candidate 539.

The operation header 520 has buttons 501, 509, 502, and 505. The button 501 accepts a switching operation between a prediction conversion and kana conversion. In the example of FIG. 17, when the user depresses the button 501 indicating "prediction", the handwriting input unit 21 receives the depressing and notifies the handwriting input display control unit 23 thereof, and the display unit 22 changes the display to the button 501 indicating "Kana". After the change from prediction conversion to kana conversion, the character string candidates 539 are arranged in a probability descending order of "kana conversion".

The buttons 502 perform a page operation on a candidate display. In the example of FIG. 17, the candidate display page is 3 pages, and currently the first page is displayed. The button 505 receives deletion of the operation guide 500. When the user depresses the button 505, the handwriting input unit 21 receives the depressing and notifies the handwriting input display control unit 23 of the depressing, and the display unit 22 deletes the display other than the handwriting object. The button 509 accepts collective display deletion. When the user depresses the button 509, the handwriting input unit 21 receives the depressing and notifies the handwriting input display control unit 23 of the depressing. The display unit 22 includes a handwriting object and deletes all displays illustrated in FIG. 17. The user can handwrite from the beginning.

The handwriting object 504 is a Japanese Hiragana letter "Gi (as a Roman character of the Japanese Hiragana letter)" handwritten by the user. A handwriting object rectangular area display 503 surrounding the handwriting object 504 is displayed. The procedure for displaying is illustrated in the sequence diagrams of FIGS. 28 to 34. In the example of FIG. 17, the handwriting object rectangular area display 503 is displayed in a dotted frame.

Each of the handwriting recognition character string candidate 506, the conversion character string candidate 507, and the character string/prediction conversion candidate 508 is arranged in probability descending order. The Japanese Hiragana letter corresponding to "Gi (as a Roman character of the Japanese Hiragana letter indicated in the handwriting recognition character string candidate 506 illustrated in FIG. 17)" is a candidate for the recognition result. In this example, the Japanese Hiragana letter "Gi (as the Roman character of the Japanese Hiragana letter) is correctly recognized.

The conversion character string candidate 507 is a conversion character string candidate converted from a language character string candidate. In the lower row of the conversion character string candidate 507, the Japanese Kanji character string "technical skill test" is an abbreviation for "technical skill test system". The character string/prediction conversion candidate 508 is the prediction string candidate converted from the language character string candidate or the conversion character string candidate. In this example, Japanese character strings corresponding to "technical skill test is approved" and "transmission destination of meeting minute" are displayed in the character string/prediction conversion candidate 508.

The operation command candidate 510 is a candidate of the operation command selected based on the operation command definition data 701 to 703 and 709 to 716 of FIG. 11A. In the example illustrated in FIG. 17, each row initial letter 511 of "»" indicates that the subsequent character strings are an operation command. In FIG. 17, there is no selection object to be selected by the Japanese Hiragana letter corresponding to "Gi (pronounced in Japanese "Gi")" which is the handwriting object 504, and the Japanese Kanji character strings corresponding to "meeting minute (pronounced in Japanese "Gi-jiroku")" which is a character string candidate of the "Gi" partly coinciding with the operation command definition data 701 and 702 illustrated in FIG. 11A, and is displayed as the operation command candidate 510.

When the user selects Japanese character strings corresponding to "Read meeting minute template", the operation command defined by the operation command definition data 701 is executed. When the user selects Japanese character strings corresponding to "save in meeting minute folder", the operation command defined by the operation command definition data 702 is executed. As described above, the operation command candidate is displayed only when the operation command definition data including the converted character string are found. Therefore, the operation command candidate is not always displayed.

As illustrated in FIG. 17, because the character string candidate and the operation command candidate are simultaneously displayed (together), the user can select either the character string candidate or the operation command to be entered by the user.

<Relationship Between Operation Guide Position and Handwriting Object Rectangular Area Display Position>

The display unit 22 displays the operation guide 500 including text data at a position corresponding to the position of the stroke data. The display unit 22 displays the operation guide 500 including text data at a position inside the screen based on the position of the stroke data. Thus, the position of the operation guide 500 is determined by the position of the stroke data.

Figure 18A:
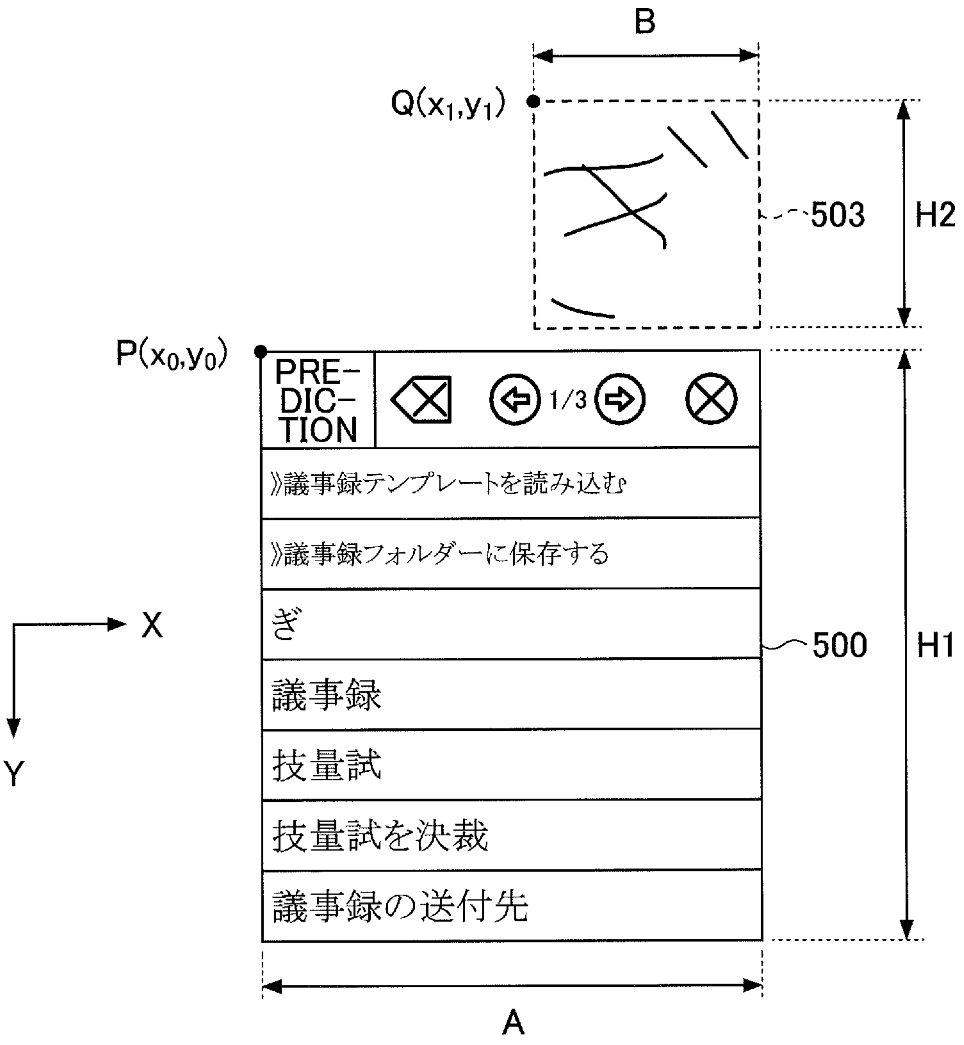
FIGS. 18A and 18B illustrate a relationship between a position of an operation guide and a position of a handwriting object rectangular area display.
Figure 18B:
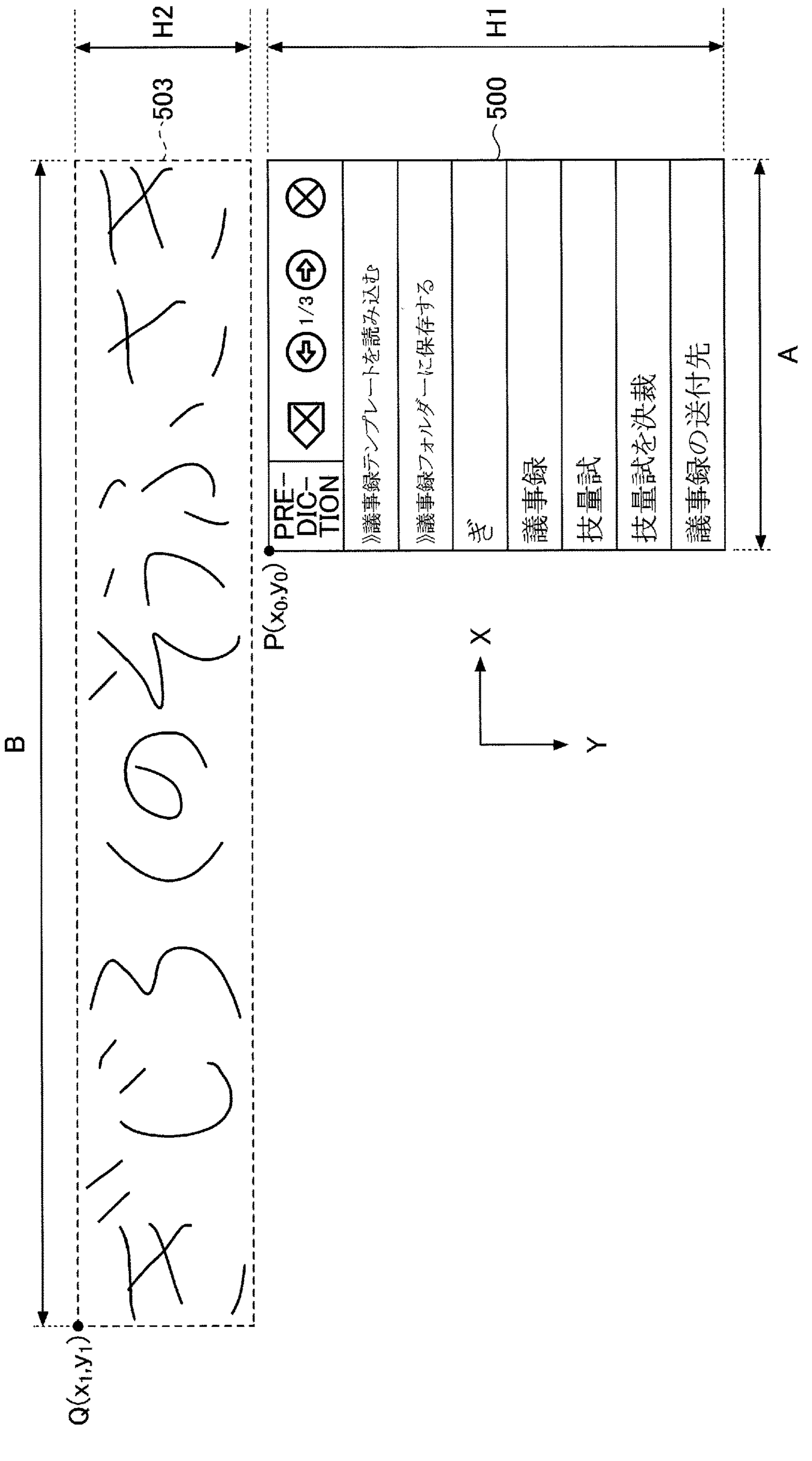

FIGS. 18A and 18B illustrate a relationship between a position of the operation guide and a position of a handwriting object rectangular area display. First, the width A and height H1 of the operation guide 500 are constant. The right end of the handwriting object rectangular area display 503 coincides with the right end of the operation guide 500.

The width B of the handwriting object rectangular area display 503 is determined by the length of the handwriting object 504 written by the user. In FIG. 18A, because the horizontal width B of the handwriting object rectangular area display 503 corresponds to one character and A>B, the coordinate (x0, y0) of the left upper corner P of the operation guide 500 is calculated as follows. The coordinate of the upper left corner Q of the handwriting object rectangular area display 503 are (x1, y1). The height of the handwriting object rectangular area display 503 is represented by H2.

$$x0=x-(A-B)$$

$$y0=y1+H2$$

Meanwhile, as illustrated in FIG. 18B, when the width B of the handwriting object rectangular area display is larger than the width A, the coordinates (x0, y0) of the upper left corner P of the operation guide 500 are calculated as follows.

$$x0=x1+(B-A)$$

$$y0=y1+H2$$

Incidentally, although FIG. 18A illustrates the operation guide 500 below the handwriting object rectangular area display 503, the operation guide 500 may be displayed above the handwriting object rectangular area display 503.

Figure 19:
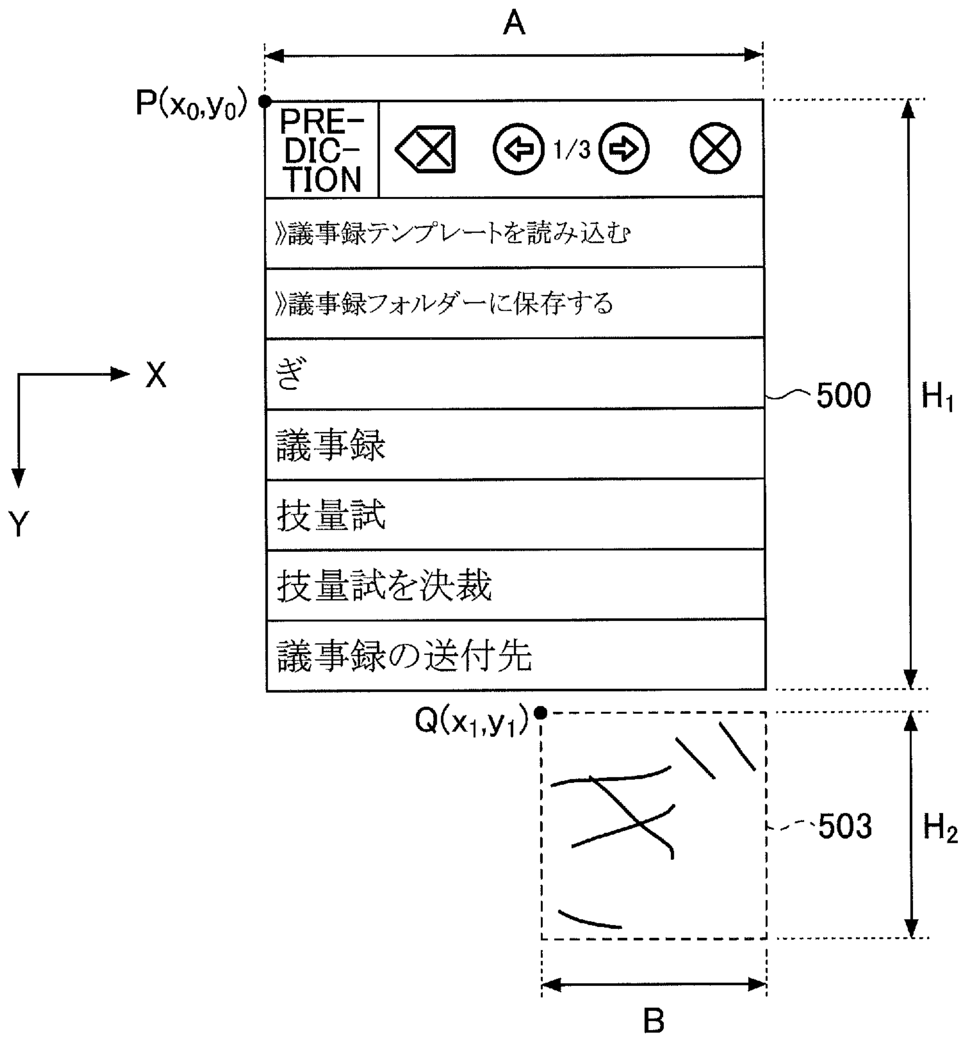
FIG. 19 illustrates an operation guide displayed above a handwriting object rectangular area display.

In FIG. 19, the operation guide 500 is displayed above the handwriting object rectangular area display 503. The calculation method of x1 is the same as that of FIG. 18A. FIGS. 18A and 18B are diagrams illustrating a relationship between the position of the operation guide and the position of the handwriting object rectangular area display. First, the width A and height H1 of the operation guide 500 are constant. The right end of the handwriting object rectangular area display 503 coincides with the right end of the operation guide 500.

The width B of the handwriting object rectangular area 503 is determined by the length of the handwriting object 504 written by the user. In FIG. 18A, because the horizontal width B of the handwriting object rectangular area display 503 corresponds to one character and A>B, the coordinates (x0, y0) of the left upper corner P of the operation guide 500 are calculated as follows. The coordinates of the upper left corner Q of the handwriting object rectangular area display 503 are (x1, y1). The height of the handwriting object rectangular area display 503 is assumed to be H2.

$$x0=x1-(A-B)$$

$$y0=y1+H2$$

Meanwhile, as illustrated in FIG. 18B, when the width B of the handwriting object rectangular area display is larger than the width A, the coordinates (x0, y0) of the upper left corner P of the operation guide 500 are calculated as follows.

$$x0=x1+(B-A)$$

$$y0=y1+H2$$

Incidentally, although FIGS. 18A and 18B illustrate the operation guide 500 below the handwriting object rectangular area display 503, the operation guide 500 may be displayed above the handwriting object rectangular area display 503.

FIG. 19 illustrates the operation guide 500 displayed above the handwriting object rectangular area display 503. The calculation method of x1 is the same as that of FIGS. 18A and 18B, but the calculation method of y0 changes.

$$y0=y1-H1$$

The operation guide 500 may be displayed on the right side or the left side of the handwriting object rectangular area display 503. Also, if the user handwrites at the end of the display so that there is no display space in the operation guide 500, the operation guide 500 is displayed on the side where a display space is located. The calculation method of 0 is changed.

<Example of Designating Selecting Object>

In this embodiment, the handwriting input apparatus 2 can designate a selection object by the user who selects a definitive object by hand. The selection object is subject to editing or modification.

FIGS. 20A to 20D are examples of a diagram illustrating a designation example of a selection object. In FIG. 20A to 20D, a black solid straight line is displayed in the handwriting object 11, a grey shaded area 12 in the handwriting object, a black straight line is displayed in the definitive object 13, and a dotted straight line is displayed in the rectangular area 14 of the selection object. A lower-case alphabet is appended to the symbol to distinguish between them. In addition, as a determination condition (whether a predetermined relationship exists) for determining a definite object as a selection object, the straddle line determination condition 406 or the surrounding line determination condition 407 of the defined control data illustrated in FIG. 7 is used.

Figure 20A:
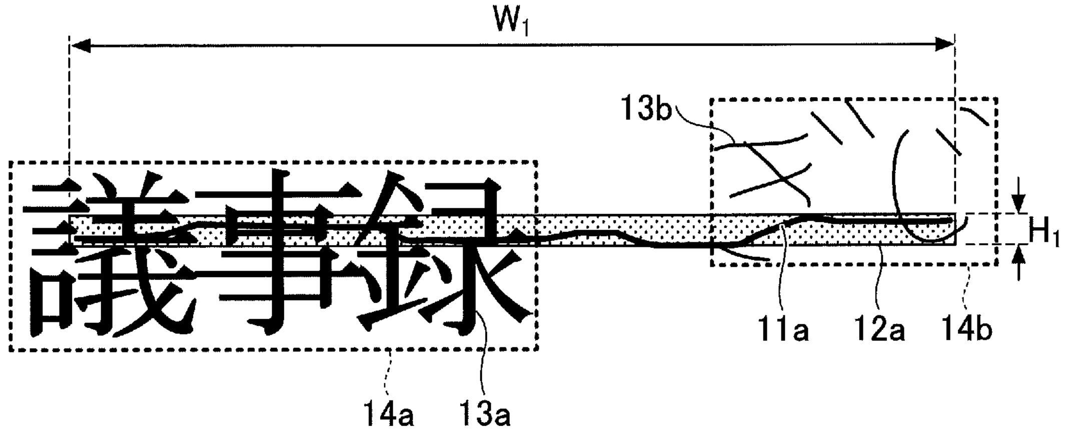
FIGS. 20A, 20B, 20C, and 20D illustrate a specified example of a selection object.

FIG. 20A illustrates an example in which two definitive objects 13a and 13b in horizontal writing are specified by a user using a straddle line (handwriting object 11a) In this example, because the length HE of the shorter side and the length W1 of the longer side of the rectangular area 12a satisfy the conditions of the straddle line determination condition 406 and the overlap rate with the definitive object 13a and 13b satisfies the conditions of the straddle line determination condition 406, both the Japanese Kanji character string corresponding to “meeting minute (pronounced in Japanese “Gi-ji-roku”)” and the Japanese Hiragana character string corresponding to “Gi-ji (pronounced in Japanese “Gi-ji”)” of the definitive objects 13a and 13b are designated as the selection object.

Figure 20B:
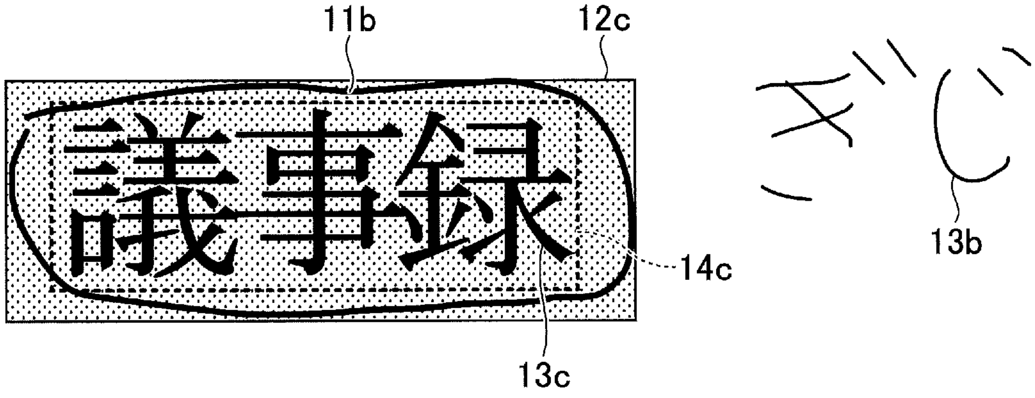

FIG. 20B illustrates an example in which the definitive object 13c in horizontal writing is designated by a surrounding line (handwriting object 11b). In this example, only the definitive object 13c, which is “meeting minute”, in which the overlap ratio of the definitive object 13c and the handwriting object rectangular area 12c satisfies the conditions of the surrounding line determination condition 407, is designated as the selection object.

Figure 20C:
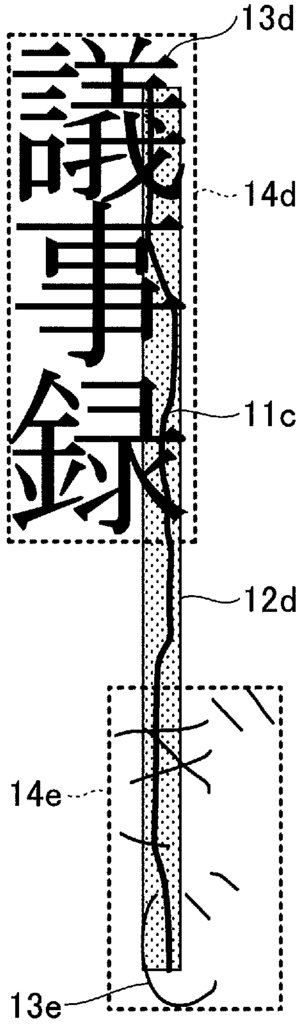

FIG. 20C is an example in which a straddle line (handwriting object 11c) is designated by a plurality of definitive objects 13d and 13e written vertically. In this example, as in FIG. 20A, the length H1 of the short side and the length W1 of the long side of the handwriting object rectangular area 12d satisfy the conditions of the straddle line determination condition 406, and the overlap ratio of the two definitive object 13d and 13e, the Japanese Kanji character string corresponding to “meeting minute (pronounced in Japanese “Gi-ji-roku”)” and the Japanese Hiragana character string corresponding to “Gi-ji (pronounced in Japanese “Gi-ji”), respectively, satisfies the conditions of the straddle line determination condition 406. Therefore, the definitive object 13d and 13e of both the “minute” and the “Gi-ji” are designated as the selection objects.

Figure 20D:
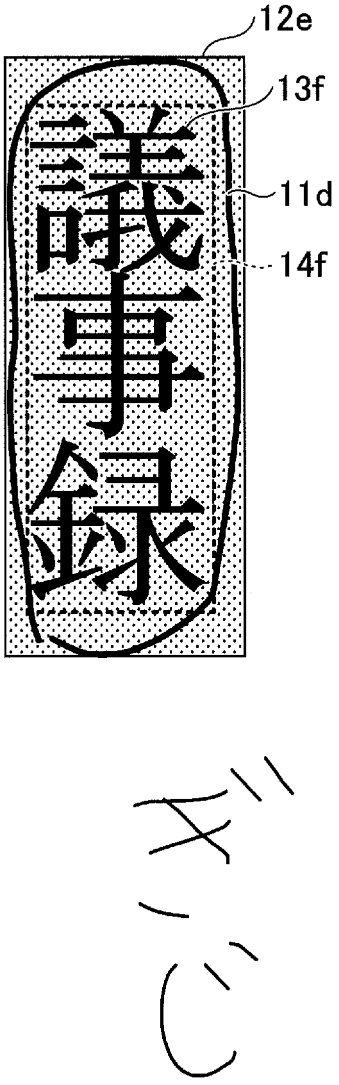

FIG. 20D is an example in which the vertically written definite object 13f is designated by a surrounding line (handwriting object 11d). In this example, as in FIG. 20B, only the definitive object 13f of the Japanese Kanji character string corresponding to “meeting minute” is designated as the selection object.

<Example of Displaying Operation Command Candidate>

Figure 21A:
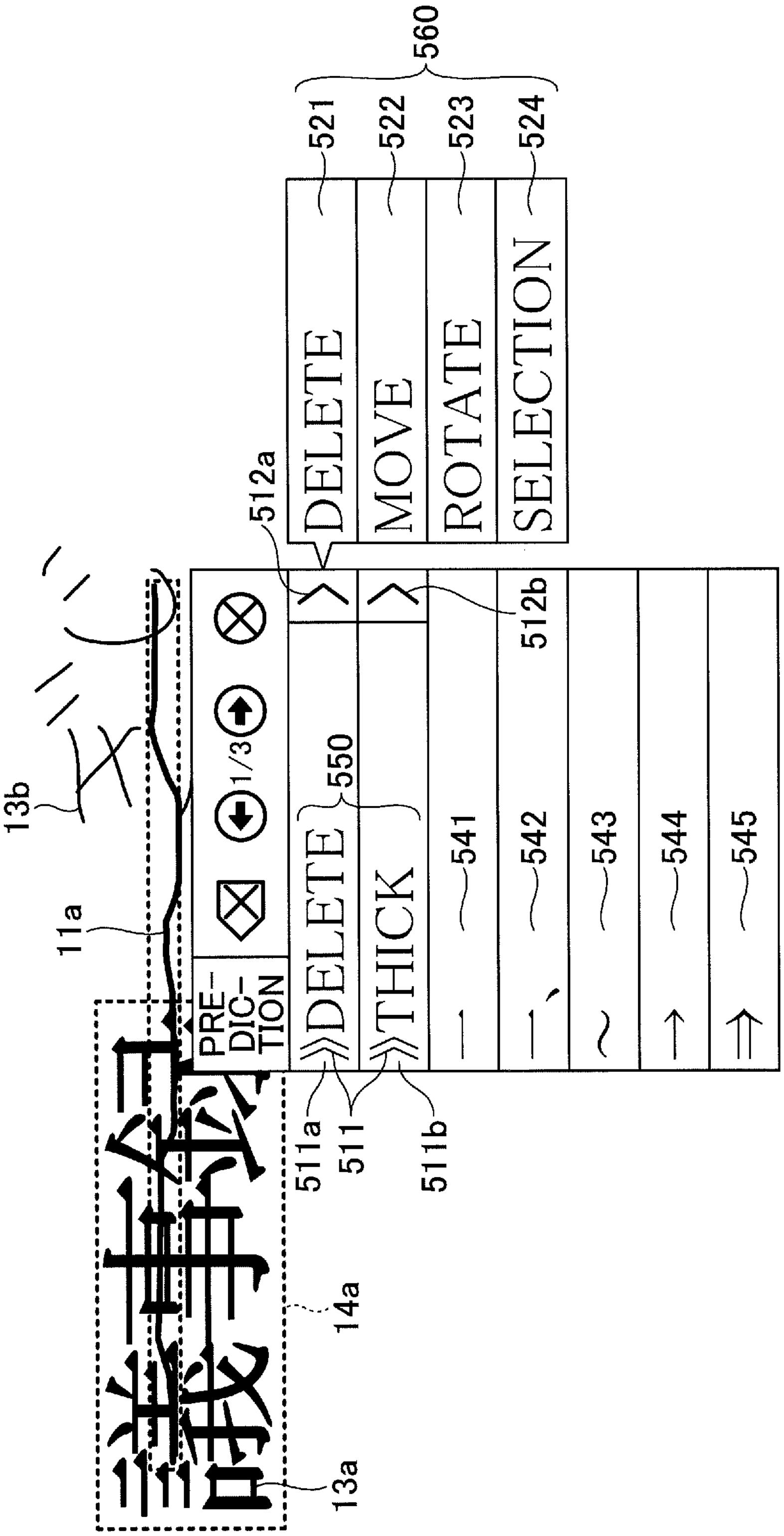
FIGS. 21A and 21B illustrate an example of displaying an operation command candidate based on the operation command definition data when a handwriting object is present.
Figure 21B:
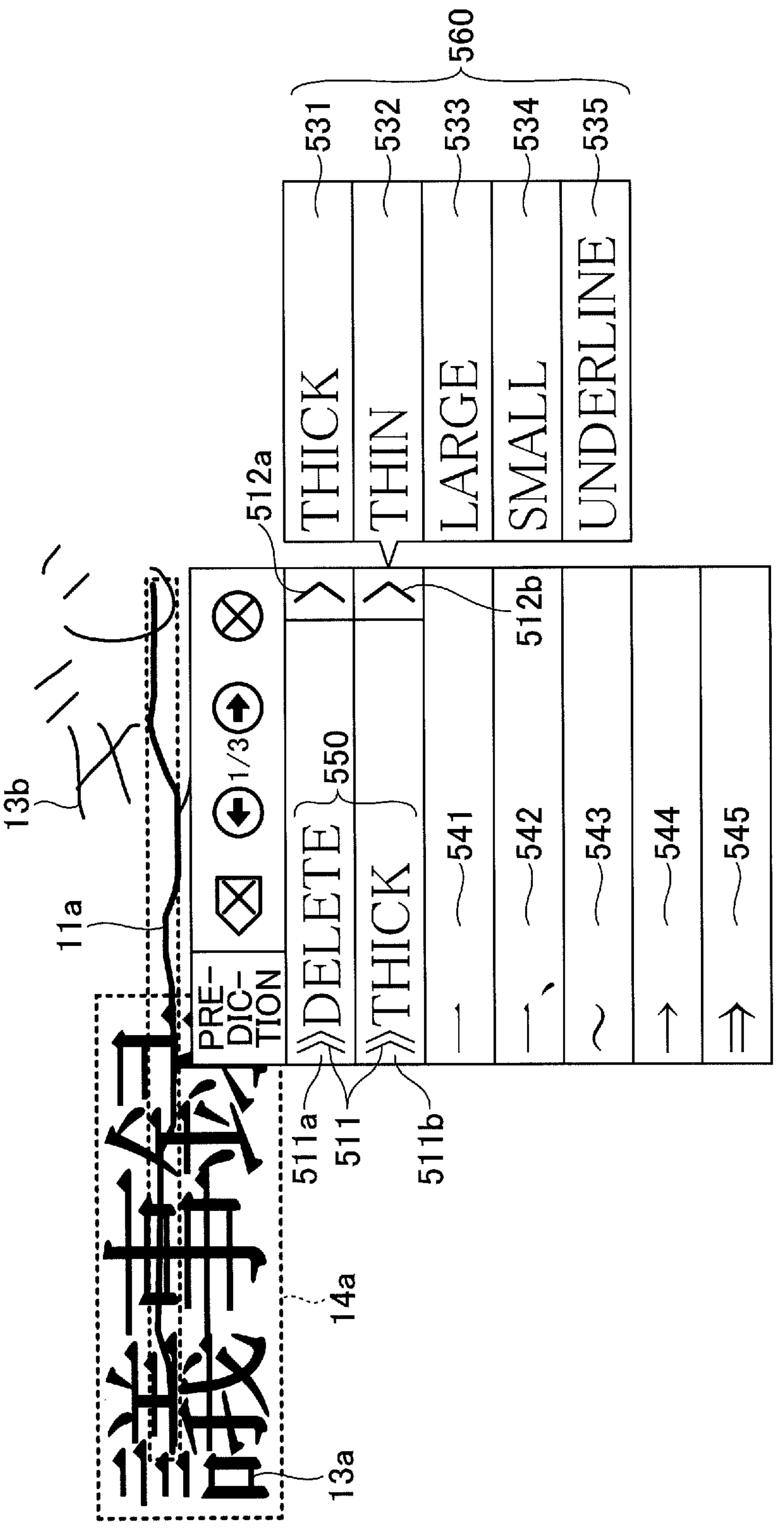

FIGS. 21A and 21B illustrate a display example of an operation command candidate based on the operation command definition data when the handwriting object illustrated in FIG. 12 is present. FIG. 21A is an operation command candidate in the editing system, and FIG. 21B is an operation command candidate in the modification system. FIG. 21A illustrates an example in which a selection object is designated as a handwriting object 11a in FIG. 20A.

As illustrated in FIGS. 21A and 21B, the main menu 550 lists operation command candidates displayed after each row initial letter 511 of “»”. The main menu 550 displays the last executed operation command name or the first operation command name in the operation command definition data. An initial letter 511a of “»” on the first row indicates the operation command of an editing system, which is a candidate for the editing operation command, and an initial letter 511b of “»” on the second row indicates the operation command of the modifying system.

Each of row end letters “>” 512a and 512b indicates that there is a sub menu (an example of a sub menu button). The row end letter “>” 512a of the first row of the main menu 550 illustrates a sub menu (finally selected) for the operation command candidate in the editing system. The row end letter “>” 512b of the second row of the main menu 550 illustrates a sub menu for the operation command candidates of the modifying system. When the user clicks the row end letter “>” 512a or 512b, a sub menu 560 appears to the right. The sub menu 560 displays all the operation commands defined in the operation command definition data. The display example of FIG. 21A also illustrates the sub menu 560 corresponding to the row end letter “>” 512a when the main menu is displayed. It may be displayed by depressing the row end letter “>” 512a on the first row.

When the user depresses any of the operation command names in the pen, the handwriting input display control unit 23 executes the command of the operation command definition data associated with the operation command name for the selection object. That is, “delete” when “delete” 521 is selected, “move” when “move” 522 is selected, “rotate” when “rotate” 523 is selected, and “select” when “selection” 524 is selected.

For example, if the user depresses “delete” 521 with a pen, “meeting minute” and “gi-ji” can be deleted, “move” 522, “rotate” 523, and “selection” 524 can display a bounding box (an outer rectangle of the selection object), “move” 522 and “rotate” 523 can respectively perform moving and rotating by dragging the pen, and “selection” 524 can perform other bounding box operations.

Character string candidates other than the operation command candidates “-” 541, “-,” 542, “~” 543, “→” 544, and double-lined arrow like “⇒” 545 are the recognition results of the straddle line (the handwriting object 11a). If the user intends to enter the character string instead of the operation command, the character string candidates can be selected.

In FIG. 21B, the sub menu 560 is displayed by clicking “>” 512b in the second row. The main menu 550 and the sub menu 560 are also displayed in the display example illustrated in FIG. 21B. Based on the operation command definition data of FIG. 12, the handwriting input display control unit 23 executes “thick” when “thick” 531 is selected, “thin” when “thin” 532 is selected, and “large” 533 is selected, “small” when “small” 534 is selected, and “underline” when “underline” 535 is selected for the selection object.

Further, the following preset values are defined separately: how thicken is to be made when “thick” 531 is selected, how thin is to be made when “thin” 532 is selected, how large is to be made when "large" 533 is selected, how small is to be made when "small" 534 is selected, a line type when "underline 535" is selected, and the like. Alternatively, when the sub menu of FIG. 21*b* is selected, the selection menu may be opened to allow the user to adjust.

When the user depresses the "thick" 531 with a pen, the handwriting input display control unit 23 thickens the lines forming the definitive objects 13*a* and 13*b* of the Japanese character strings corresponding to "meeting minute" and "meeting". When the "thin" 532 is depressed with the pen, the line forming the Japanese character strings corresponding to "meeting minute" and "meeting" can be narrowed by the handwriting input display control unit 23. When the "large" 533 is depressed with the pen, the handwriting input display control unit 23 can enlarge the Japanese character strings, and when the "small" 534 is depressed with the pen, the handwriting input display control unit 23 can reduce the Japanese character strings. When the "underline" 535 is depressed with the pen, the handwriting input display control unit 23 can add an underline to the Japanese character strings.

Figure 22A:
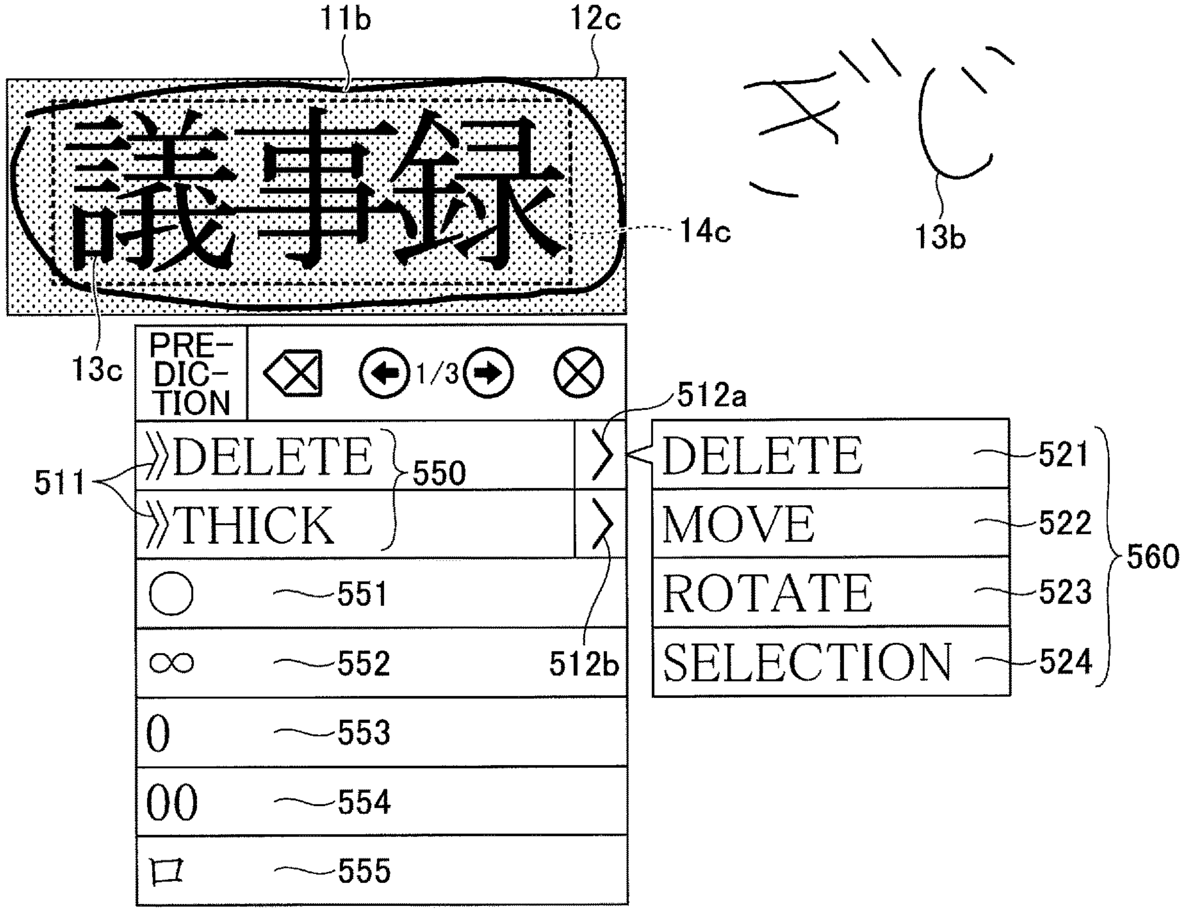
FIGS. 22A and 22B illustrate an example of displaying an operation command candidate based on the operation command definition data when a handwriting object is present.
Figure 22B:
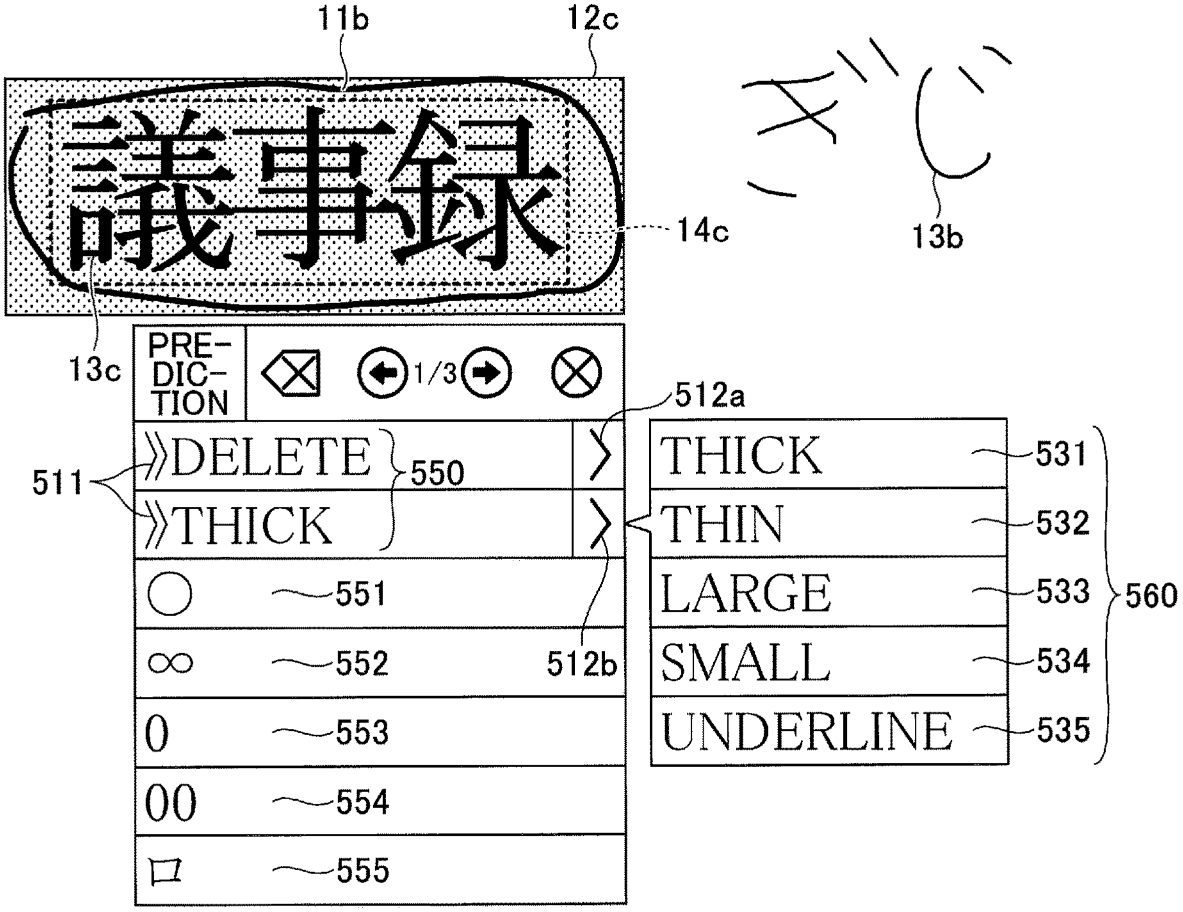

FIGS. 22A and 22B illustrate a display example of an operation command candidate based on the operation command definition data when the handwriting object illustrated in FIG. 12 is present. The difference of FIGS. 22A and 22B from FIGS. 21A and 21B is that a selection object is designated in the handwriting object lib (surrounding line) illustrated in FIG. 20B. As can be seen from a comparison among FIGS. 21A to 22B, there is no difference in the operation command candidates displayed depending on whether the handwriting object is a line or a surrounding line. When the selection object is specified, the handwriting input display control unit 23 displays the operation command candidate on the display unit 22. However, it is permissible to change the operation command candidates that recognize the handwriting object and display it in response to the handwriting object. In this case, the operation command definition data as illustrated in FIG. 12 are associated with the recognized handwriting object (-, O, etc.).

In FIGS. 22A and 22B, "○" 551, "∞" 552, "0" 553, "00" 554, and "□" 555, which are character string candidates other than the operation command candidate, are the recognition results of the surrounding line (the handwriting object 11*b*), and the character string candidate can be selected if the user intends to enter the character string instead of the operation command.

<Example of Input of Angle Information>

Figure 23A:
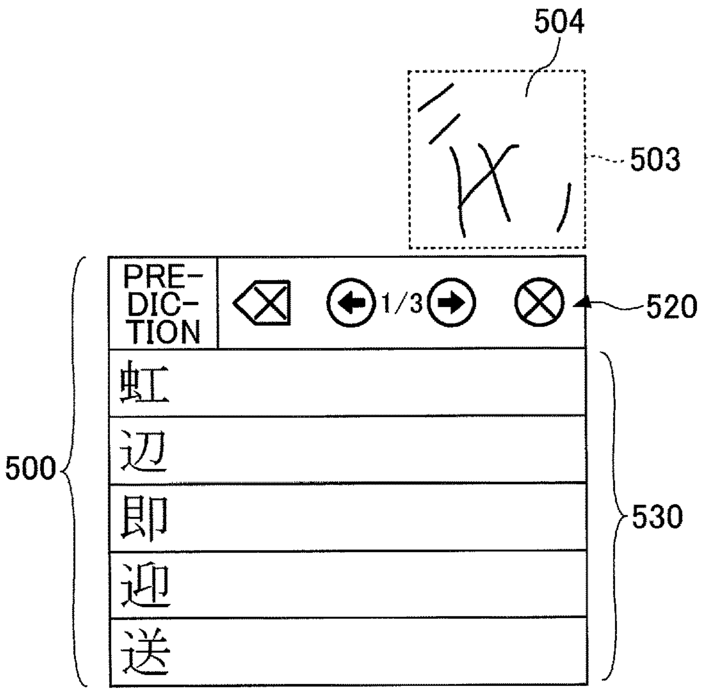
FIGS. 23A, 23B, and 23C illustrate a method for inputting angle information of 90 degrees.
Figure 23B:
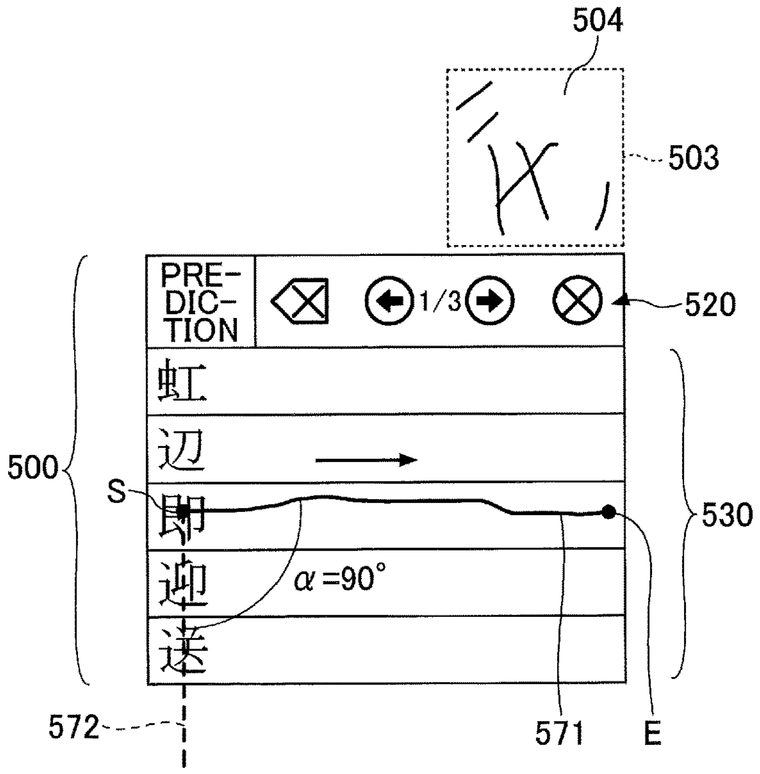
Figure 23C:
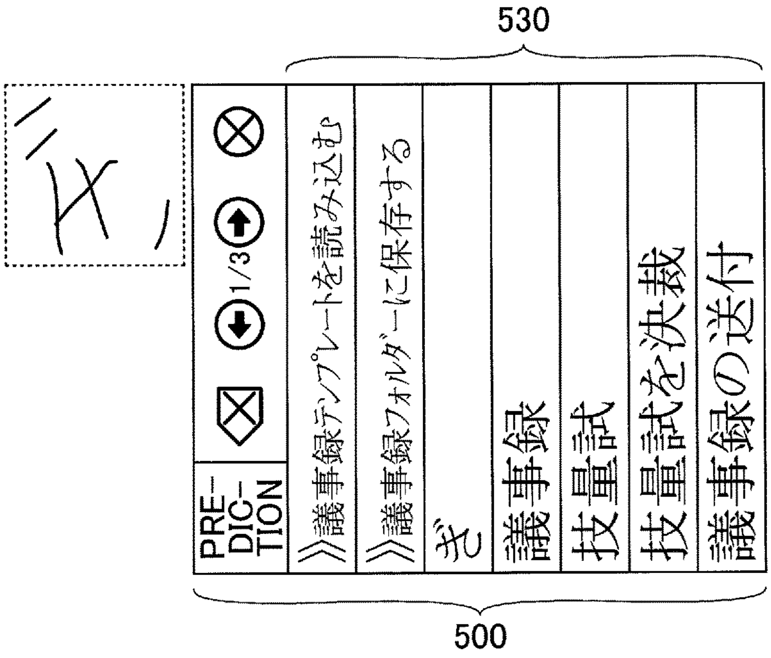

Next, a method for entering angle information will be described with reference to FIGS. 23A, 23B, and 23C. FIGS. 23A, 23B, and 23C are an example of a diagram illustrating an input method of angle information. FIGS. 23A, 23B, and 23C illustrate a case in which the user present in the 3 o'clock direction of the handwriting input apparatus 2 inputs the angle information. Because handwriting characters from the 3 o'clock direction are correctly recognized when they are rotated 90 degrees clockwise, angle information of 90 degrees is entered.

FIG. 23A illustrates a state in which the operation guide 500 is displayed because a user present in the 3 o'clock direction of the handwriting input apparatus 2 handwrites the Japanese character "Gi" corresponding to English character "meeting" in a state in which the angle information of the pen ID control data is 0 degrees (the initial value). Because the handwriting input apparatus 2 recognizes the handwritten Japanese Hiragana character "Gi (pronounced in Japanese "Gi")" from the direction of 3 o'clock while the angle information is 0 degrees, a selectable candidate 530 that is different from the expected one is displayed.

When entering the angular information, the user handwrites a straight line from top to bottom as seen by the user in the operation guide 500. FIG. 23B illustrates an example of this straight line 571. The angle α of the direction at 6 o'clock with this straight line 571, in which the angle information is 0 degrees, is angle information. That is, the angle α between the straight line 572 which is lowered in the direction from the start point S and the straight line 571 inputted by the user to 6 o'clock direction is the angle information. Briefly, the direction of the end point of the straight line 571 is angular information. Therefore, the angle information entered by the user in FIG. 23B is 90 degrees.

A method for detecting the straight line, for example, is used in which the coordinates from the start point S to the end point E are converted into a straight line by the least-square method, and the obtained correlation coefficient is compared with the threshold value to determine whether the straight line is used.

Immediately after the user starts writing the straight line 571 (immediately after the pen 2500 touches the start point S of the straight line 571), the handwriting input apparatus 2 deletes the operation guide 500. Immediately after writing the straight line 571 (immediately after the pen 2500 is separated from the end point E of the straight line 571), the handwriting input apparatus 2 searches for and determines the closest value of the above angle α from 45 degrees, 90 degrees, 135 degrees, 180 degrees, 215 degrees, 270 degrees, 315 degrees, and 360 degrees, and determines this as the angle information. The angle α itself may be used as the angle information. The angle of the pen ID control data is set to the determined angle information. The pen event transmitting unit 41 of the pen 2500 transmits the pen ID to the handwriting input apparatus 2 when the pen tip is depressed for handwriting or the like. Therefore, the handwriting input apparatus 2 can associate the pen ID control data with the angle information.

Incidentally, only the operation guide 500 can be subjected to handwriting of the straight line and inputting of the angle information. Accordingly, when the user handwrites the straight line in other than the operation guide 500, the straight line may be recognized as "1", "-", or the like, and when the straight line is handwritten by the operation guide 500, the angle information can be input. That is, the handwriting recognition control unit 26 detects the straight line from a predetermined range and converts the handwriting stroke data out of the predetermined range into text data.

Because 90 degrees of angle information (Angle) is set in the pen ID control data, the handwriting object (stroke data) is internally rotated in a clockwise direction by 90 degrees to be subjected to handwriting recognition, and the operation guide 500 is rotated in a counterclockwise direction by 90 degrees so as to be displayed.

Figure 24:
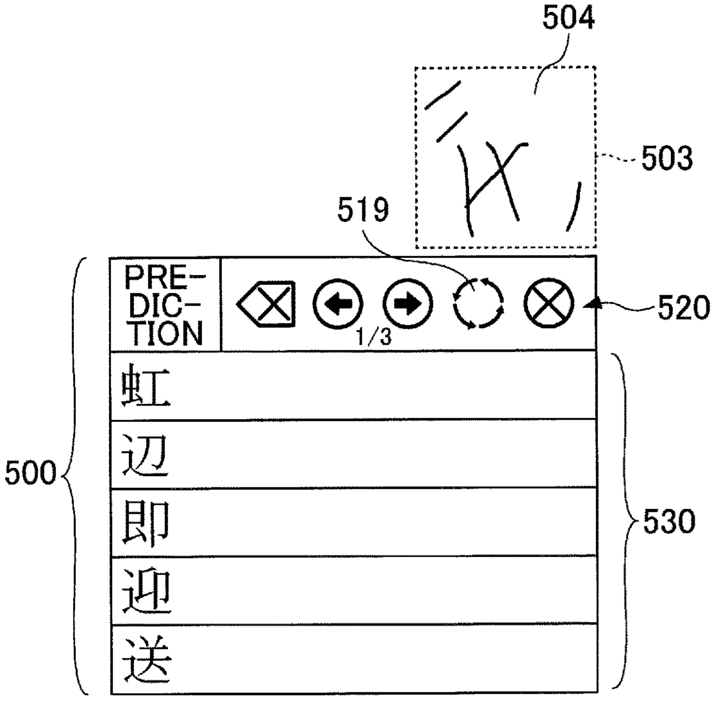
FIG. 24 illustrates another input method of angle information.

FIG. 24 is an example of a diagram illustrating another input method of the angle information. In FIG. 24, the user is present in the 3 o'clock direction of the handwriting input apparatus 2. In FIG. 24, the user present in the 3 o'clock direction of the handwriting input apparatus 2 handwrites the Japanese Hiragana letter corresponding to "gi (pronounced in Japanese "gi")" with the angle information being 0 degrees (the initial value), so that the operation guide 500 and the selectable candidate 530 are displayed. The operation guide 500 of FIG. 24 includes a rotation operation button 519 in the operation header 520.

The rotation operation button 519 is a button that adds 90 degrees of the angle information of the pen ID control data, and the added angle information is divided by 360 degrees each time the user depresses it down by the pen 2500 to obtain a remainder. This remainder becomes the angle information. The angle to be added under one pressing of the rotation operation button 519 may be set to 45 degrees.

<Example of Registering Handwriting Signature Data>

Figure 25A:
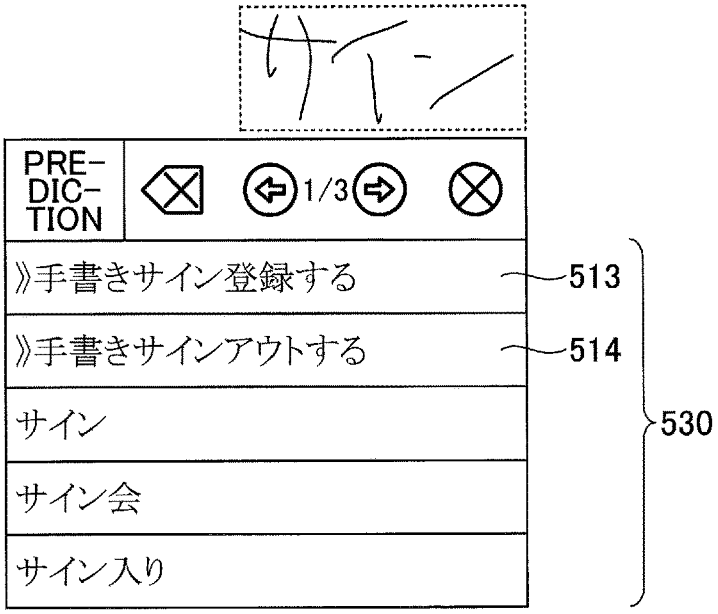
FIGS. 25A, 25B, and 25C illustrate a method of registering handwriting signature data.
Figure 25B:
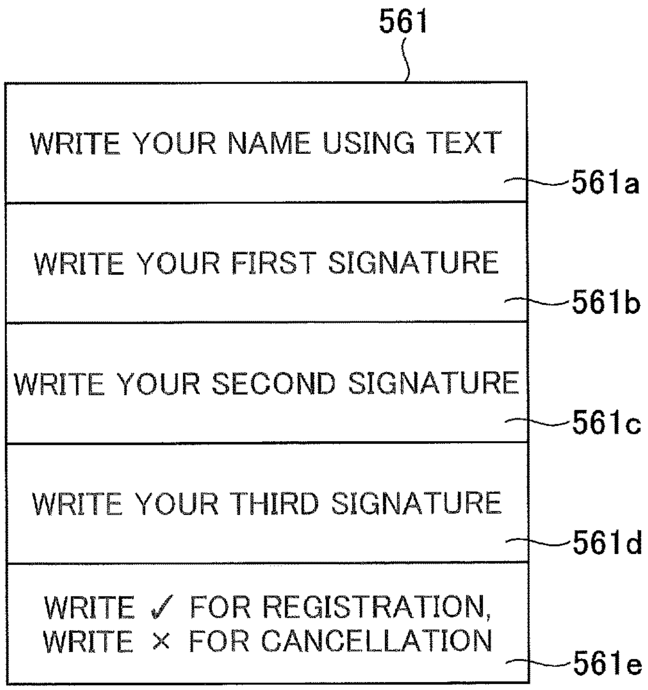
Figure 25C:
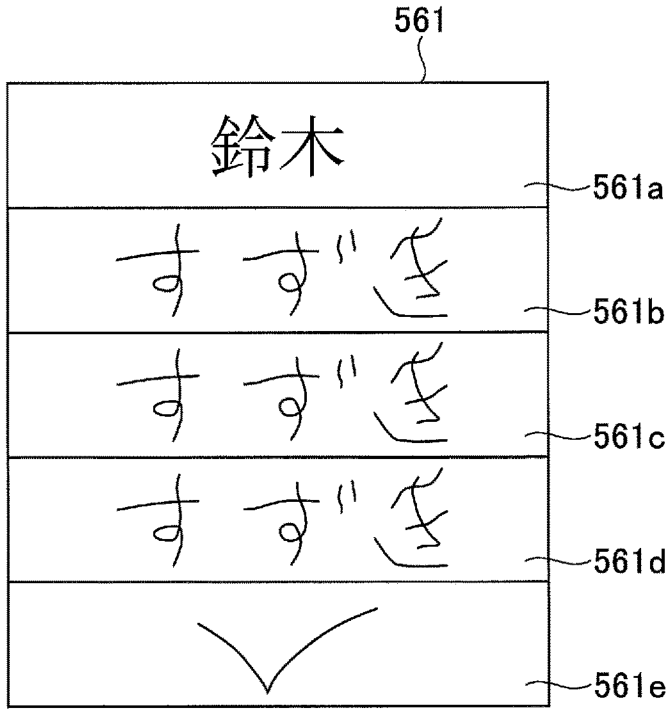

Next, an example of the registration of handwriting signature data will be described with reference to FIGS. 25A, 25B, and 25C. FIGS. 25A,25B, and 25C are a diagram illustrating a method of registering a handwriting signature data. First, FIG. 25A is an example of a selectable candidate 530 displayed when the user handwrites the Japanese Katakana character string corresponding to the English character string of "signature (pronounced in Japanese "Sain)". There are two operation commands 513 and 514 "handwriting signature registration (pronounced in Japanese "Tegaki sain touroku suru")" and "handwriting sign out (pronounced in Japanese "Tegaki sain auto suru")" based on the operation command definition data 713 and character string candidates of "signature (pronounced in Japanese "Sain")", "signature meeting (pronounced in Japanese "Sain kai")" and "with signature (pronounced in Japanese "Sain iri")", which partly coincide with the character string "signature (pronounced in Japanese "Sain")". The two operation commands 513 and 514 are displayed because the string of the operation command definition data 713 and 715 of FIG. 11 has a "signature (pronounced in Japanese "Sain)".

When the user clicks the operation command 513 of "handwriting signature registration (pronounced in Japanese "Tegaki sain touroku suru")" on the pen 2500, the handwriting signature registration form 561 illustrated in FIG. 25B is added to the handwriting input storage unit 25 and is displayed on the operation screen 101. For example, the operation guide 500 of FIG. 25A is deleted and a handwriting signature registration form 561 is displayed in the same location as the operation guide 500. The handwriting signature registration form 561 has a name entry field 561_a_, signature entry fields 561_b_ to 561_d_, and a registration confirmation field 561_e_ from top to down. The user enters a name text in the name entry field 561_a_, a first handwriting signature, a second handwriting signature, and a third handwriting signature in the signature entry fields 561_b_ to 561_d_, and a check mark or cancellation mark in the registration confirmation field 561_e_. The text of the name is the display name of this user and is converted to text data. Three handwriting signatures are entered because the feature amount is registered on the assumption that the signature differs and does not completely coincide each time the user writes it.

In general, the handwriting signature may use a user name and other characters related to the user. In addition to the user name, it may be a number such as employee number, nickname, or portrait. In addition, the handwriting signature is not limited to characters related to the user, but may be some kind of handwriting object. For example, a circle, triangle, square, symbol, or combinations thereof. The coordinates of the handwriting signature is not only feature data. Therefore, if users having the same surname of the Japanese Kanji character string corresponding to "Suzuki (as translated from Japanese into English)" can register handwriting signatures of Japanese character of "Suzuki", they are correctly authenticated.

When the user handwrites in the handwriting signature registration form 561 as directed, results in the handwriting signature registration form 561 becomes as illustrated in FIG. 25C. When the user handwrites the "check mark" in the registration confirmation field 561_e_, the handwriting signature data are registered in the handwriting signature data storage unit 39 and the handwriting signature registration form 561 is deleted. After the registration, SignatureId is assigned. Similarly, in the assigned AccountId and the name entry field 561_a_, the text of the name is registered in association SignatureId in the user-defined data. When the user handwrites the user name and signs in, the SignatureId associated with AccountId is acquired by the user-defined data and registered in the pen ID control data corresponding to the pen ID of the pen 2500 used in the handwriting signin. Thereafter, when the user uses the pen 2500, the pen ID is transmitted to the handwriting input apparatus 2, so the pen ID control data are specified by the AccountId associated with the pen ID. The operation command using the user-defined data can be executed even if the user is not aware of it.

If "x" is handwritten by the user in the registration confirmation field 561_e_, the handwriting signature registration is cancelled and the handwriting signature registration form 561 is deleted. If any error occurs in the registration, the error is displayed in the system reservation area of the operation screen 101 and or the like.

As described above, the handwriting input display control unit 23 can receive a handwriting input without distinguishing between the handwriting input to the form and the handwriting input other than the form.

<Example of Handwriting Sign-In>

Figure 26:
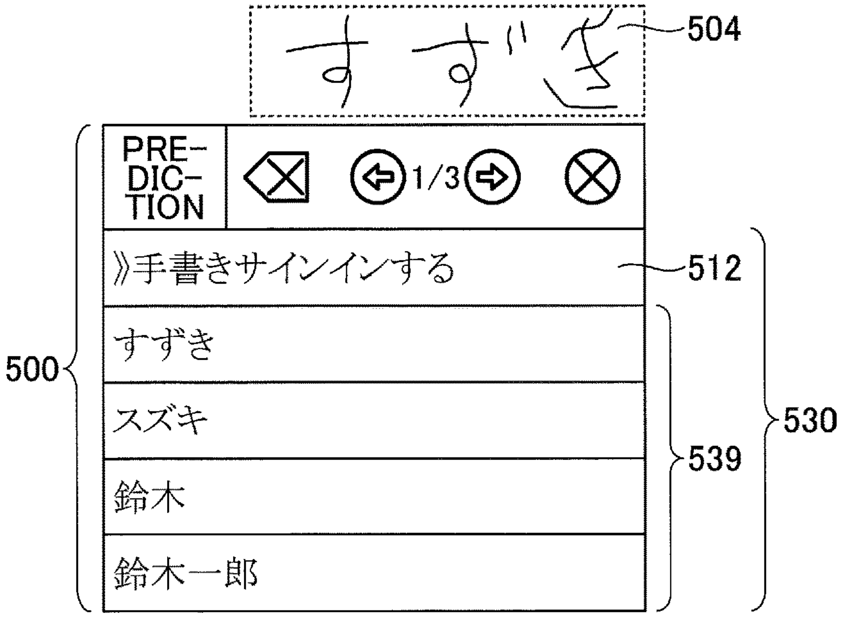
FIG. 26 illustrates an example of an operation guide displayed when a user handwrites the Japanese character corresponding to "Suzuki" which is a handwriting signature data registered by the user.

With reference to FIG. 26, described next is a method for the user to sign in after the handwriting signature data are registered. FIG. 26 illustrates an example of the operation guide 500 displayed when the user writes the handwriting Japanese Hiragana character string of "Suzuki", which had been registered by the user. Because "Suzuki" had been registered in the operation command definition unit 33 as the handwriting signature data, the "Suzuki" coincides with the handwriting signature data. Accordingly, an operation command 512 of "handwriting sign in" is displayed.

In addition, because handwriting signature data coincide, SignatureId representing "Suzuki" is specified, and the user-defined data having AccountId associated with SignatureId are identified.

If the user selects the operation command 512 "handwriting sign in", the AccountId of "Suzuki" is added to the pen ID control data associated with the pen ID of the pen 2500 being used. Thus, "Suzuki" user-defined data of "Suzuki" can be used when the operation command is used.

Because the registration of the handwriting signature data using the handwriting signature registration form 561 of FIG. 26 is controlled as a part of the processing in the normal handwriting input such as characters, the handwriting signature registration form 561 is displayed on the same operation screen as the operation screen, on which the characters and the like are written. There is no difference in the handwriting operation inside and outside of the handwriting signature registration form 561 so that the user can complete the entry into the handwriting signature registration form 561 simply by handwriting into the rule-delimited areas of the handwriting signature registration form 561.

<Example of Changing User-Defined Data>

Figures 27A, 27B:
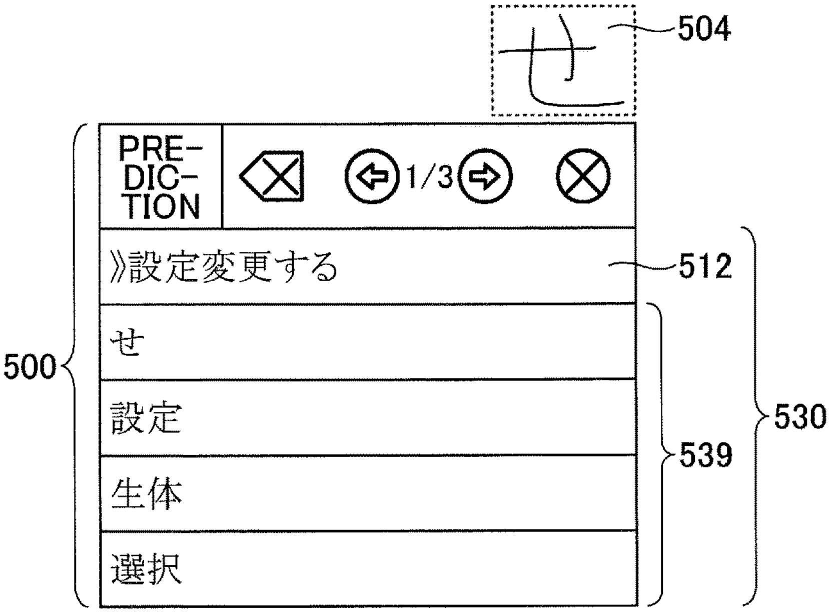
FIGS. 27A and 27B illustrate a method of changing user-defined data.

Next, a method of changing the user-defined data will be described with reference to FIGS. 27A and 27B. FIG. 27A is a diagram illustrating a method of changing the user-defined data. FIG. 27A is an example of an operation guide 500 displayed when a user manually writes a handwriting Japanese character string of "se (pronounced in Japanese "se")". In the operation command definition data 716 illustrated in FIGS. 11A and 11B, the Japanese Kanji character string corresponding to "setting (pronounced in Japanese "settei")" is defined in String, and the prediction string of the Japanese Hiragana character string "Se" contains the Japanese Kanji character string corresponding to "Settei". Therefore, the operation command of Japanese character string of "Change setting" is displayed.

If the user selects "Change setting" in the operation command 512 with the pen 2500 that is used for the handwriting sign in, the user's AccountId associated with the pen ID of the pen 2500 is specified. This specifies the user-defined data for the user who signs in. A user-defined data change form 562 illustrated in FIG. 27B is added to the handwriting input storage unit 25 and is displayed on the operation screen 101. In the example of FIG. 27, the user-defined data change form 562 is created in accordance with the user-defined data 718 illustrated in FIG. 13. The user-defined data change form 562 has a name field 562*a*, password field 562*b*, folder user name field 562*c*, folder password field 562*d*, folder file name field 562*e*, and registration or cancellation field 562*f*.

If the user has not signed in advance by hand, the handwriting input apparatus 2 cannot specify the user's AccountId, resulting in an error, and an error message is displayed in the system reservation area of the operation screen 101.

If the user-defined data change form 562 of FIG. 27B writes a password in the password field 562*b*, a folder user name in the folder user name field 562*c*, a folder password in the folder password field 562*d*, a folder file name in the folder file name field 562*e*, and a "check mark ✓" or "x" in the registration or cancellation field 562*f*, the user-defined data change is performed and the user-defined data change form 562 is deleted.

Thus, the user can manually write the stroke data invoking the user-defined data change form 562 to display the user-defined data change form 562 and optionally modify the user-defined data. The handwriting input display control unit 23 receives the handwriting input without distinguishing between the handwriting input to the form and the handwriting input other than the form.

The AccountUsername of the user-defined data is automatically displayed in the name field 562*a*. The user-defined data change form 562 can also be used for registrations as well as changes.

Because the change of user-defined data using user-defined data change form 562 of FIG. 27 is controlled as part of the normal handwriting input process such as characters, the user-defined data change form 562 is displayed on the same operation screen as the operation screen on which the characters and the like are written. There is no difference in the handwriting operation inside and outside the user-defined data change form 562. The user can complete an input to the user-defined data change form 562 simply by handwriting into an area separated by the user-defined data change form 562.

<Operation Procedure>

The above configuration and the operation of the handwriting input apparatus 2 will be described with reference to FIGS. 28 to 34. FIGS. 28 to 34 are sequence diagrams illustrating a process in which the handwriting input apparatus 2 displays a character string candidate and an operation command candidate.

The processing of FIG. 28 starts when the handwriting input apparatus 2 starts up (when the application starts). In FIGS. 28 to 34, the functions illustrated in FIG. 6 are indicated by reference numerals for the convenience of space.

S1: At first, the handwriting input display control unit 23 transmits the start of the handwriting object to the handwriting input storage unit 25. The handwriting input storage unit 25 allocates a handwriting object area (a memory area for storing handwriting objects). A user may cause a pen to contact the handwriting input unit 21 with the pen before securing the handwriting object area.

S2: The user then causes the pen to contact the handwriting input unit 21. The handwriting input unit 21 detects the pen down and transmits it to the handwriting input display control unit 23.

S3: The handwriting input display control unit 23 transmits a stroke start to the handwriting input storage unit 25, and the handwriting input storage unit 25 reserves a stroke area.

S4: When the user moves the pen in contact with the handwriting input unit 21, the handwriting input unit 21 transmits the pen coordinates to the handwriting input display control unit 23.

S5: The handwriting input display control unit 23 specifies the pen ID received from the pen 2500 at the same time as a coordinate input, and acquires current pen ID control data saved in the pen ID control data storage unit 36. Because the pen ID is transmitted at the time of inputting the coordinates, the stroke and the pen ID are associated. The pen ID control data storage unit 36 transmits the pen ID control data (color, thickness, pattern, and angle information) to the handwriting input display control unit 23. Then, the angle information is still zero as an initial value.

S6: The handwriting input display control unit 23 transmits the pen coordinate complementary display data (data interpolating discrete pen coordinates) to the display unit 22. The display unit 22 displays a line by interpolating the pen coordinates using the pen coordinate display data.

S7: The handwriting input display control unit 23 transmits the pen coordinates and the reception time thereof to the handwriting input storage unit 25. The handwriting input storage unit 25 adds a pen coordinate to the stroke. While the user is moving the pen, the handwriting input unit 21 repeatedly transmits the pen coordinates to the handwriting input display control unit 23 periodically until the processing of steps S4 to S7 is painted out.

S8: When the user separates the pen from the handwriting input unit 21, the handwriting input unit 21 transmits the pen-up to the handwriting input display control unit 23.

S9: The handwriting input display control unit 23 transmits the end of the stroke to the handwriting input storage unit 25, and the handwriting input storage unit 25 defines the pen coordinates of the stroke. The pen coordinates of the stroke cannot be added to the stroke after defining the pen coordinate of the stroke.

S10: Next, the handwriting input display control unit 23 transmits the overlap status acquisition of the rectangular area 403 near the handwriting object and the stroke rectangular area to the handwriting input storage unit 25 based on the rectangular area 403 near the handwriting object. The handwriting input storage unit 25 calculates the overlap status and transmits the overlap status to the handwriting input display control unit 23.

Subsequently, steps S11 through S17 are performed when the rectangular area near the handwriting object and the stroke rectangular area do not overlap each other.

S11: When the rectangular area near the handwriting object and the stroke rectangular area do not overlap each other, one handwriting object is determined. Therefore, the handwriting input display control unit 23 transmits the hold data clearing to the handwriting recognition control unit 26.

S12 to S14: The handwriting recognition control unit 26 transmits the hold data clearing to the character string conversion control unit 28, the prediction conversion control unit 30, and the operation command recognition control unit 32, respectively. The handwriting recognition control unit 26, the character string conversion control unit 28, the prediction conversion control unit 30, and the operation command recognition control unit 32 clear the data pertaining to the character string candidates and the operation command candidates, which have been held. At the time of clearing, the last handwriting stroke is not added to the handwriting object.

S15: The handwriting input display control unit 23 transmits the completion of the handwriting object to the handwriting input storage unit 25. The handwriting input storage unit 25 defines the handwriting object. Defining of the handwriting object unit means that one handwriting object has been completed (no more stroke is added).

S16: The handwriting input display control unit 23 transmits the start of the handwriting object to the handwriting input storage unit 25. The handwriting input storage unit 25 reserves a new handwriting object area in preparation for when the handwriting of the next handwriting object starts (pen down).

S17: Next, the handwriting input display control unit 23 transmits a stroke addition with respect to the stroke terminated in step S9 to the handwriting input storage unit 25. When steps S11 to S17 are executed, the added stroke is the first stroke of the handwriting object, and the handwriting input storage unit 25 adds the stroke data to the starting handwriting object. If steps S11 to S17 have not been performed, the additional stroke is added to the handwriting object already being handwritten.

S18: Subsequently, the handwriting input display control unit 23 transmits the addition of strokes to the handwriting recognition control unit 26. The handwriting recognition control unit 26 adds stroke data to a stroke data holding area (an area in which stroke data are temporarily saved) in which character string candidates are saved.

S19: The handwriting recognition control unit 26 performs gesture handwriting recognition on the stroke data holding area. The gesture handwriting recognition means recognition of angular information from the straight line. Because the gesture handwriting recognition is performed inside the operation guide 500, the handwriting recognition control unit 26 detects the straight line inside the operation guide 500. The position information of the operation guide 500 is transmitted to the handwriting recognition control unit 26 in step S67 described later.

S20: When a straight line in the operation guide 500 is detected, the angle α of the straight line 572 down in the direction of 6 o'clock from the start of the straight line and the counter-clockwise rotation of the user input straight line 571 is determined in units of 45 degrees. The handwriting recognition control unit 26 saves the determined angle information in the pen ID control data storage unit 36 corresponding to the pen ID of the stroke data of the straight line 571. Step S20 is performed when the straight line is detected in the operation guide 500.

S21: Next, the handwriting recognition control unit 26 specifies the pen ID received from the handwriting input unit 21 and acquires the angle information of the current pen ID control data from the pen ID control data storage unit 36.

S22: The handwriting recognition control unit 26 rotates clockwise with the angle information on which stroke data of the stroke data holding area are acquired.

S23: The handwriting recognition control unit 26 transmits the stroke data after the rotation to the handwriting signature authentication control unit 38. As described above, the stroke data are always transmitted to the handwriting signature authentication control unit 38 under the condition in which it is unclear whether the stroke data have a handwriting signature.

S24: The handwriting signature authentication control unit 38 receives the stroke data and receives the registered handwriting signature data from the handwriting signature data storage unit 39. Then, the stroke data are compared (matching) with the handwriting signature data, and the authentication result of the handwriting signature is held so as to acquire the authentication result of the handwriting signature in step S61 of the subsequent step.

S25: Next, the handwriting recognition control unit 26 performs handwriting recognition on the stroke data, and performs processing of the form when the registration or cancellation field of the form has "checkmark ✓" or "x", or performs processing of the normal handwriting recognition when the registration or cancellation field of the form does not have "checkmark ✓" or "x".

S26: When the field in the registration or cancellation field of the handwriting signature data registration form has a "check mark ✓", the handwriting signature data (the stroke data) input by the user to the handwriting signature registration form generated by the handwriting input display control unit 23 in the handwriting input storage unit 25 in step S86, described later, is transmitted to the handwriting signature authentication control unit 38 by the handwriting recognition control unit 26.

S27: The handwriting signature authentication control unit 38 registers the received handwriting signature data (stroke data) in the handwriting signature data storage unit 39. This allows SignatureId to be assigned. The SignatureId is returned to the handwriting recognition control unit 26. When the name entered in the name entry field 561*a* of the SignatureId and the handwriting signature registration form 561 is not included in the user-defined data, the handwriting recognition control unit 26 newly adds the user-defined data and assigns AccountId. The handwriting recognition control unit 26 saves the user-defined data in SignatureId. If the name entered in the name entry field 561*a* is in the user-defined data, SignatureId is saved in the user-defined data. This process associates AccountId with SignatureId. When the user-defined data are newly added, other values are not set, but the user-defined data change form 562 allows the user to register and change.

S28: The handwriting recognition control unit 26 deletes the handwriting signature registration form 561 from the handwriting input storage unit 25 upon registration of the handwriting signature data.

S29: When a field in the registration or cancellation field of the user-defined data change form is a "check mark", the handwriting recognition control unit 26 transmits the change value input to the user-defined data change form 562 generated by the handwriting input display control unit 23 in the handwriting input storage unit 25 in step S86, which will be described later, to the operation command definition unit 33.

S30: Upon execution of the user-defined data change, the handwriting recognition control unit 26 deletes the user-defined data change form 562 from the handwriting input storage unit 25.

S31: When the registration or cancellation n field of the added form in step S86, described later, is "x", the handwriting recognition control unit 26 deletes the added form in step S86 from the handwriting input storage unit 25.

S33: When the form processing is not performed, the handwriting recognition control unit 26 transmits the handwriting recognition character string candidate which is the execution result to the handwriting recognition dictionary unit 27. The handwriting recognition dictionary unit 27 transmits the language character string candidate that seems to be certain verbally to the handwriting recognition control unit 26.

S34: The handwriting recognition control unit 26 transmits the handwriting recognition character string candidate and the received language character string candidate to the character string conversion control unit 28.

S35: The character string conversion control unit 28 transmits the handwriting recognition character string candidate and the language character string candidate to the character string conversion dictionary unit 29. The character string conversion dictionary unit 29 transmits the conversion character string candidate to the character string conversion control unit 28.

S36: The character string conversion control unit 28 transmits the received conversion character string candidate to the prediction conversion control unit 30.

S37: The prediction conversion control unit 30 transmits the received conversion character string candidate to the prediction conversion dictionary unit 31. The prediction conversion dictionary unit 31 transmits the prediction character string candidate to the prediction conversion control unit 30.

S38: The prediction conversion control unit 30 transmits the received prediction character string candidate to the operation command recognition control unit 32.

S39: The operation command recognition control unit 32 transmits the received prediction character string candidate to the operation command definition unit 33. The operation command definition unit 33 transmits the operation command candidate to the operation command recognition and control unit 32. Accordingly, the operation command recognition control unit 32 can acquire the operation command candidate corresponding to the operation command definition data having a character string (String) coinciding the prediction string candidate.

Thereafter, similar processing is performed until the transmission of the operation command candidate described in steps S40 to S47.

S40: The character string conversion control unit 28 transmits the received conversion character string candidate to the operation command recognition control unit 32.

S41: The operation command recognition control unit 32 transmits the received conversion character string candidate to the operation command definition unit 33. The operation command definition unit 33 transmits the operation command candidate to the operation command recognition and control unit 32. Accordingly, the operation command recognition control unit 32 acquires the operation command candidate corresponding to the operation command definition data having the character string (String) coinciding the conversion character string candidate.

S42: The handwriting recognition control unit 26 transmits the handwriting identification character string candidate and the language character string candidate to the prediction conversion control unit 30.

S43: The prediction conversion control unit 30 transmits the handwriting recognition character string candidate and the received language character string candidate to the prediction conversion dictionary unit 31. The prediction conversion dictionary unit 31 transmits the prediction string candidate to the prediction conversion control unit 30.

S44: The prediction conversion control unit 30 transmits the received prediction character string candidate to the operation command recognition control unit 32.

S45: The operation command recognition control unit 32 transmits the received prediction character string candidate to the operation command definition unit 33. The operation command definition unit 33 transmits the operation command candidate to the operation command recognition and control unit 32. Accordingly, the operation command recognition control unit 32 can acquire the operation command candidate corresponding to the operation command definition data having a character string (String) coinciding the prediction string candidate.

S46: The handwriting recognition control unit 26 transmits the handwriting identification character string candidate and the received language character string candidate to the operation command recognition control unit 32.

S47: The operation command recognition control unit 32 transmits the handwriting recognition character string candidate and the received language character string candidate to the operation command definition unit 33. The operation command definition unit 33 transmits the operation command candidate to the operation command recognition and control unit 32. Accordingly, the operation command recognition control unit 32 can acquire the operation command candidate corresponding to the operation command definition data having the character string (String) coinciding the language character string candidate.

S48: Next, the handwriting recognition control unit 26 transmits the stroke addition to the operation command recognition control unit 32.

S49: The operation command recognition control unit 32 transmits the position information acquisition of the definitive object to the handwriting input storage unit 25. The handwriting input storage unit 25 transmits the position information of the definite object to the operation command recognition control unit 32.

S50: The operation command recognition control unit 32 determines whether the position information of the stroke received from the handwriting recognition control unit 26 and the position information of the definite object received from the handwriting input storage unit 25 are in a predetermined relationship based on the straddle line determination condition 406 and the surrounding line determination condition 407 in order to determine the selection object, and saves the definite object that can be determined to be selected as the selection object. In this case, because the selection object is specified, the operation command candidate of the I/O system is acquired from the operation command definition unit 33.

Further, the handwriting recognition control unit 26, the character string conversion control unit 28, the prediction conversion control unit 30, and the operation command recognition control unit 32 hold the data pertaining to the handwriting recognition character string candidate, the language character string candidate, the conversion character string candidate, the prediction character string candidate, the operation command candidate, and the selection object so that the data can be acquired in Steps S55 to S58 of the subsequent stage, respectively.

S18-2: The handwriting input display control unit 23 transmits the addition of strokes to the handwriting recognition control unit 26 in step S18 and transmits the start of the selectable candidate display timer to the candidate display timer control unit 24. The candidate display timer control unit 24 starts the timer.

Subsequently, steps S51 to S53 are performed if a pen-down occurs before a certain period of time elapses (before the timer times out).

S51: When the user contacts the handwriting input unit 21 with the pen before the timer expires, the handwriting input unit 21 transmits a pen-down (the same event as in step S2) to the handwriting input display control unit 23.

S52: The handwriting input display control unit 23 transmits a stroke start (the same as in step S3) to the handwriting input storage unit 25. The sequence after this is the same as in Step S3 and later.

S53: The handwriting input display control unit 23 transmits the selectable candidate display timer stop to the candidate display timer control unit 24. The candidate display timer control unit 24 stops the timer. This is because a pen-down was detected, thus eliminating the need for timers.

Steps S54 to S89 are performed when there is no pen-down (before the timer times out) before a certain period of time has elapsed. Accordingly, the operation guide 500 illustrated in FIG. 17 is displayed.

S54: The candidate display timer control unit 24 transmits a timeout to the handwriting input display control unit 23 when the user does not contact the handwriting input unit 21 during the start of the selectable candidate display timer.

S55: The handwriting input display control unit 23 transmits the acquisition of the handwriting recognition character string/language character string candidate to the handwriting recognition control unit 26. The handwriting recognition control unit 26 transmits the handwriting identification character string/language character string candidate currently held to the handwriting input display control unit 23.

S56: The handwriting input display control unit 23 transmits the conversion character string candidate acquisition to the character string conversion control unit 28. The character string conversion control unit 28 transmits the currently held conversion character string candidate to the handwriting input display control unit 23.

S57: The handwriting input display control unit 23 transmits the prediction character candidate acquisition to the prediction conversion control unit 30. The prediction conversion control unit 30 transmits the prediction string candidate currently held to the handwriting input display control unit 23.

S58: The handwriting input display control unit 23 transmits to acquire an operation command candidate to the operation command recognition control unit 32. The operation command recognition control unit 32 transmits the candidate and the selection object of the operation command currently held to the handwriting input display control unit 23.

S59: The handwriting input display control unit 23 transmits an estimated writing direction acquisition to the handwriting input storage unit 25. The handwriting input storage unit 25 determines from the stroke addition time, the horizontal distance, and the vertical distance of the stroke of the handwriting object rectangular area and transmits the estimated writing direction to the handwriting input display control unit 23.

Next, the handwriting input display control unit 23 specifies the pen ID received from the handwriting input unit 21 and acquires the angle information of the current pen ID control data from the pen ID control data storage unit 36.

S61: The handwriting input display control unit 23 acquires the handwriting signature authentication result from the handwriting signature authentication control unit 38.

This provides the user's SignatureId, so AccountId is registered with the pen ID when executing the operation command described below.

S62: The handwriting input display control unit 23 produces the handwriting recognition character string candidate of Japanese Hiragana character of (in FIG. 17, a "Gi"), the language character string candidates (in FIG. 17, there is no display, but a Japanese Kanji character of "Gi" ("meeting" as translated into English), the conversion character string candidates (in FIG. 17, Japanese Kanji character strings of "Gi-jiroku" and "Gi-ryoushi", which are respectively translated into English as "meeting minute" and "technical skill test"), the prediction character string candidates (in FIG. 17, Japanese character strings of "gi-ryoushiwokessai" and "gi-jirokunosoufusaki", which are respectively translated into English as "technical skill test is approved" and "transmission destination of meeting minute"), and the operation command candidates (in FIG. 17, Japanese character strings of "Gi-jiroku tenpuretowo yomikomu" and "Gi-jiroku tenpuretowo yomikomu", which are respectively translated in English as "read meeting minute template" and "storing in meeting minute folder"). Further, the selectable candidate display data as illustrated in FIG. 17 is created from each selection probability and estimated writing direction. Furthermore, the handwriting input display control unit 23 rotates the selectable candidate display data (in the operation guide 500) based on the angle information acquired in step S60 counterclockwise and transmits the selectable candidate display data (the operation guide 500) after the rotation to the display unit 22 so as to display.

S63: The handwriting input display control unit 23 rotates the rectangular area display data (rectangular frame) of the handwriting object and the selection object (in FIG. 17, the handwriting object rectangular area display 503) counterclockwise using the angle information acquired in step S60 and displays it by transmitting it to the display unit 22.

S64: The handwriting input display control unit 23 transmits the start of the selectable candidate display deletion timer to the candidate display timer control unit 24 in order to delete the selected candidate display data after a certain time from the display. The candidate display timer control unit 24 starts the timer.

Steps S65 to S70 are performed when a user deletes the selectable candidate display displayed on the display unit 22, when a change occurs in a handwriting object (that is, when a stroke of a handwriting object is added, deleted, moved, deformed, or partitioned), or when a candidate is not selected before the timeout, while starting the selectable candidate deletion timer.

Further, steps S65-S67 are performed when the candidate display is deleted or a change in the handwriting object occurs.

S65: The handwriting input unit 21 transmits the occurrence of the selectable candidate display deletion or the change of the handwriting object to the handwriting input display control unit 23.

S66: The handwriting input display control unit 23 transmits a selectable candidate deletion timer stop. The candidate display timer control unit 24 stops the timer. This is because a timer is not required because the handwriting object is manipulated within a certain period of time.

S67: The handwriting input display control unit 23 saves the position information of the operation guide 500 in the handwriting recognition control unit 26 for use in gesture determination of the gesture of the gesture hand recognition of step S19. The positional information may be, for example, the coordinates of the upper left corner and the lower right corner or their equivalent. Thus, the handwriting recognition control unit 26 can determine whether the straight line used for inputting the angle information is within the operation guide 500.

S69: The handwriting input display control unit 23 transmits the deletion of the selectable candidate display data to the display unit 22 to delete the display.

S70: The handwriting input display control unit 23 transmits the deletion of the rectangular area display data of the handwriting object and the selection object to the display unit 22 to delete the display. Therefore, if the display of the operation command candidate is deleted under conditions other than the selection of the operation command candidate, the display of the handwriting object is held.

S68: Meanwhile, when no selectable candidate display deletion or handwriting object change occurs during the start of the selectable candidate deletion timer (when the user did not perform the pen operation), the candidate display timer control unit 24 transmits the timeout to the handwriting input display control unit 23.

Similarly, after the timeout of the selectable candidate display deletion timer, the handwriting input display control unit 23 executes steps S69 and S70. This is because the selectable candidate display data and the rectangular area display data of the handwriting object and the selection object may be deleted within a certain period of time.

If the user selects the selectable candidate during the start of the selectable candidate deletion timer, steps S71 to S89 are executed.

S71: When the user selects the selectable candidate during the start of the selectable candidate deletion timer, the handwriting input unit 21 transmits the selection of the character string candidate or the operation command candidate to the handwriting input display control unit 23.

S71-2: The handwriting input display control unit 23 transmits a stop of the selectable candidate display deletion timer to the candidate display timer control unit 24. The candidate display timer control unit 24 stops the timer.

S72: Next, the handwriting input display control unit 23 transmits the hold data clearing to the handwriting recognition control unit 26.

S73: The handwriting recognition control unit 26 transmits the hold data clearing to the character string conversion control unit 28.

S74: The handwriting recognition control unit 26 transmits the hold data clearing to the prediction conversion control unit 30.

S75: The handwriting recognition control unit 26 transmits the hold data clearing to the operation command recognition control unit 32.

The handwriting recognition control unit 26, the character string conversion control unit 28, the prediction conversion control unit 30, and the operation command recognition control unit 32 clear data pertaining to the character string candidates and the candidates of the operation commands that have been held therein.

S76: Next, the handwriting input display control unit 23 transmits the deletion of the selectable candidate display data to the display unit 22 to delete the display.

S77: The handwriting input display control unit 23 transmits the deletion of the rectangular area display data of the handwriting object and the selection object to the display unit 22 to delete the display.

S78: The handwriting input display control unit 23 deletes the display by transmitting the handwriting object display data deletion and the pen coordinate supplemental display data deletion transmitted in step S6 to the display unit 22. This is because a character string candidate or an operation command candidate has been selected, thus eliminating the need for handwriting objects, etc.

S79: The handwriting input display control unit 23 transmits the handwriting object deletion to the handwriting input storage unit 25.

If a string candidate is selected, steps S80 to S82 are executed.

S80: When the character string candidate is selected, the handwriting input display control unit 23 transmits the addition of the character string object to the handwriting input storage unit 25.

S81: The handwriting input display control unit 23 transmits the character string object font acquisition to the handwriting input storage unit 25. The handwriting input storage unit 25 selects the defined font from the estimated character size of the handwriting object and transmits the selected font to the handwriting input display control unit 23.

S82: Next, the handwriting input display control unit 23 transmits the character string object display data, which is displayed at the same position as the handwriting object, to the display unit 22 using the defined font received from the handwriting input storage unit 25 to display the character string object display data.

If an operation command candidate is selected, steps S83 through S88 are executed. Additionally, step S83 to S85 is executed if a selection object is present.

S83: When the operation command candidate to the selection object is selected (when the selection object exists), the handwriting input display control unit 23 transmits the deletion of the selection object display data to the display unit 22 to delete the display. This is to delete the original selection object once.

S84: Next, the handwriting input display control unit 23 transmits the operation command to the selection object to the handwriting input storage unit 25. The handwriting input storage unit 25 transmits display data (display data after editing or modification) of the new selection object to the handwriting input display control unit 23.

S85: Next, the handwriting input display control unit 23 transmits the selection object display data to the display unit 22 so that the selection object after executing the operation command is displayed again.

When "to register the handwriting signature" of the operation command definition data 713 as the operation command of the I/O system or "to change the setting" of the operation command definition data 716 is designated, the handwriting input display control unit 23 adds the handwriting signature registration form 561 or the user-defined data change form to the handwriting input storage unit 25.

S87: When the operation command of the I/O system is selected, the handwriting input display control unit 23 executes the operation command string (Command) of the operation command definition data corresponding to the operation command selected by the user.

When the operation command 512 for signing in is executed, the handwriting input display control unit 23 acquires the pen ID received by the input-unit-communication unit 37 when the operation command 512 is executed. The handwriting input display control unit 23 specifies the user-defined data having the SignatureId acquired in step S61 and acquires the AccountId from the user-defined data. Then, AccountId is registered in the pen ID control data corresponding to the pen ID. Thus, the pen 2500 and the user are associated with each other, and the handwriting input apparatus 2 can process using user-defined data.

When the operation command is executed after the user signs in, the handwriting input display control unit 23 acquires AccountId associated with the pen ID received by the input-unit-communication unit 37 from the pen ID control data when the operation command is executed. The handwriting input display control unit 23 specifies user-defined data with this AccountId and sets it to %~% of the operation command and executes the operation.

As illustrated in FIG. 24, when the user depresses the rotation operation button 519 of the operation header 520, the handwriting input display control unit 23 receives the angle information according to the number of depresses of the rotation operation button 519. The handwriting input display control unit 23 corresponds to the pen ID received from the pen 2500 when the rotation operation button 519 is depressed and saves the received angle information in the pen ID control data storage unit 36.

S89: The handwriting input display control unit 23 transmits the start of the handwriting object to the handwriting input storage unit 25 for the next handwriting object. The handwriting input storage unit 25 reserves the handwriting object area. Thereafter, the process of steps S2 to S89 is repeated.

[Summary]

As described above, the handwriting input apparatus 2 according to the embodiment can be handwritten by a user without distinguishing between input of characters or the like and input of a handwriting sign, and can be manually called by a user without distinguishing between various operation commands and an operation command 512 for signing in.

In addition, the handwriting input apparatus 2 according to this embodiment does not use a keyboard on the screen, and it is possible for the user to authenticate only by handwriting intuitively by the user without adding special hardware such as an IC card. Because handwriting is intuitive, it can be expected to reduce the cost of learning how to manipulate handwriting devices. Similarly, it is possible to sign out simply by handwriting a predetermined character or the like. In addition, users can register handwriting signature data by themselves.

After signing in by hand, the user's identity (AccountId) is mapped to the pen used for signing in, and user-defined data can be used to execute the operation command. The user-defined data can also be changed manually.

Further, the handwriting input apparatus 2 according to this embodiment does not need to select an operation menu and select an operation from the list of buttons, and can input an operation command in the same manner as when a character is handwritten. Because the operation command and the selectable candidate 530 are simultaneously displayed in the operation guide, the user can use the handwriting input apparatus 2 without distinguishing between input of characters or the like and selection of the operation command. The user can manually write a handwriting object or enclose the definitive object with a straight line to display any operation command candidate. Accordingly, any function (such as an editing function, an input/output function, or a pen function) can be called from a handwriting state. This eliminates the need for step-by-step operation of depressing the menu button to invoke a desired function, thereby reducing the operational procedure from the user's handwriting state to the invocation of any function.

<Another Example of Handwriting Input Apparatus Configuration>

Although the handwriting input apparatus 2 according to this embodiment is described as having a large touch panel, the handwriting input apparatus is not limited to those having a touch panel.

Figure 35:
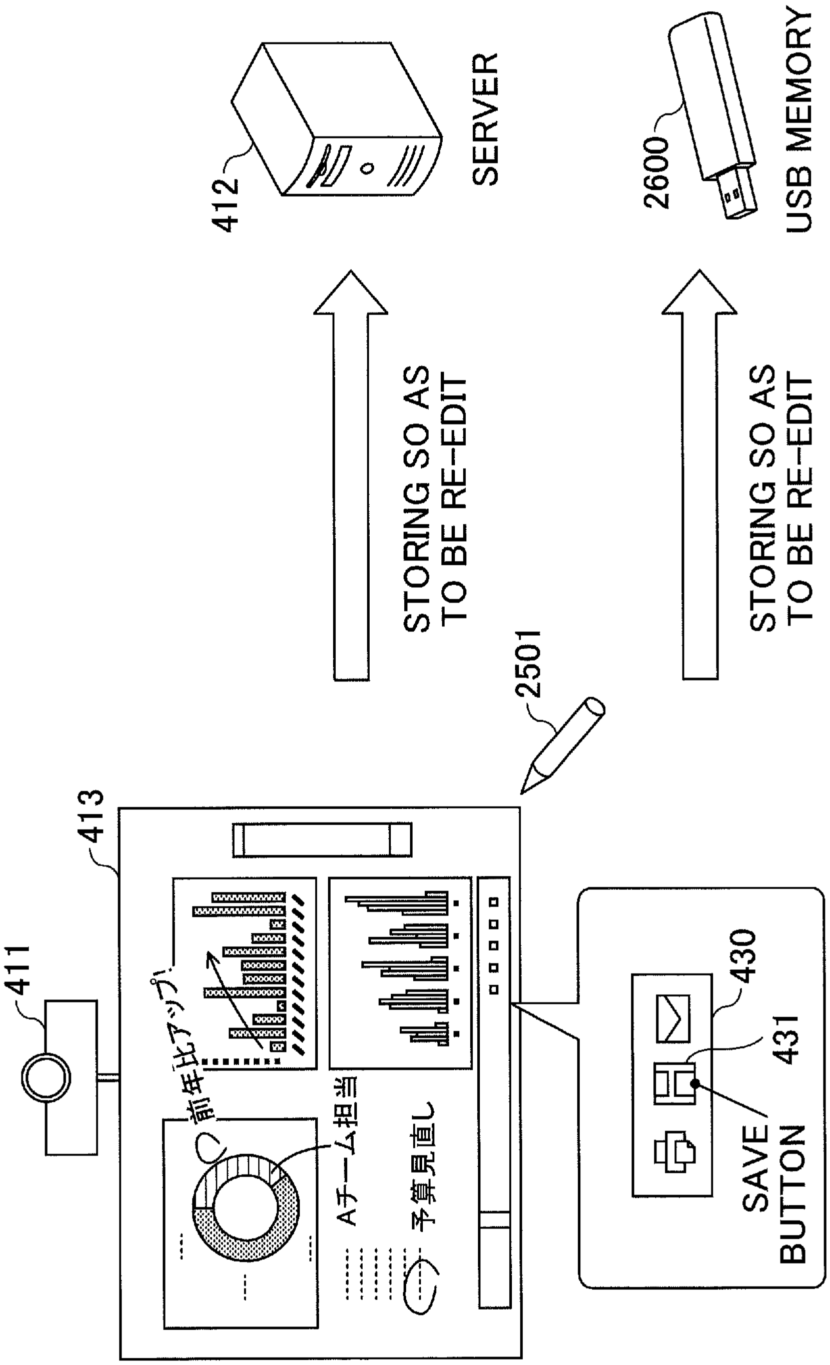
FIG. 35 illustrates another configuration example of a handwriting input apparatus.

FIG. 35 is a diagram illustrating another configuration example of a handwriting input apparatus. In FIG. 35, a projector 411 is located above a conventional whiteboard 413. The projector 411 corresponds to the handwriting input apparatus. A typical whiteboard 413 is not a flat panel display integrated with a touch panel, but rather a whiteboard that a user writes directly with a marker. The whiteboard may be a blackboard, and only a flat surface is sufficient to be broad to project images.

The projector 411 has an optical system with an ultra-short focal length so that images having a small distortion can be projected onto the whiteboard 413 from a distance of about 10 cm. The image may be transmitted from a PC 400-1 which is provided with wired connection or wireless connection or may be saved by a projector 411.

The user handwrites on a whiteboard 413 using a dedicated electronic pen 2501. The electronic pen 2501 has a light emitting portion at a tip portion, for example, where the light emitting portion is rotated on when the user depresses against the whiteboard 413 for handwriting. The light wavelength is near-infrared or infrared, so it is invisible to the user. The projector 411 includes a camera that captures the light emitting portion and analyzes the image to determine the direction of the electron pen 2501. The electron pen 2501 emits a sound wave together with a light emission, and the projector 411 calculates a distance according to the time of arrival of the sound wave. The orientation and distance permit the location of the electron pen 2501. A stroke is drawn (projected) at the position of the electron pen 2501.

The projector 411 projects menu 430, so when a user depresses a button at the electron pen 2501, the projector 411 identifies the position of the electronic pen 2501 and the button pushed by the ON signal of the switch. For example, when the save button 431 is depressed, a user's handwriting stroke (a set of coordinates) is saved on the projector 411. The projector 411 saves handwriting information on a predetermined server 412 or USB memory 2600 or the like. Handwritten information is saved for each page. The coordinates are saved instead of image data, allowing the user to edit again. In this embodiment, however, the menu 430 is not required to be displayed because the operation commands can be called by handwriting.

<Another Example of Handwriting Input Apparatus Configuration>

Figure 36:
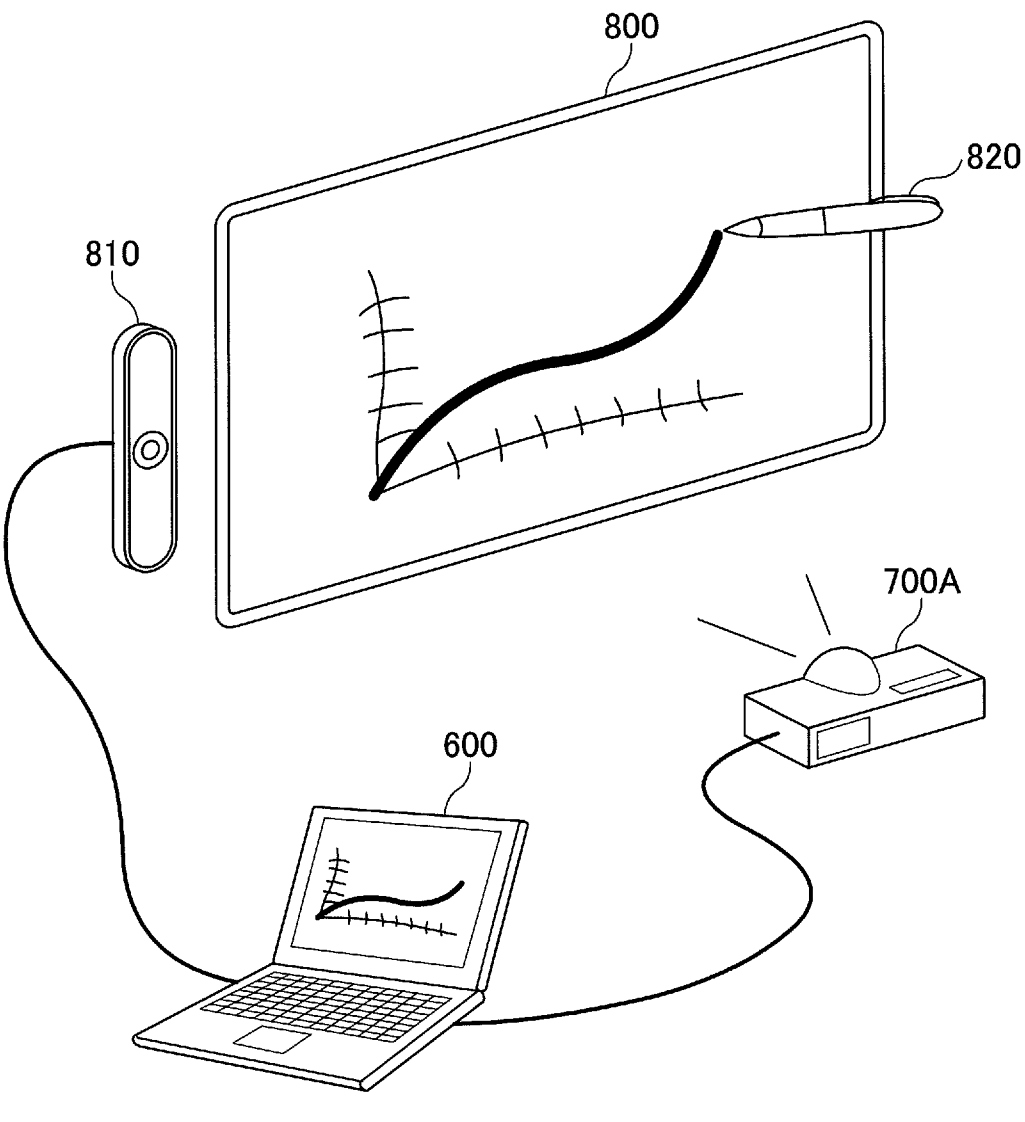
FIG. 36 illustrates another configuration example of a handwriting input apparatus.

FIG. 36 is a diagram illustrating another configuration example of the handwriting input apparatus 2. In the example of FIG. 36, a handwriting input apparatus 2 includes a terminal device 600, an image projector 700A, and a pen motion detecting device 810.

The terminal device 600 is wired to the image projector 700A and the pen motion detecting device 810. The image projector 700A causes the image data input by the terminal device 600 to be projected onto the screen 800.

A pen motion detecting device 810 is in communication with the electronic pen 820 and detects operation of the electronic pen 820 in the vicinity of the screen 800. Specifically, the electronic pen 820 detects and transmits coordinate information indicating a point represented by the electronic pen 820 on the screen 800 to the terminal device 600.

The terminal device 600 generates the image data of the stroke image input by the electronic pen 820 based on the coordinate information received from the pen motion detecting device 810. The terminal device 600 causes the image projector 700A to draw a stroke image onto the screen 800.

The terminal device 600 generates superimposed image data representing a superimposed image composed of a background image projected onto the image projector 700A and a stroke image input by the electronic pen 820.

<Another Example 3 of Configuration of Handwriting Input Apparatus>

Figure 37:
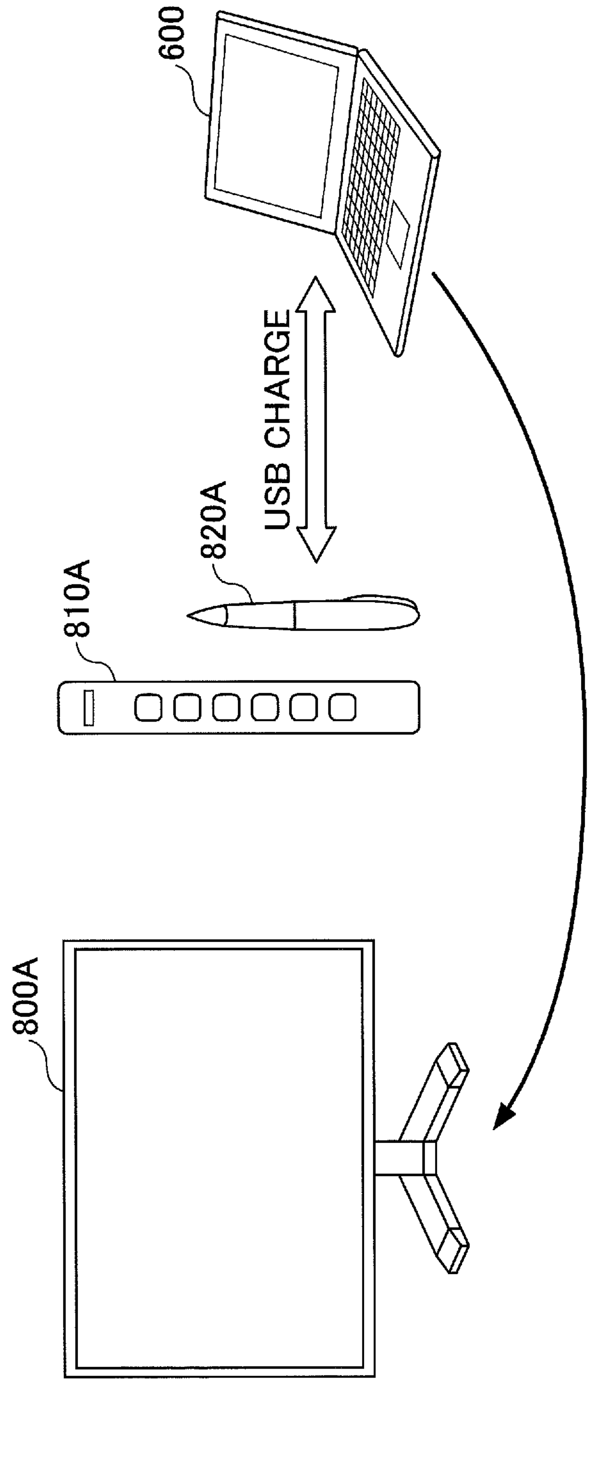
FIG. 37 illustrates another configuration example of a handwriting input apparatus.

FIG. 37 is a diagram illustrating an example of a configuration of a handwriting input apparatus.

In the example of FIG. 37, the handwriting input apparatus includes a terminal device 600, a display 800A, and a pen motion detecting device 810.

A pen motion detecting device 810 is positioned in the vicinity of the display 800A. The pen motion detecting device 810 detects coordinate information representing a point represented by the electronic pen 820A on the display 800A and transmits the coordinate information to the terminal device 600. In the example of FIG. 37, the electronic pen 820A may be charged by the terminal device 600 via a USB connector.

The terminal device 600 generates image data of a stroke image input by the electronic pen 820A based on coordinate information received from the pen motion detecting device 810. Displayed on terminal device 600 display 800A.

<Another Example of Handwriting Input Apparatus Configuration>

Figure 38:
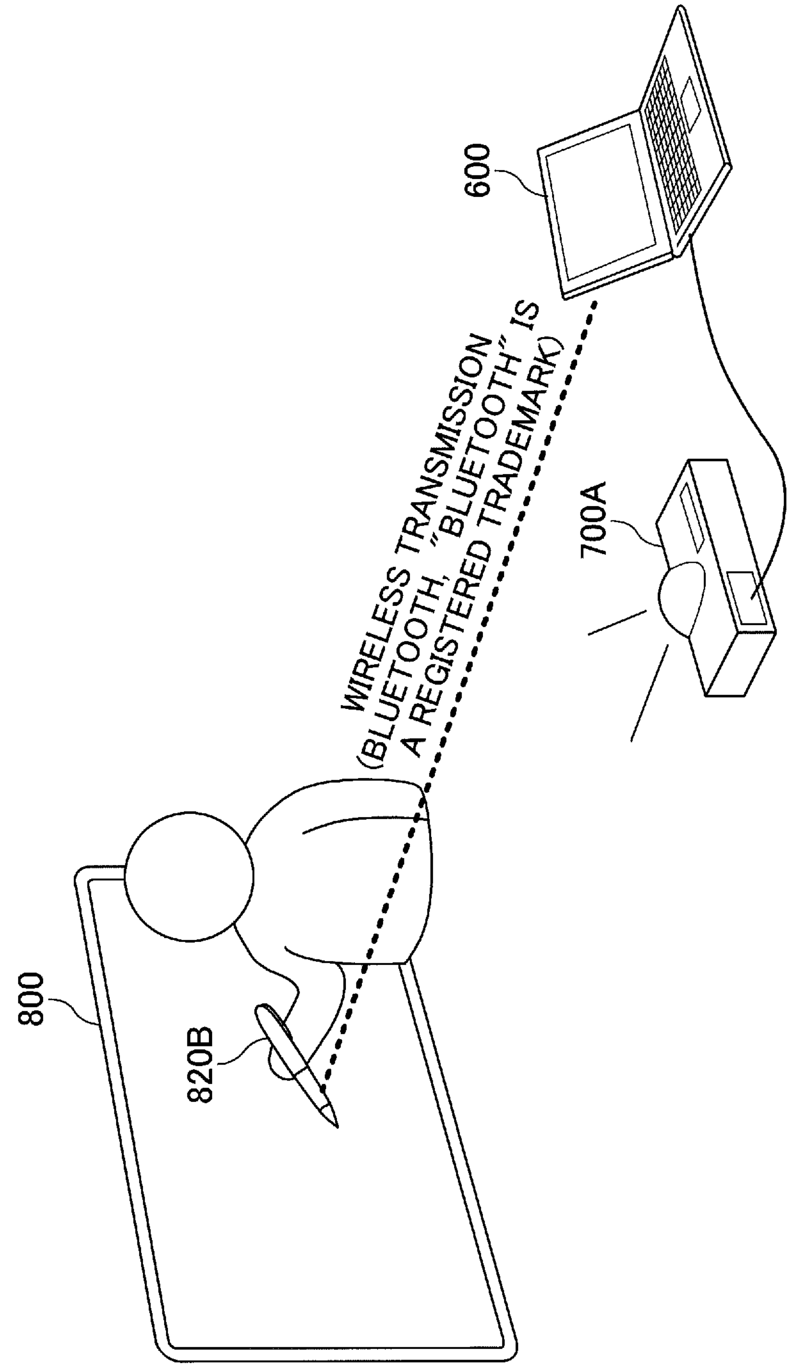
FIG. 38 illustrates another configuration example of a handwriting input apparatus.

FIG. 38 is a diagram illustrating an example of the configuration of the handwriting input apparatus. In the example of FIG. 38, a handwriting input apparatus includes a terminal device 600 and an image projector 700A.

The terminal device 600 performs wireless communication (e.g., Bluetooth: "Bluetooth" is a registered trademark) with the electronic pen 820B to receive coordinate information of the point indicated by the electronic pen 820B on the screen 800. The terminal device 600 generates image data of a stroke image input by the electronic pen 820B based on the received coordinate information. The terminal device 600 causes the image projector 700A to project a stroke image.

The terminal device 600 generates superimposed image data representing a superimposed image composed of a background image projected onto the image projector 700A and a stroke image input by the electronic pen 820.

As described above, each of the above-described embodiments can be applied in various system configurations.

Second Embodiment

In this embodiment, a system-type handwriting input system in which an information processing system on a network performs processing such as handwriting recognition and returns a result of the processing to the handwriting input apparatus 2 will be described.

In the description of this embodiment, because the components or the contents of the drawings having the same reference numerals in the first embodiment perform the same function, the description of the components described once may be omitted or only the differences may be described.

Figure 39:
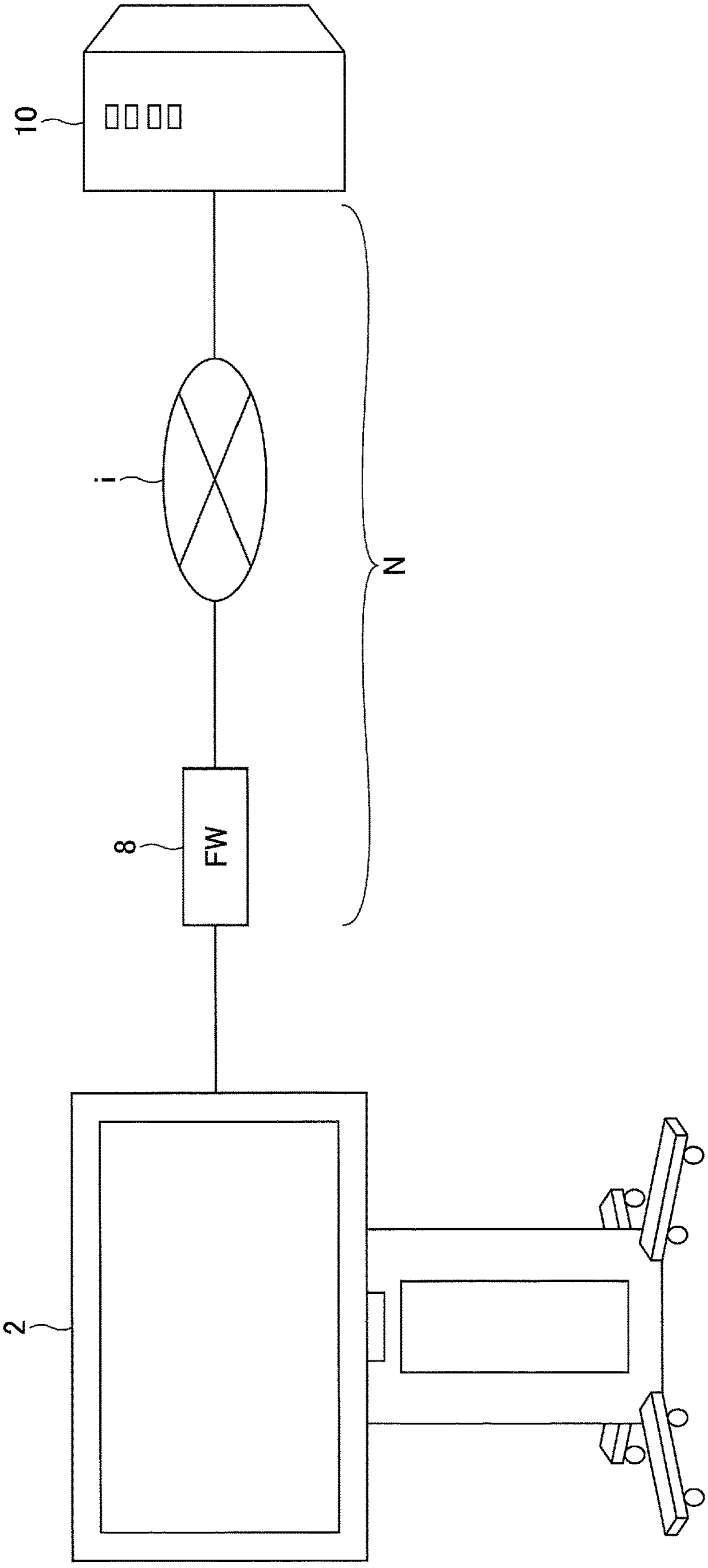
FIG. 39 is an example of a system configuration diagram of a handwriting input system (Second Embodiment).

FIG. 39 is an example of a system configuration diagram of a handwriting input system 100. The handwriting input system 100 includes a handwriting input apparatus 2 capable of communicating through the network N and an information processing system 10.

The handwriting input apparatus 2 is located in a facility, such as an office, and is connected to a LAN or Wi-Fi located within the facility. The information processing system 10 is disposed at, for example, a data center. The handwriting input apparatus 2 is connected to the Internet i via the firewall 8, and the information processing system 10 is also connected to the Internet i via a high-speed LAN in the data center.

The handwriting input apparatus 2 may be connected to the Internet i using wireless communication such as a telephone line network. In this case, the wireless communication is 3G (3rd Generation), 4G (4th Generation), 5G (5th Generation), LTE (Long Term Evolution), WiMAX (Worldwide Interoperability for Microwave Access), etc.

The information processing system 10 includes one or more information processing devices, and the one or more information processing apparatus provide a service to the handwriting input apparatus 2 as a server. The server is a computer or software that functions to provide information and processing results in response to a client's request. As will be described later, the information processing system 10 receives the pen coordinates from the handwriting input apparatus 2 and transmits necessary information for displaying the operation guide 500 illustrated in FIG. 17 to the handwriting input apparatus 2.

A server side system may be called a cloud system. The cloud system is a system that uses cloud computing. Cloud computing is a form of use in which a resource on a network is used without being aware of specific hardware resources. The cloud system does not necessarily deploy on the Internet. In FIG. 39, an information processing system is located on the Internet, but may be located on a local network (in this case referred to as an on-premise).

Further, in some embodiments, the information processing system 10 includes a plurality of computing devices such as server clusters. The plurality of computing devices are configured to communicate with each other via any type of communication link, including networks, shared memory, and the like, and perform the processes disclosed herein.

The configuration of the handwriting input apparatus 2 may be the same as that of the first embodiment, but in this embodiment, a touch panel, a display, and a communication function may be provided. The handwriting input apparatus 2 may include a plurality of computing devices configured to communicate with each other.

In this embodiment, a typical information processing device, such as a PC or a tablet, can execute a web browser or a dedicated application. A web browser or a dedicated application communicates with the information processing system 10. When the Web browser operates, the user enters or selects a URL of the information processing system 10 to connect a handwriting input apparatus to the information processing system 10. The handwriting input apparatus 2 executes the web application provided by the information processing system 10 in the web browser. The Web app refers to software or a mechanism for running on a web browser by coordinating programs in a programming language (e.g., JavaScript) running on a web browser with programs running on a web server.

When a dedicated application operates, it is connected to the URL of the information processing system 10 which is registered in advance. Because the dedicated application has a program and a user interface, the program necessary information is transmitted to and received from the information processing system 10 and displayed on the user interface.

The communication method may be a general-purpose communication protocol such as HTTP, HTTPs, and WebSocket, or it may be a dedicated communication protocol.

<Example of Hardware Configuration>

The hardware configuration of the handwriting input apparatus 2 may be the same as that of FIG. 5. In this embodiment, an example of hardware configuration the information processing system 10 will be described.

Figure 40:
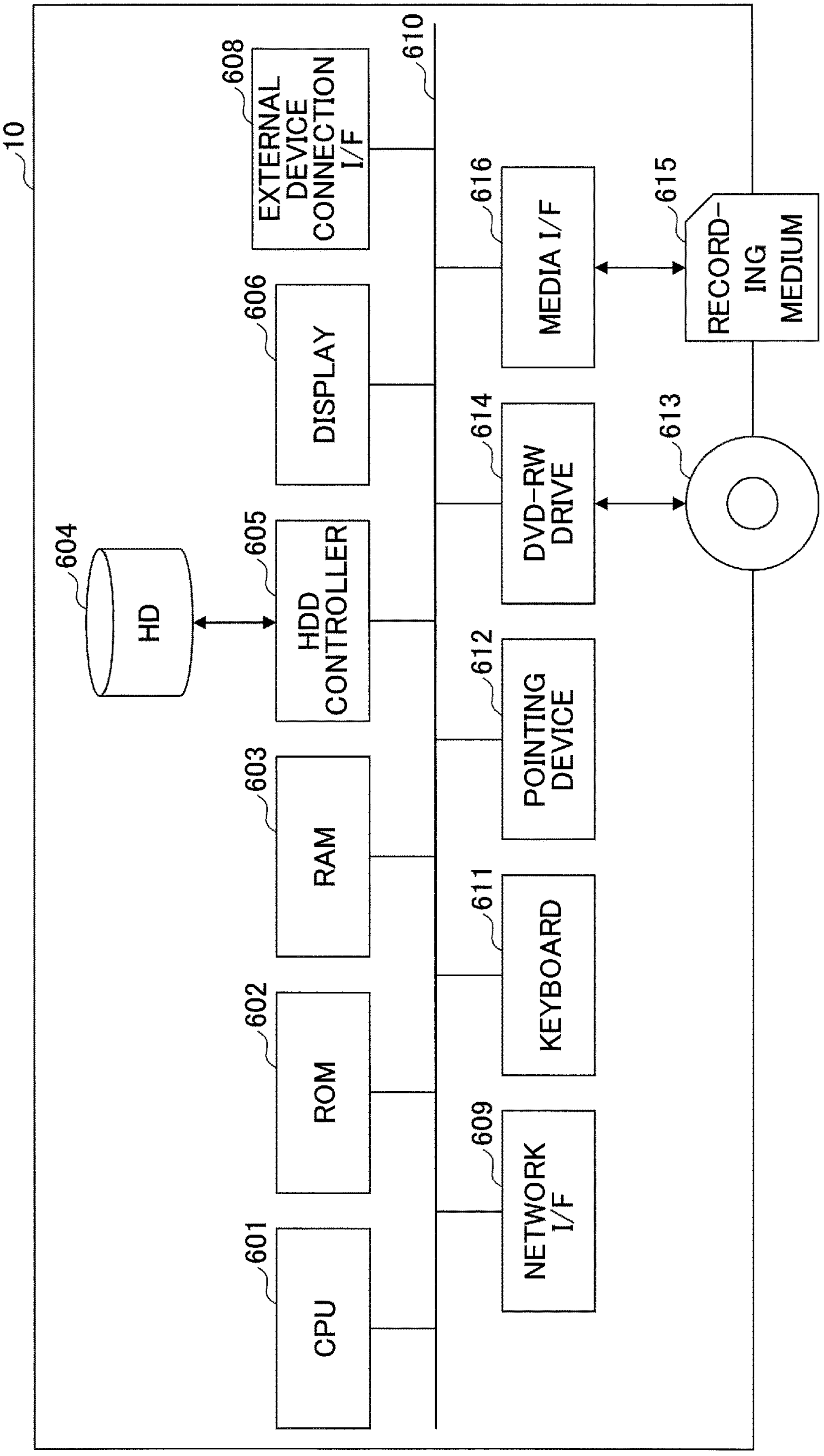
FIG. 40 is an example of a hardware configuration diagram of an information processing system.

FIG. 40 is a diagram illustrating the hardware configuration of the information processing system 10. As illustrated in FIG. 40, the information processing system 10 is constructed by a computer and includes a CPU 601, ROM 602, RAM 603, HD 604, an HDD (hard disk drive) controller 605, a display 606, an external device connection I/F (interface) 608, a network I/F 609, a bus line 610, a keyboard 611, a pointing device 612, a DVD-RW (Digital Versatile Disk Rewritable) drive 614, and a media I/F 616, as illustrated in FIG. 40.

From among these, the CPU 601 controls the operation of the entire information processing system 10. The ROM 602 saves a program used to drive the CPU 601, such as an IPL. The RAM 603 is used as the work area of CPU 601. The HD 604 saves various data such as a program. The HDD controller 605 controls the reading or writing of various data to the HD 604 in accordance with the control of the CPU 601. The display 606 displays various information such as cursors, menus, windows, characters, or images. The external device connection I/F 608 is an interface for connecting various external devices. In this case, the external device may be, for example, a USB (Universal Serial Bus) memory or a printer. The network I/F 609 is an interface for performing data communication using a communication network. The bus line 610 is an address bus, data bus, or the like for electrically connecting components such as CPU 601 illustrated in FIG. 40.

The keyboard 611 also includes a plurality of keys for input of characters, numbers, various indications, and the like. The pointing device 612 is a type of input unit for selecting and executing various instructions, selecting a processing target, moving a cursor, and the like. The DVD-RW drive 614 controls the reading or writing of various data to the DVD-RW 613 as an example of a removable recording medium. It is not limited to DVD-RW, but may be DVD-R, etc. The media I/F 616 controls the reading or writing (storage) of data to a recording medium 615, such as a flash memory.

<Function of Equipment>

Figure 41:
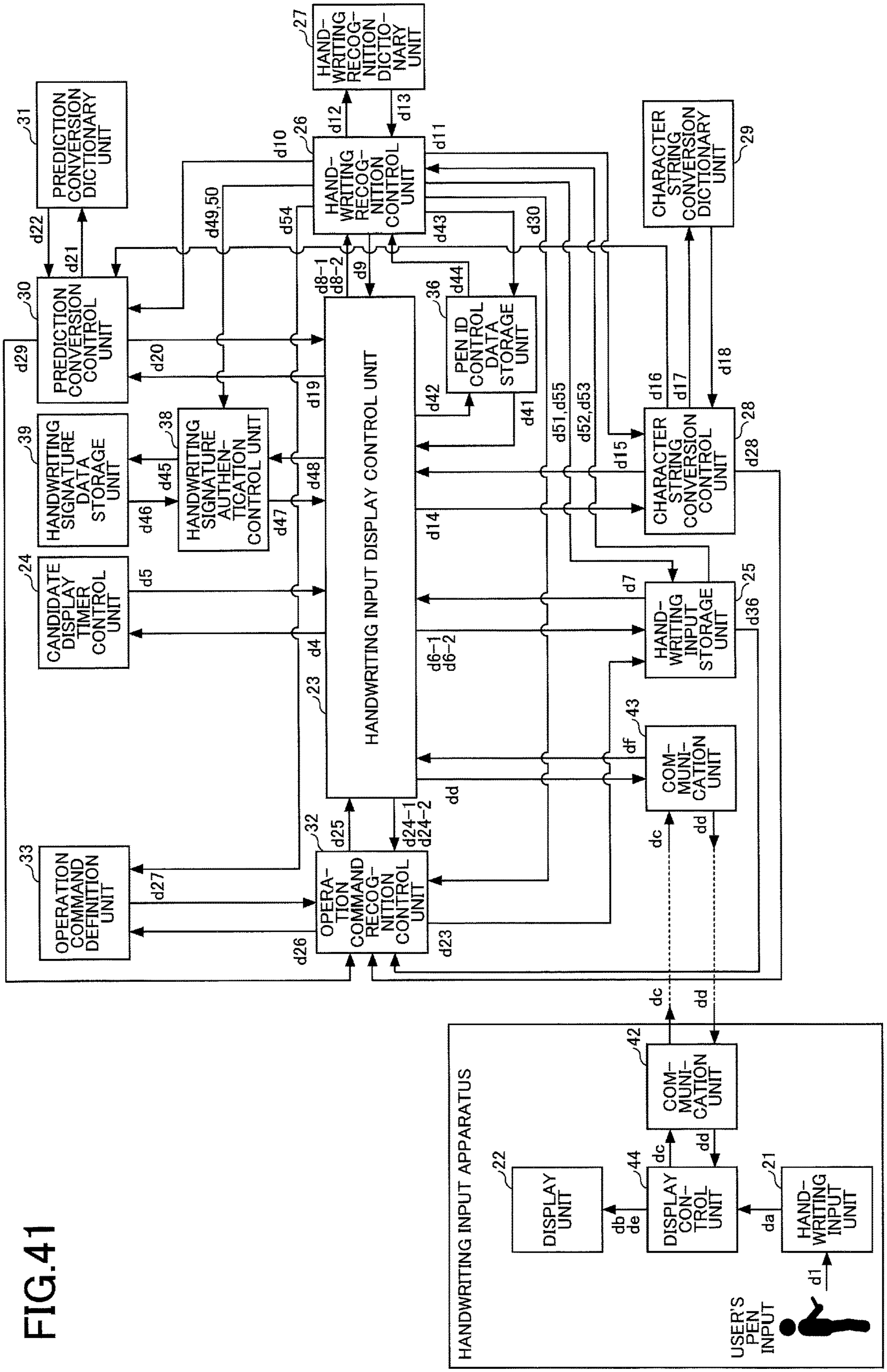
FIG. 41 is an example of a functional block diagram illustrating a function of a handwriting input system in a block pattern.
Figure 42:
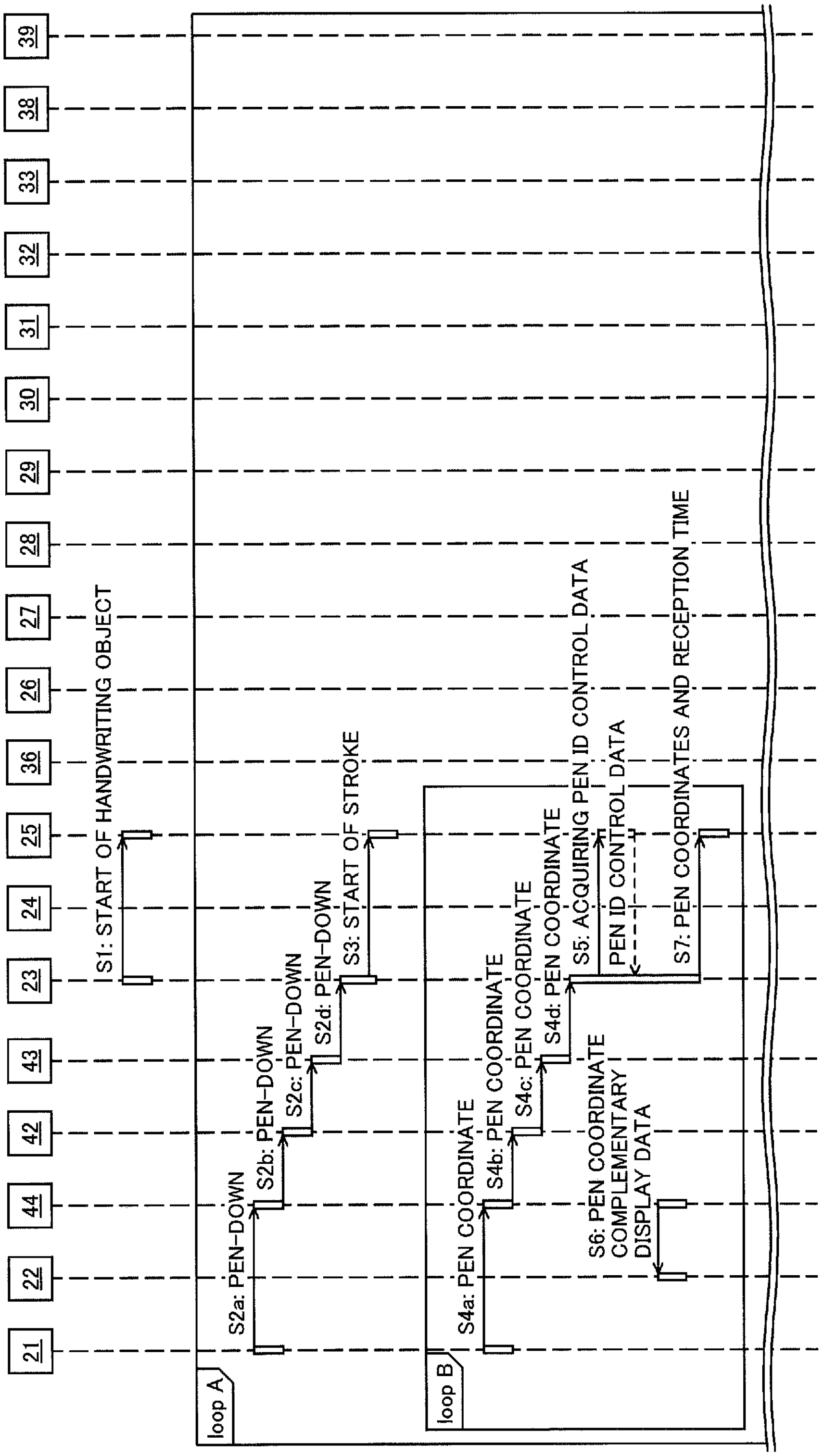
FIG. 42 is a sequence diagram illustrating a process in which a handwriting input apparatus displays a character string candidate and an operation command candidate.
Figure 43:
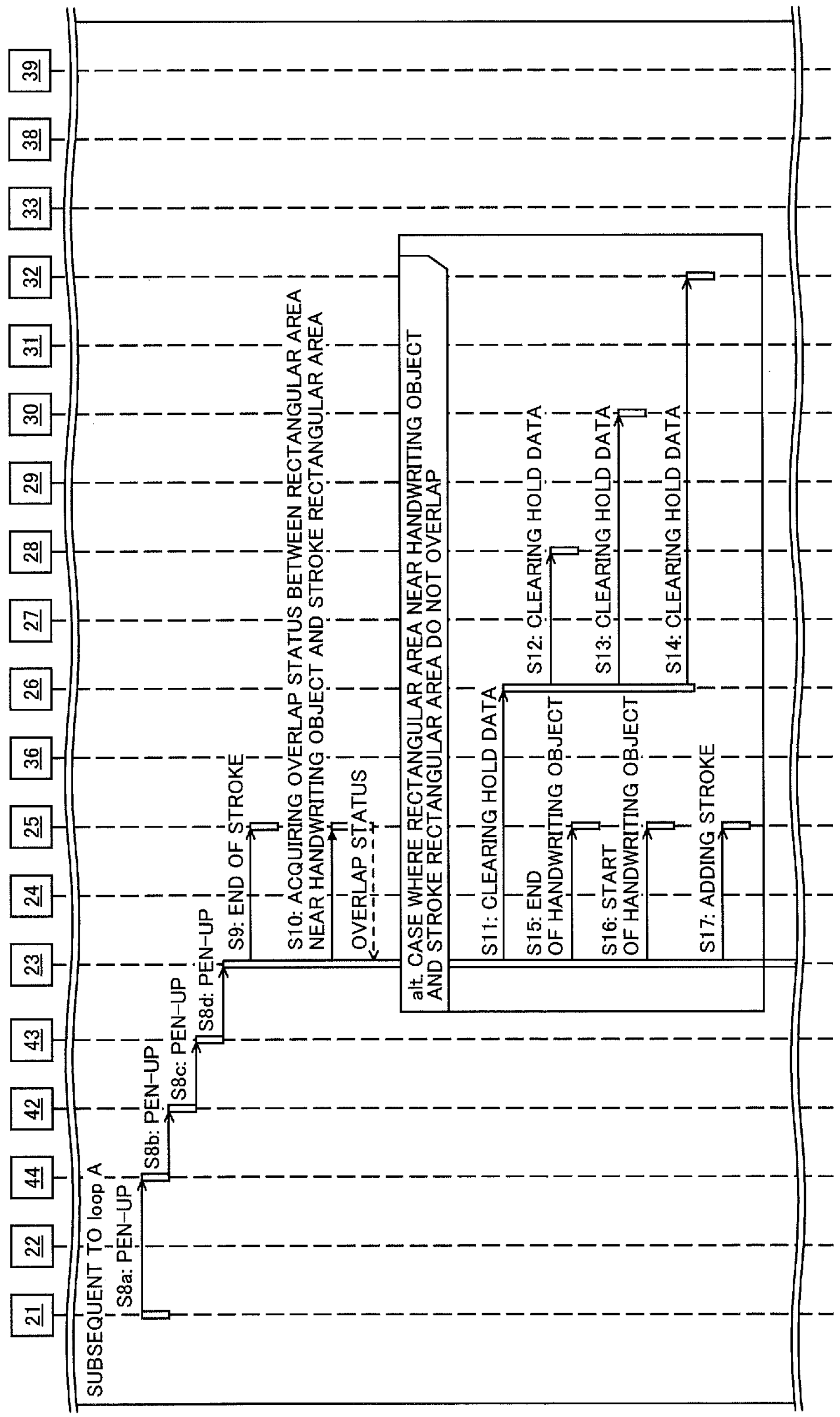
FIG. 43 is a sequence diagram illustrating a process in which a handwriting input apparatus displays a character string candidate and an operation command candidate.
Figure 44:
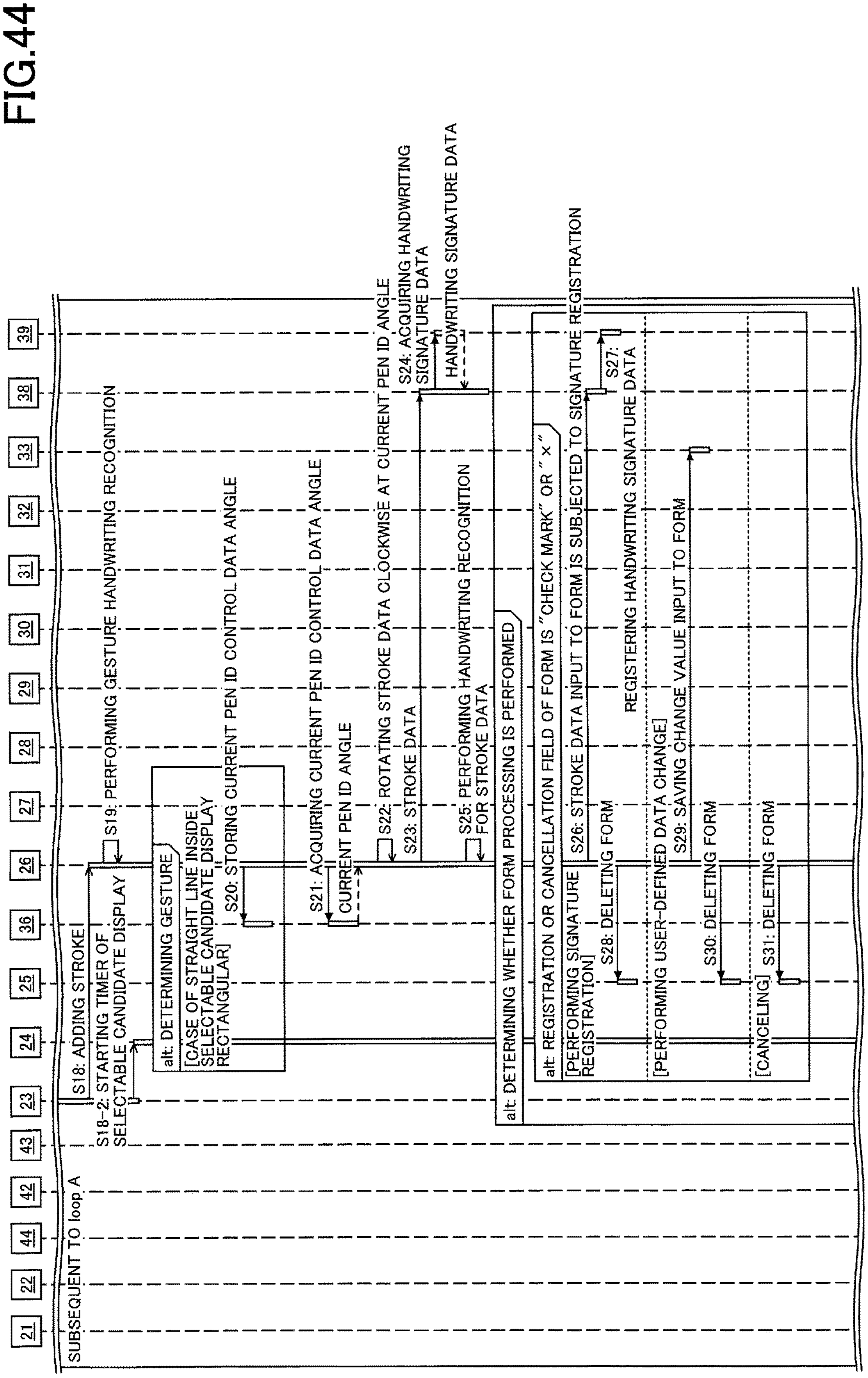
FIG. 44 is a sequence diagram illustrating a process in which a handwriting input apparatus displays a character string candidate and an operation command candidate.
Figure 45:
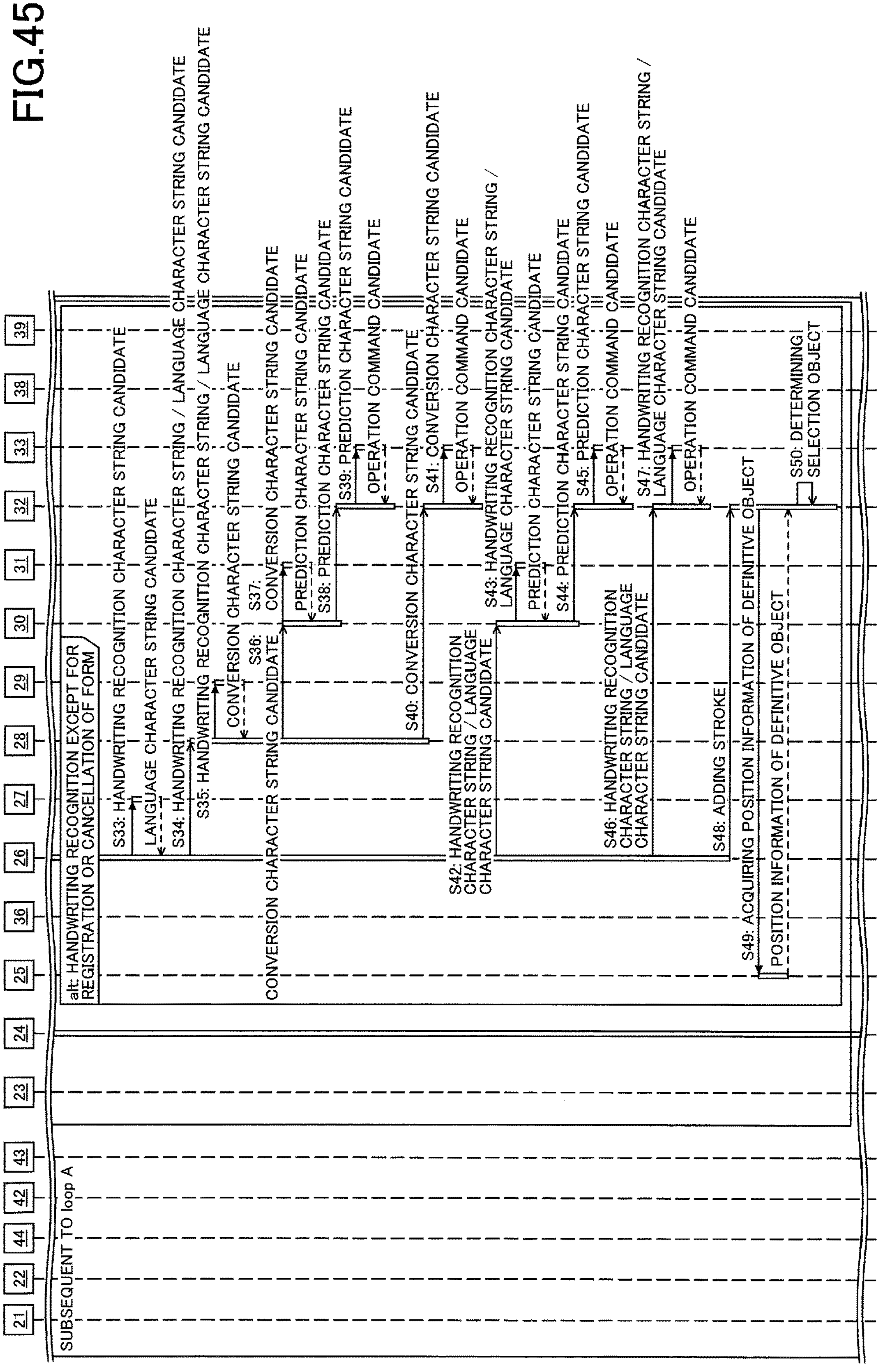
FIG. 45 is a sequence diagram illustrating a process in which a handwriting input apparatus displays a character string candidate and an operation command candidate.
Figure 46:
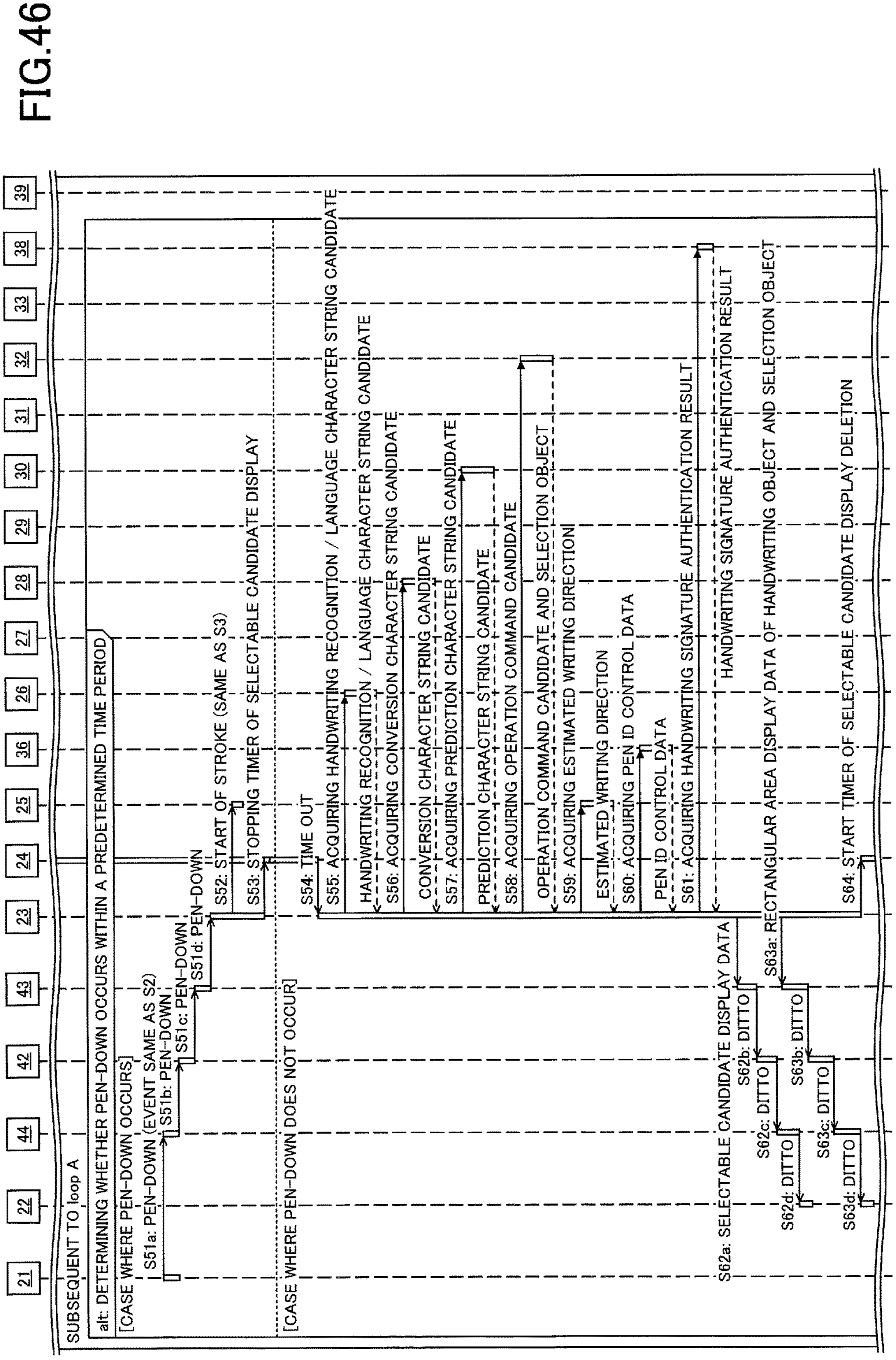
FIG. 46 is a sequence diagram illustrating a process in which a handwriting input apparatus displays a character string candidate and an operation command candidate.
Figure 47:
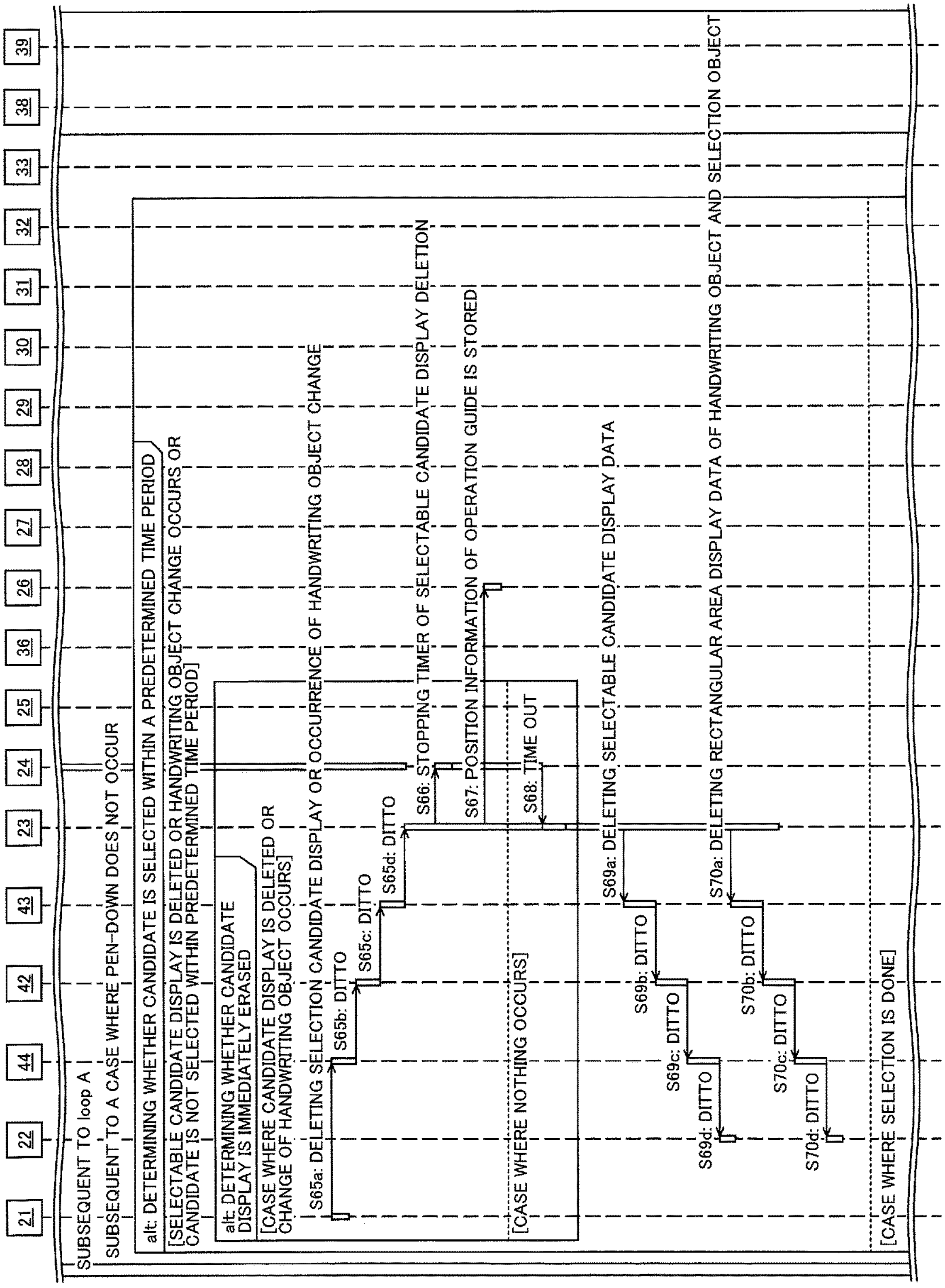
FIG. 47 is a sequence diagram illustrating a process in which a handwriting input apparatus displays a character string candidate and an operation command candidate.
Figure 48:
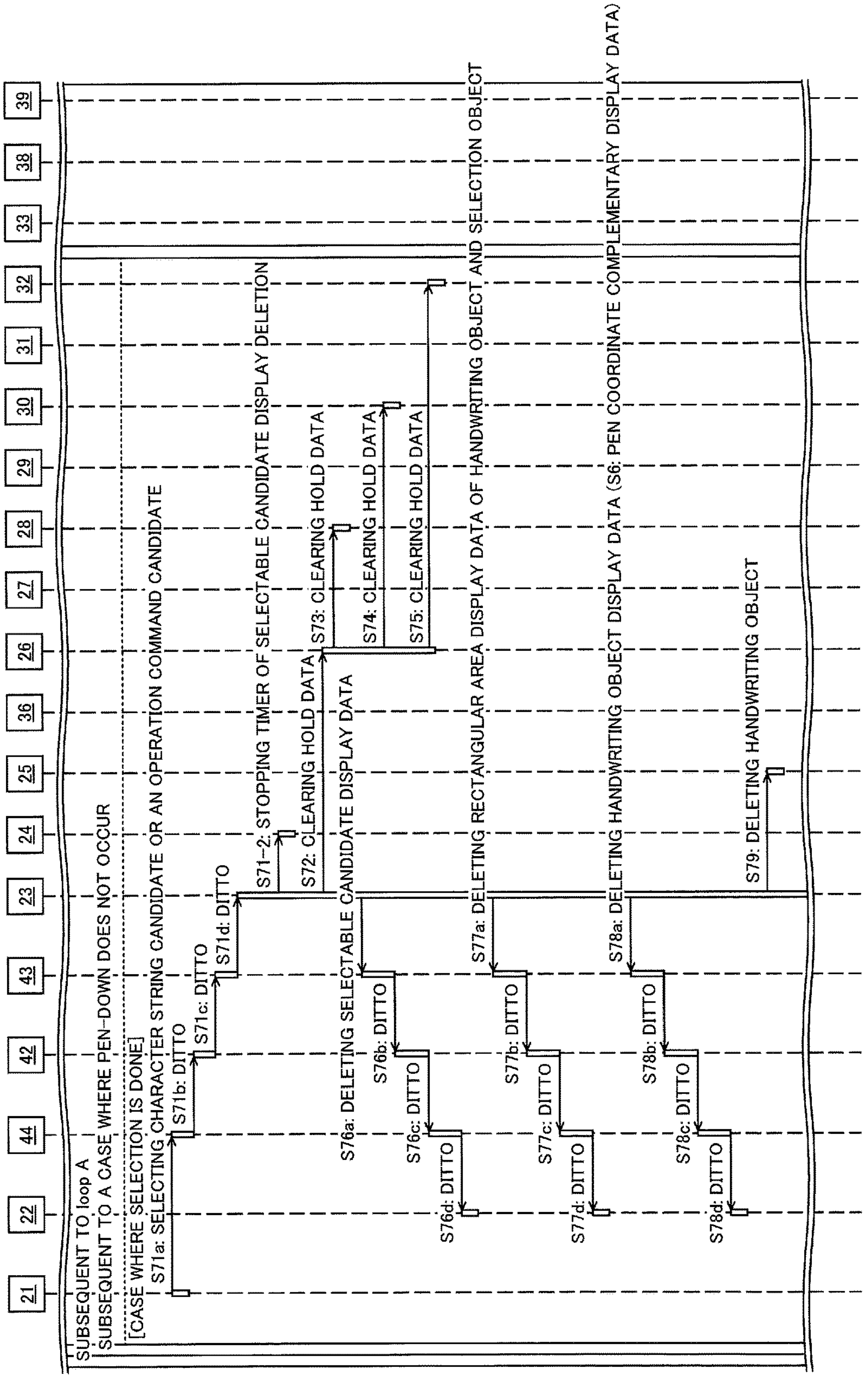
FIG. 48 is a sequence diagram illustrating a process in which a handwriting input apparatus displays a character string candidate and an operation command candidate.
Figure 49:
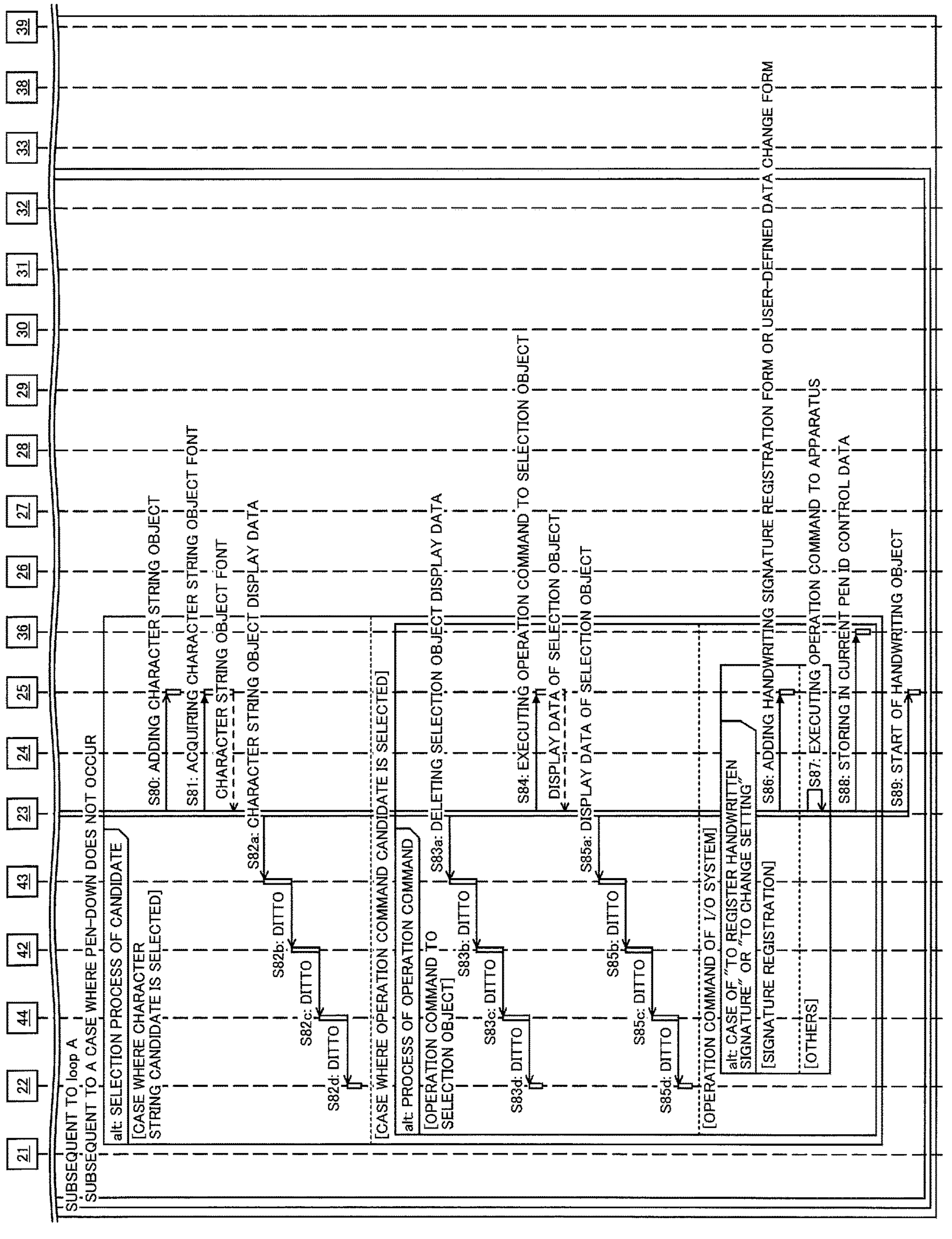
FIG. 49 is a sequence diagram illustrating a process in which a handwriting input apparatus displays a character string candidate and an operation command candidate.

Next, functions of the handwriting input system 100 will be described with reference to FIG. 41. FIG. 41 is an example of a functional block diagram illustrating the functions of the handwriting input system 100 in a block shape. In the description of FIG. 41, the difference from FIG. 6 will be mainly explained. The function of the pen 2500 may be the same as that of the first embodiment.

In this embodiment, the handwriting input apparatus 2 includes a display unit 22, a display control unit 44, a handwriting input unit 21, and a communication unit 42. Each function of the handwriting input apparatus 2 is a function or unit implemented in which one of the components illustrated in FIG. 40 is operated by instructions from the CPU 201 according to a program deployed from the SSD 204 to the RAM 203.

The function of the handwriting input unit 21 according to this embodiment may be the same as that of the first embodiment. The handwriting input unit 21 converts the user's pen input d1 into pen operation data (pen-up, pen-down, or pen-coordinate data) and transmits the converted data to the display control unit 44.

The display control unit 44 controls the display of the handwriting input apparatus 2. First, the display control unit 44 complements the coordinates between discrete values of the pen coordinate data, which are discrete values, and transmits the pen coordinate data from the pen-down to the pen-up as a single stroke db to the display unit 22.

The display control unit 44 transmits the pen operation data dc to the communication unit 42 and acquires various display data dd from the communication unit 42. The display data includes information for displaying the operation guide 500 of FIG. 17. The display control unit 44 transmits the display data de to the display unit 22.

The communication unit 42 transmits the pen operation data dc to the information processing system 10, receives various display data dd from the information processing system 10, and transmits it to the display control unit 44 (an example of the first communication unit). The communication unit 42 transmits and receives data in, for example, JSON format or XML format.

The function of the display unit 22 may be the same as that of the first embodiment. The display unit 22 displays the stroke db and the display data de. The display unit 22 converts the stroke db or the display data de written in the video memory by the display control unit 44 into data corresponding to the characteristics of the display 220 and transmits the data to the display 220.

<<Function of Information Processing System>>

The information processing system 10 includes a communication unit 43, a handwriting input display control unit 23, a candidate display timer control unit 24, a handwriting input storage unit 25, a handwriting recognition control unit 26, a handwriting recognition dictionary unit 27, a character string conversion control unit 28, a character string conversion dictionary unit 29, a prediction conversion control unit 30, a prediction conversion dictionary unit 31, an operation command recognition control unit 32, an operation command definition unit 33, a pen ID control data storage unit 36, a handwriting signature authentication control unit 38, and a handwriting signature data storage unit 39. Each function of the information processing system 10 is a function or unit by which each of the components illustrated in FIG. 40 is implemented by operating by instructions from the CPU 601 according to a program deployed from the HD 604 to the RAM 603.

The communication unit 43 receives the pen operation data dc from the handwriting input apparatus 2 and transmits the pen operation data df to the handwriting input display control unit 23. The communication unit 43 receives display data dd from the handwriting input display control unit 23 and transmits the received display data to the handwriting input apparatus 2 (an example of the second communication unit). The communication unit 43 transmits and receives data in a JSON format, an XML format, or the like.

The other functions are the same as those of the first embodiment. Even if they are different, they are not hindered by the description of this embodiment.

<Operation Procedure>

The above configuration and operations of the handwriting input system 100 will be described with reference to FIGS. 42 to 49. FIGS. 42 to 49 are sequence diagrams illustrating a process in which the handwriting input apparatus 2 displays a character string candidate and an operation command candidate. The processing of FIG. 42 starts when the handwriting input apparatus 2 starts (a web browser or a dedicated application starts) and communication with the information processing system 10 is established. Incidentally, the overall flow of FIGS. 42-49 may be similar to that of FIGS. 28 to 34.

S1: When communication is established, in order to allocate the memory area of the handwriting input apparatus 2, the handwriting input display control unit 23 transmits the start of the handwriting object to the handwriting input storage unit 25. The handwriting input storage unit 25 allocates a handwriting object area (a memory area for storing handwriting objects). The user may contact the handwriting input unit 21 with the pen before securing the handwriting object area.

S2*a*: The user then contacts the handwriting input unit 21 with a pen. The handwriting input unit 21 detects the pen-down and transmits it to the display control unit 44.

S2*b*: The display control unit 44 transmits the pen-down to the communication unit 42 in order to notify the information processing system 10 of the pen-down.

S2*c*: The communication unit 42 transmits the pen-down to the information processing system 10.

S2*d*: The communication unit 43 of the information processing system 10 receives the pen-down and transmits it to the handwriting input display control unit 23.

S3: The handwriting input display control unit 23 transmits a stroke start to the handwriting input storage unit 25, and the handwriting input storage unit 25 reserves a stroke area.

S4*a*: When the user moves the pen in contact with the handwriting input unit 21, the handwriting input unit 21 transmits the pen coordinates to the display control unit 44.

S4*b*: The display control unit 44 transmits the pen coordinates to the communication unit 42 in order to notify the information processing system 10 of the pen coordinates.

S4*c*: The communication unit 42 transmits the pen coordinates to the information processing system 10.

S4*d*: The communication unit 43 of the information processing system 10 receives the pen coordinates and transmits them to the handwriting input display control unit 23.

S6: The display control unit 44 transmits the pen coordinate complementary display data (data interpolating discrete pen coordinates) to the display unit 22. The display unit 22 displays a line by interpolating the pen coordinates using the pen coordinate display data. The processing of step S7 is the same as that of the first embodiment.

S8*a*: When the user releases the pen from the handwriting input unit 21, the handwriting input unit 21 transmits the pen-up to the display control unit 44.

S8*b*: The display control unit 44 transmits the pen-up to the communication unit 42 in order to notify the information processing system 10 of the pen-up.

S8*c*: The communication unit 42 transmits the pen-up to the information processing system 10.

S8*d*: The communication unit 43 of the information processing system 10 receives the pen-up and transmits it to the handwriting input display control unit 23.

Subsequent steps S9 to S17 and steps S18 to S50 are the same as those in the first embodiment.

S51*a*: When the user contacts the handwriting input unit 21 with the pen before the timer expires, the handwriting input unit 21 transmits the pen-down (the same event as in step S2) to the display control unit 44). The processing of steps S51*b* to S51*d* may be the same as that of steps S2*b* to S2*d*. Further, the processing of steps S52 to S61 is the same as that of the first embodiment.

S62*a*: The handwriting input display control unit 23 produces the selectable candidate display data including each character string candidate, each operation command candidate, each selection probability, and the estimated writing direction illustrated in FIG. 17, and transmits the selectable candidate display data consisting of the character string candidate and the operation command candidate to the communication unit 43.

S62*b*: The communication unit 43 transmits the selectable candidate display data to the handwriting input apparatus 2.

S62*c*: The communication unit 42 of the handwriting input apparatus 2 receives the selectable candidate display data and transmits the data to the display control unit 44.

S62*d*: The display control unit 44 receives the selectable candidate display data and displays it by transmitting it to the display unit 22.

S63*a*: The handwriting input display control unit 23 transmits the rectangular area display data (a rectangular frame) of the handwriting object and the selection object (a handwriting object rectangular area display 503 in FIG. 17) to the communication unit 43.

S63*b*: The communication unit 43 transmits the rectangular area display data to the handwriting input apparatus 2.

S63*c*: The communication unit 42 of the handwriting input apparatus 2 receives the rectangular area display data and transmits the data to the display control unit 44.

S63*d*: The display control unit 44 receives the rectangular area display data and displays it by transmitting it to the display unit 22. The processing of step S64 is the same as that of the first embodiment.

S65*a*: When the user deletes the selectable candidate or writes the selectable candidate by hand to the handwriting object, the handwriting input unit 21 transmits the occurrence of the selectable candidate display deletion or the change of the handwriting object to the display control unit 44.

S65*b*: The display control unit 44 transmits to the communication unit 42 for notifying the information processing system 10 of the occurrence of the selectable candidate display deletion or the change of the handwriting object.

S65*c*: The communication unit 42 transmits the occurrence of the selectable candidate display deletion or the change of the handwriting object to the information processing system 10.

S65*d*: The communication unit 43 of the information processing system 10 receives the occurrence of the selectable candidate display deletion or the change of the handwriting object and transmits it to the handwriting input display control unit 23. The processing of the steps S66, S67, and S68 is the same as that of the first embodiment.

S69*a*: The handwriting input display control unit 23 transmits the deletion of the selectable candidate display data to the communication unit 43.

S69*b*: The communication unit 43 transmits deletion of the selectable candidate display data to the handwriting input apparatus 2.

S69*c*: The communication unit 42 of the handwriting input apparatus 2 receives the deletion of the selectable candidate display data and transmits the deletion to the display control unit 44.

S69*d*: The display control unit 44 receives the deletion of the selectable candidate display data and transmits the deletion to the display unit 22 to delete the selectable candidate.

S70*a*: The handwriting input display control unit 23 transmits deletion of the rectangular area display data of the handwriting object and the selection object to the communication unit 43.

S70*b*: The communication unit 43 transmits the rectangular area display data of the handwriting object and the selection object to the handwriting input apparatus 2.

S70*c*: The communication unit 42 of the handwriting input apparatus 2 receives the deletion of the rectangular area display data of the handwriting object and the selection object and transmits the deletion to the display control unit 44.

S70*d*: The display control unit 44 receives the deletion of the rectangular area display data of the handwriting object and the selection object and transmits it to the display unit 22 to cause the rectangular area of the handwriting object and the selection object to be deleted. Therefore, if the display of the operation command candidate is deleted under conditions other than the selection of the operation command candidate, the display of the handwriting object is held.

If the user selects the selectable candidate during the start of the selectable candidate deletion timer, step S71-S89 is executed.

S71*a*: When the user selects the selectable candidate during the start of the selectable candidate deletion timer, the handwriting input unit 21 transmits the selection of the character string candidate or the operation command candidate to the display control unit 44.

S71*b*: The display control unit 44 transmits to the communication unit 42 in order to notify the information processing system 10 of the selection of the character string candidate or the operation command candidate.

S71*c*: The communication unit 42 transmits a selection of a character string candidate or an operation command to the information processing system 10.

S71*d*: The communication unit 43 of the information processing system 10 receives a selection of a character string candidate or a candidate of an operation command and transmits the selection to the handwriting input display control unit 23. The processing of steps S72 through S75 is the same as that of the first embodiment.

S76*a*: Next, the handwriting input display control unit 23 transmits the deletion of the selectable candidate display data to the communication unit 43.

S76*b*: The communication unit 43 transmits the deletion of the selectable candidate display data to the handwriting input apparatus 2.

S76*c*: The communication unit 42 of the handwriting input apparatus 2 receives the deletion of the selectable candidate display data and transmits the deletion to the display control unit 44.

S76*d*: The display control unit 44 receives the deletion of the selectable candidate display data and causes the display unit 22 to delete the selectable candidate.

S77*a*: The handwriting input display control unit 23 transmits the deletion of the rectangular area display data of the handwriting object and the selection object to the communication unit 43.

S77*b*: The communication unit 43 transmits the deletion of the rectangular area display data to the handwriting input apparatus 2.

S77*c*: The communication unit 42 of the handwriting input apparatus 2 receives the deletion of the rectangular area display data and transmits the deletion to the display control unit 44.

S77*d*: The display control unit 44 receives the deletion of the rectangular area display data and causes the display unit 22 to delete the rectangular area.

S78*a*: The handwriting input display control unit 23 transmits deletion of the handwriting object display data to the communication unit 43.

S78*b*: The communication unit 43 transmits the handwriting object display data deletion to the handwriting input apparatus 2.

S78*c*: The communication unit 42 of the handwriting input apparatus 2 receives the deletion of handwriting object display data and transmits the deletion to the display control unit 44.

S78*d*: The display control unit 44 receives the deletion of the handwriting object display data and causes the display unit 22 to delete the handwriting object and the pen coordinate complementary display data. The processing of step S79 may be the same as that of the first embodiment.

If a string candidate is selected, steps S80 to S82 are executed. The processes of step S80 and step S81 may be the same as those in the first embodiment.

S82*a*: The handwriting input display control unit 23 then uses the defined font received from the handwriting input storage unit 25 to transmit the character string object display data to be displayed at the same position as the handwriting object to the communication unit 43.

S82*b*: The communication unit 43 transmits the character string object display data to the handwriting input apparatus 2.

S82*c*: The communication unit 42 of the handwriting input apparatus 2 receives the character string object display data and transmits the data to the display control unit 44.

S82*d*: The display control unit 44 receives the character string object display data and causes the display unit 22 to display the character string object.

If an operation command candidate is selected, steps S83 through S87 are executed. Additionally, steps S83 to S85 are executed if the selection object is present.

S83*a*: When the operation command candidate to the selection object is selected (when the selection object exists), the handwriting input display control unit 23 transmits deletion of the selection object display data to the communication unit 43. This is to delete the original selection object once.

S83*b*: The communication unit 43 transmits the deletion of the selection object display data to the handwriting input apparatus 2.

S83*c*: The communication unit 42 of the handwriting input apparatus 2 receives the deletion of the selection object display data and transmits it to the display control unit 44.

S83*d*: The display control unit 44 receives the deletion of the selection object display data and causes the display unit 22 to delete the selection object.

S84: Next, the handwriting input display control unit 23 transmits the operation command to the selection object to the handwriting input storage unit 25. The handwriting input storage unit 25 transmits display data (display data after editing or modification) of the new selection object to the handwriting input display control unit 23.

S85*a*: Next, the handwriting input display control unit 23 transmits the selection object display data to the communication unit 43.

S85*b*: The communication unit 43 transmits the selection object display data to the handwriting input apparatus 2.

S85*c*: The communication unit 42 of the handwriting input apparatus 2 receives the selection object display data and transmits the data to the display control unit 44.

S85*d*: because the display control unit 44 receives the selection object display data, the display unit 22 re-displays the selection object after executing the operation command. The processing of steps S86 to S89 may be the same as those of the first embodiment.

As described above, even in the system configuration in which the handwriting input apparatus 2 and the information processing system 10 communicate, the same effect as in the first embodiment can be achieved. Incidentally, the processing flow of FIGS. 42 to 49 is an example, and the processing that occurs when the handwriting input apparatus 2 and the information processing system 10 communicate with each other is included or omitted. A part of the processing performed by the information processing system 10 may be performed by the handwriting input apparatus 2. For example, the handwriting input apparatus 2 may perform the processing related to the deletion.

<Other Applications>

While the preferred embodiment of the present invention has been described with reference to examples, various modifications and substitutions may be made thereto without departing from the spirit and scope of the invention.

For example, although an electronic blackboard has been described in the embodiments, an information processing apparatus having a touch panel can be suitably applied. The information processing apparatus having the built-in touch panel may be, for example, an output device such as a PJ (Projector) and a digital signature, an HUD (Head Up Display) device, an industrial machine, an imaging device, a sound collector, a medical device, a network home appliance, a notebook PC (personal computer), a cellular phone, a smartphone, a tablet terminal, a game machine, a PDA (Personal Digital Assistant), a digital camera, a wearable PC, or a desktop PC, and so on.

In this embodiment, the coordinates of the tip of the pen are detected by the touch panel, but the coordinates of the tip of the pen may be detected by ultrasound. The pen emits ultrasonic waves together with the light emission, and the handwriting input apparatus 2 calculates the distance according to the time of arrival of the ultrasonic waves. The position of the pen can be determined by its direction and distance. The projector draws (projects) the pen's trajectory as a stroke.

In this embodiment, when there is the selection object, the operation command candidates of the editing system and the modification system are displayed, and when there is no selection object, the operation command candidates of the I/O system are displayed. However, the operation command candidates of the editing system and the modification system and the operation command candidates of the I/O system can be displayed at the same time.

Further, the user's handwriting signature data do not need to be saved in the handwriting input apparatus 2. The user's handwriting signature data may be held by the cloud or the information processing apparatus within the company.

Further, a configuration example such as FIG. 6 may be divided according to a main function in order to facilitate understanding of processing by the handwriting input apparatus 2. The invention of the present application is not limited by the method of dividing the processing unit or by the name. The processing of the handwriting input apparatus 2 can be divided into more processing units depending on the processing contents. Alternatively, one processing unit may be divided into more processing.

The functions of the embodiments described above may also be implemented by one or multiple processing circuits. As used herein, the "processing circuit" includes a processor programmed to perform each function by software, such as a processor implemented in electronic circuits, an ASIC (Application Specific Integrated Circuit) designed to perform each function as described above, a digital signal processor (DSP), a field programmable gate array (FPGA), or a conventional circuit module.

The pen ID control data storage unit 36 is an example of control data storage unit. The display unit 22 is an example of a display unit of claim 1. The handwriting recognition control unit 26 is an example of a handwriting identification control unit. The communication unit 42 is an example of a receiving unit. The communication unit 43 is an example of the transmission unit. The operation command recognition control unit 32 is an example of an operation command recognition control unit. The input-unit-communication unit 37 is an example of an input-unit-communication unit. The handwriting signature authentication control unit 38 is an example of an authentication control unit. The handwriting input unit 21 is an example of an handwriting input unit. The display 220 is an example of a display control unit.

DESCRIPTION OF SYMBOLS

2 Handwriting input apparatus
21 Handwriting input unit
22 Display unit
23 Handwriting input display control unit
24 Candidate display timer control unit
25 Handwriting input storage unit
26 Handwriting recognition control unit
27 Handwriting recognition dictionary department
28 Character string conversion control unit
29 Character string conversion dictionary unit
30 Prediction conversion control unit
31 Prediction conversion dictionary unit
32 Operation command recognition control unit
33 Operation command definition unit
36 Pen ID control data storage unit
38 Handwriting signature authentication control unit
39 Handwriting signature data storage unit

EFFECTS OF THE INVENTION

A handwriting input apparatus can be provided that is easy to sign in.

Numerous additional modifications and variations are possible in light of the above teachings. It is therefore to be understood that, within the scope of the appended claims, the disclosure of this patent specification may be practiced otherwise than as specifically described herein. As can be appreciated by those skilled in the computer arts, this invention may be implemented as convenient using a conventional general-purpose digital computer programmed according to the teachings of the present specification. Appropriate software coding can readily be prepared by skilled programmers based on the teachings of the present disclosure, as will be apparent to those skilled in the software arts. The present invention may also be implemented by the preparation of application-specific integrated circuits or by interconnecting an appropriate network of conventional component circuits, as will be readily apparent to those skilled in the relevant art.

Each of the functions of the described embodiments may be implemented by one or more processing circuits. A processing circuit includes a programmed processor. A processing circuit also includes devices such as an application specific integrated circuit (ASIC) and conventional circuit components arranged to perform the recited functions.

The processing circuitry is implemented as at least a portion of a microprocessor. The processing circuitry may be implemented using one or more circuits, one or more microprocessors, microcontrollers, application specific integrated circuits, dedicated hardware, digital signal processors, microcomputers, central processing units, field programmable gate arrays, programmable logic devices, state machines, super computers, or any combination thereof. Also, the processing circuitry may include one or more software modules executable within one or more processing circuits. The processing circuitry may further include memory configured to save instructions and/or code that causes the processing circuitry to execute functions.

If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

The above embodiments are applicable to a character and a character string of other than Japanese such as other languages like English, Chinese, German, Portuguese, and so on.

What is claimed is:

1. A handwriting input apparatus that displays handwritten stroke data based on a position of an input unit contacting a touch panel, the handwriting input apparatus comprising:

circuitry configured to receive a handwriting input operation by which a user inputs the stroke data, recognize the stroke data and convert the stroke data into text data as the stroke data is being input;

display on a display the recognized stroke data as the handwriting input operation proceeds, and an operation guide that includes one or more selectable character string candidates of the converted text data as the stroke data is being input;

authenticate a user based on the recognized stroke data; and display a display component for accepting sign-in of the user upon successful authentication of the user, the display component being displayed in the operation guide.

2. The handwriting input apparatus according to claim 1, the circuitry being further configured to recognize an operation command to be executed by the handwriting input apparatus based on the converted text data, wherein the displayed display component indicates the operation command corresponding to the converted text data.

3. The handwriting input apparatus according to claim 2, wherein in a case where the converted text data coincides with a character string of a handwritten signature data registration operation command to register handwritten signature data, the displayed display component indicates the handwritten signature data registration operation command.

4. The handwriting input apparatus according to claim 3, wherein in response to the depressing of the handwritten signature data registration operation command a form for registering the handwritten signature data is displayed, and the handwritten signature data that is input into the form is registered in the memory.

5. The handwriting input apparatus according to claim 4, wherein the circuitry is further configured to assign a number to handwritten signature data identification information identifying the handwriting signature data, assign another number to the user identification information, and registers the user-defined data of the user in association with the handwritten signature data identification information and the user identification information.

6. The handwriting input apparatus according to claim 4, wherein in a case where a handwriting input into the form is received without distinguishing the handwriting input into the form from the handwriting input into other than the form.

7. The handwriting input apparatus according to claim 2, wherein in a case where the converted text data coincides with a character string of a sign-out operation command for signing out, the displayed display component indicates the sign-out operation command.

8. The handwriting input apparatus according to claim 7, the circuitry being further configured to receive control data of the input unit via communication with the input unit, the control data including input unit identification information of the input unit, store the received control data of the input unit in a memory, and register user identification information of the user determined by the authentication control unit as being successfully authenticated in the memory in association with the input unit identification information included with the received the control data in response to depressing the display component for accepting sign-in of the user.

9. The handwriting input apparatus according to claim 8, wherein the circuitry is further configured to acquire the user identification information associated with the input unit identification information from the memory in response to the depressing of the display component for accepting sign-in of the user, and execute subsequent operation commands using user-defined data of the user determined by the authentication control unit as being successfully authenticated.

10. The handwriting input apparatus according to claim 9, wherein the user-defined data defines a user name, password, or folder file name for the user, and the circuitry is further configured to set the user name, the password, or the folder file name specified by the user identification information to the operation command, and executes the operation command.

11. The handwriting input apparatus according to claim 9, wherein in a case where the converted text data partly coincides with a character string of a change user-defined data operation command for changing the user-defined data, the displayed display component indicates the change user-defined data operation command.

12. The handwriting input apparatus according to claim 11, wherein in response to the depressing of the change user-defined data operation command a form for receiving changes to the user-defined data is displayed, and the user-defined data is changed in accordance with a change value entered into the form.

13. The handwriting input apparatus according to claim 8, wherein in response to the depressing of the sign-out operation command, the user identification information of the associated with the input unit identification information is deleted.

14. The handwriting input apparatus according to claim 2, wherein the operation guide is displayed at a position corresponding to a position of the stroke data.

15. The handwriting input apparatus according to claim 2, wherein the operation guide is displayed at a position in a screen based on a position of the stroke data.

16. The handwriting input apparatus according to claim 1, wherein a user is authenticated based on whether the handwritten stroke data conforms to previously registered handwritten signature data.

17. A handwriting input method in which a handwriting input apparatus displays handwritten stroke data based on a position of an input unit in contact with a touch panel, the handwriting input method comprising:

receiving a handwriting input operation by which a user inputs the stroke data;

recognizing the stroke data;

converting the stroke data into text data;

displaying on a display the recognized stroke data as the handwriting input operation proceeds, and an operation guide that includes one or more selectable character string candidates of the converted text data, authenticating a user based on the recognized stroke data; and displaying a display component for accepting sign-in of the user upon successful authentication of the user, the display component being displayed in the operation guide.

18. A non-transitory computer-readable recording medium recording a program implemented by a processor installed in a handwriting input apparatus that displays handwritten stroke data based on a position of an input unit contacting a touch panel, the program performing:

receiving a handwriting input operation by which a user inputs the stroke data;

recognizing the stroke data;

converting the stroke data into text data;

displaying on a display the recognized stroke data as the handwriting input operation proceeds, and an operation guide that includes one or more selectable character string candidates of the converted text data;

authenticating a user based on the recognized stroke data; and displaying a display component for accepting sign-in of the user upon successful authentication of the user, the display component being displayed in the operation guide.

* * * * *